(12) United States Patent
Kim et al.

(10) Patent No.: US 11,149,375 B2
(45) Date of Patent: *Oct. 19, 2021

(54) WASHING MACHINE HAVING BLADE FOR CIRCULATING WASH WATER

(71) Applicant: LG Electronics Inc., Seoul (KR)

(72) Inventors: Youngjun Kim, Seoul (KR); Youngjong Kim, Seoul (KR); Dongcheol Kim, Seoul (KR); Insik Yu, Seoul (KR)

(73) Assignee: LG Electronics Inc., Seoul (KR)

( * ) Notice: Subject to any disclaimer, the term of this patent is extended or adjusted under 35 U.S.C. 154(b) by 311 days.

This patent is subject to a terminal disclaimer.

(21) Appl. No.: 15/766,682

(22) PCT Filed: Oct. 8, 2016

(86) PCT No.: PCT/KR2016/011282
§ 371 (c)(1),
(2) Date: Apr. 6, 2018

(87) PCT Pub. No.: WO2017/061835
PCT Pub. Date: Apr. 13, 2017

(65) Prior Publication Data
US 2018/0313016 A1 Nov. 1, 2018

(30) Foreign Application Priority Data

Oct. 8, 2015 (KR) .......................... 10-2015-0141715
Oct. 8, 2015 (KR) .......................... 10-2015-0141716
(Continued)

(51) Int. Cl.
*D06F 37/30* (2020.01)
*D06F 37/40* (2006.01)
(Continued)

(52) U.S. Cl.
CPC .............. *D06F 37/40* (2013.01); *D06F 17/08* (2013.01); *D06F 37/12* (2013.01); *D06F 37/14* (2013.01);
(Continued)

(58) Field of Classification Search
CPC .......... D06F 17/10; D06F 17/06; D06F 17/08; D06F 17/04
See application file for complete search history.

(56) References Cited

U.S. PATENT DOCUMENTS

2014/0109627 A1 4/2014 Lee et al.

FOREIGN PATENT DOCUMENTS

CN 201027257 Y * 2/2008
CN 101153436 A * 4/2008 ............. D06F 17/06
(Continued)

OTHER PUBLICATIONS

PCT International Search Report in International Appln. No. PCT/KR2016/011282, dated Jan. 6, 2017, 3 pages.

*Primary Examiner* — Irina Graf
(74) *Attorney, Agent, or Firm* — Fish & Richardson P.C.

(57) ABSTRACT

A washing machine includes an inner tub assembly for accommodating laundry, a pulsator rotatably provided to an inner lower portion of the inner tub assembly, a blade installed at a lower portion of the pulsator to be rotatable independently from the pulsator, the blade being configured to pump wash water to raise the wash water to an upper end of the inner tub assembly, a drive motor for providing rotational power to the pulsator and the blade, and a power transmission unit for transmitting power of the drive motor to the pulsator and the blade, respectively. The power transmission unit includes a first planetary gear module for transmitting a rotational speed of the drive motor to the pulsator by decreasing the rotational speed, and a second
(Continued)

planetary gear module for transmitting the rotational speed of the drive motor to the blade by decreasing the rotational speed.

20 Claims, 28 Drawing Sheets

(30) Foreign Application Priority Data

| | | |
|---|---|---|
| Mar. 8, 2016 | (KR) | 10-2016-0027847 |
| Mar. 9, 2016 | (KR) | 10-2016-0028420 |
| Sep. 19, 2016 | (KR) | 10-2016-0119239 |

(51) Int. Cl.

| | |
|---|---|
| *D06F 39/08* | (2006.01) |
| *D06F 37/14* | (2006.01) |
| *D06F 37/24* | (2006.01) |
| *D06F 37/42* | (2006.01) |
| *D06F 17/08* | (2006.01) |
| *D06F 39/10* | (2006.01) |
| *D06F 37/12* | (2006.01) |
| *F16H 1/46* | (2006.01) |
| *D06F 17/10* | (2006.01) |
| *D06F 23/04* | (2006.01) |

(52) U.S. Cl.
CPC ............ *D06F 37/145* (2013.01); *D06F 37/24* (2013.01); *D06F 37/42* (2013.01); *D06F 39/083* (2013.01); *D06F 39/085* (2013.01); *D06F 39/088* (2013.01); *D06F 39/10* (2013.01); *F16H 1/46* (2013.01); *D06F 17/10* (2013.01); *D06F 23/04* (2013.01); *D06F 37/304* (2013.01)

(56) References Cited

FOREIGN PATENT DOCUMENTS

| | | | | |
|---|---|---|---|---|
| CN | 201087286 Y | * | 7/2008 | |
| CN | 203807798 | | 9/2014 | |
| JP | 2009028509 | | 2/2009 | |
| JP | 2014083383 | | 5/2014 | |
| JP | 2014083383 A | * | 5/2014 | ........... D06F 39/083 |
| KR | 1019960037936 | | 11/1996 | |

* cited by examiner

[Fig. 1]
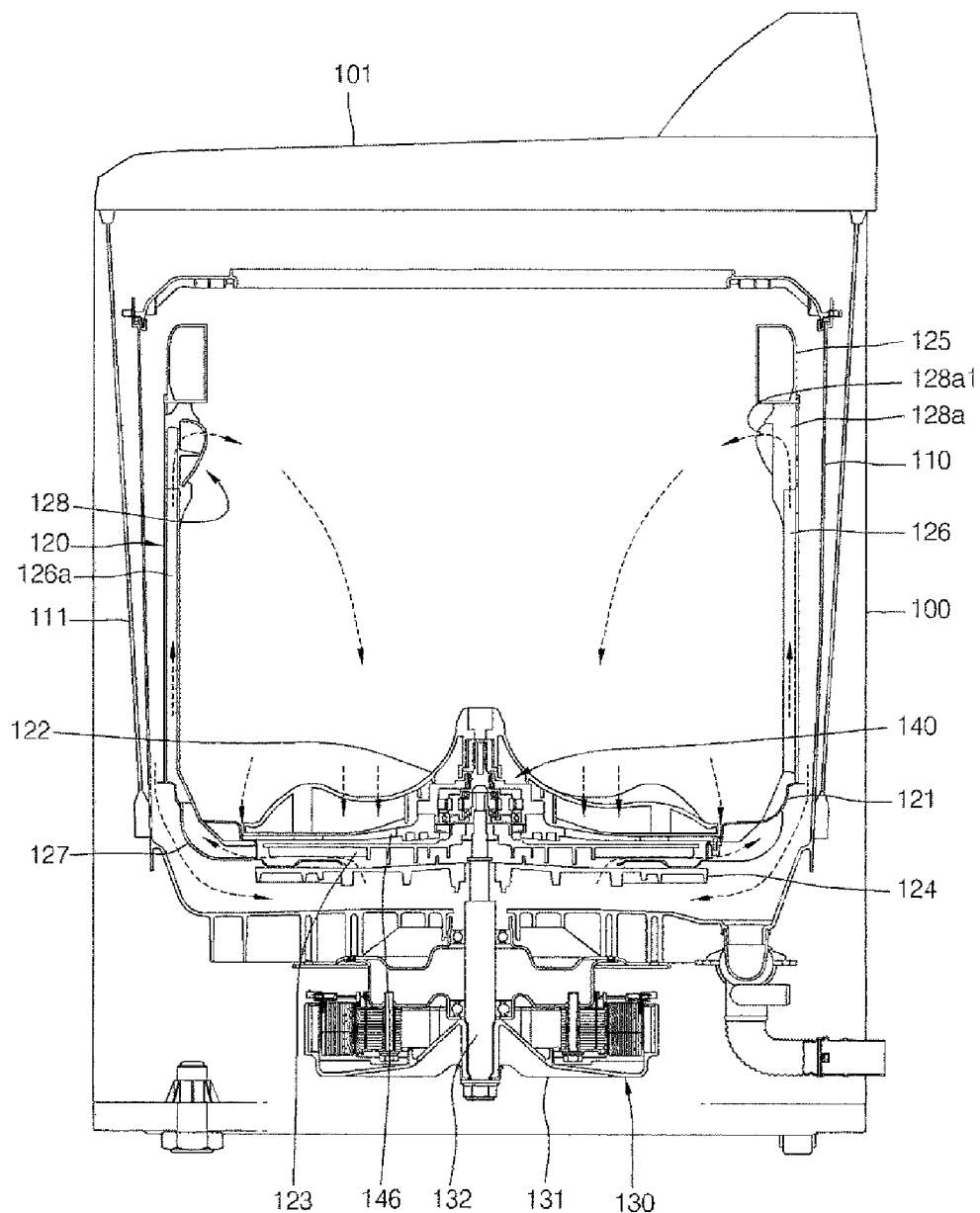

[Fig. 2a]
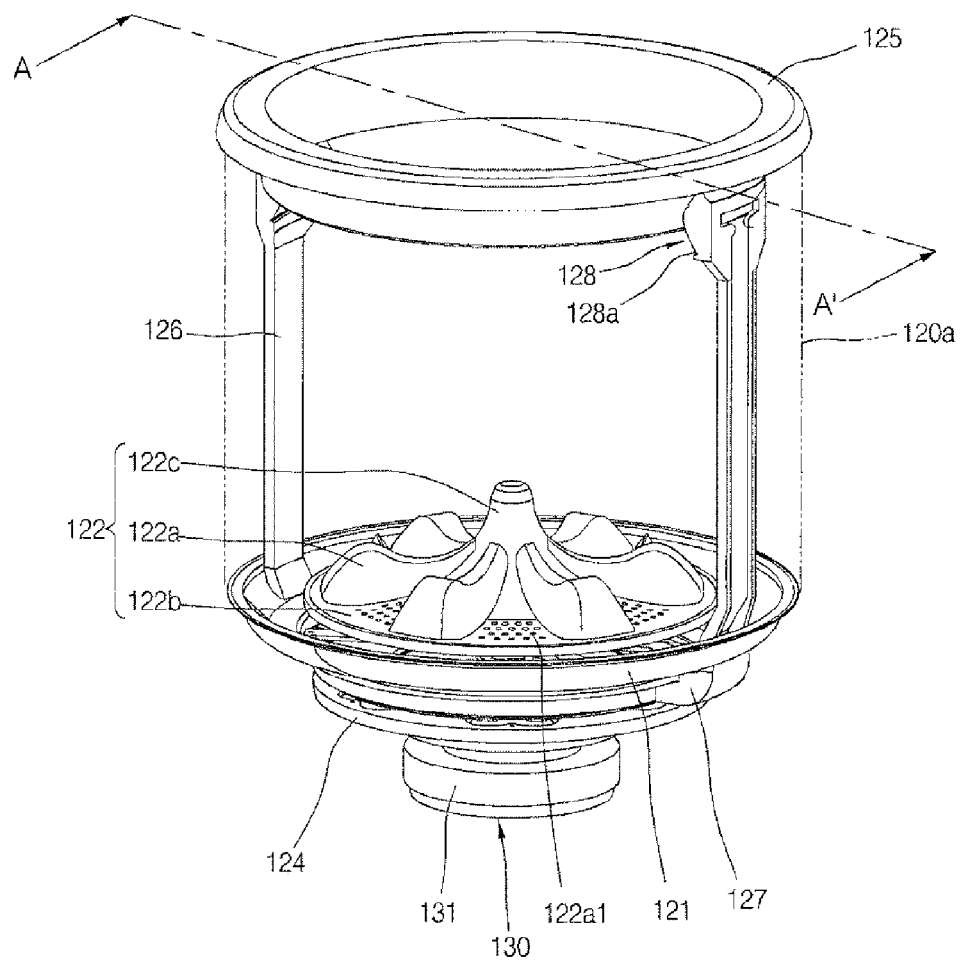

[Fig. 2b]
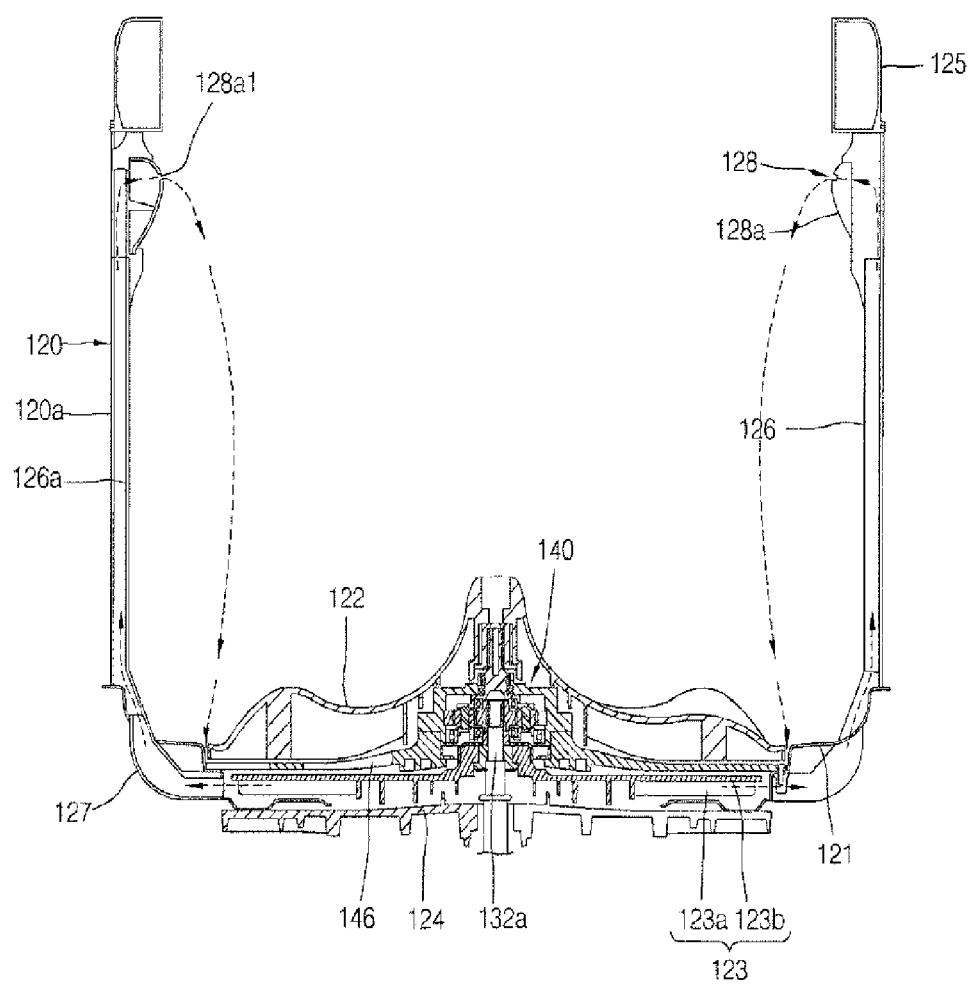

[Fig. 3]
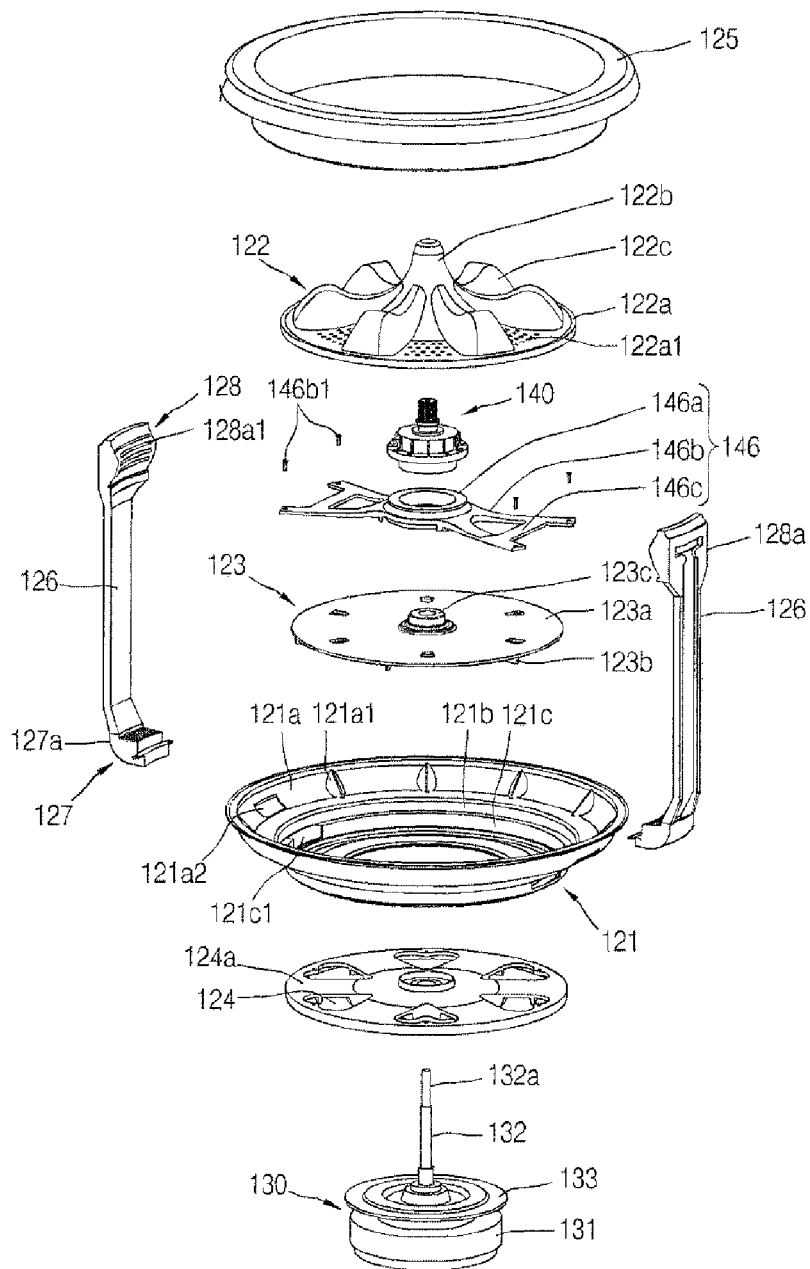

[Fig. 4]
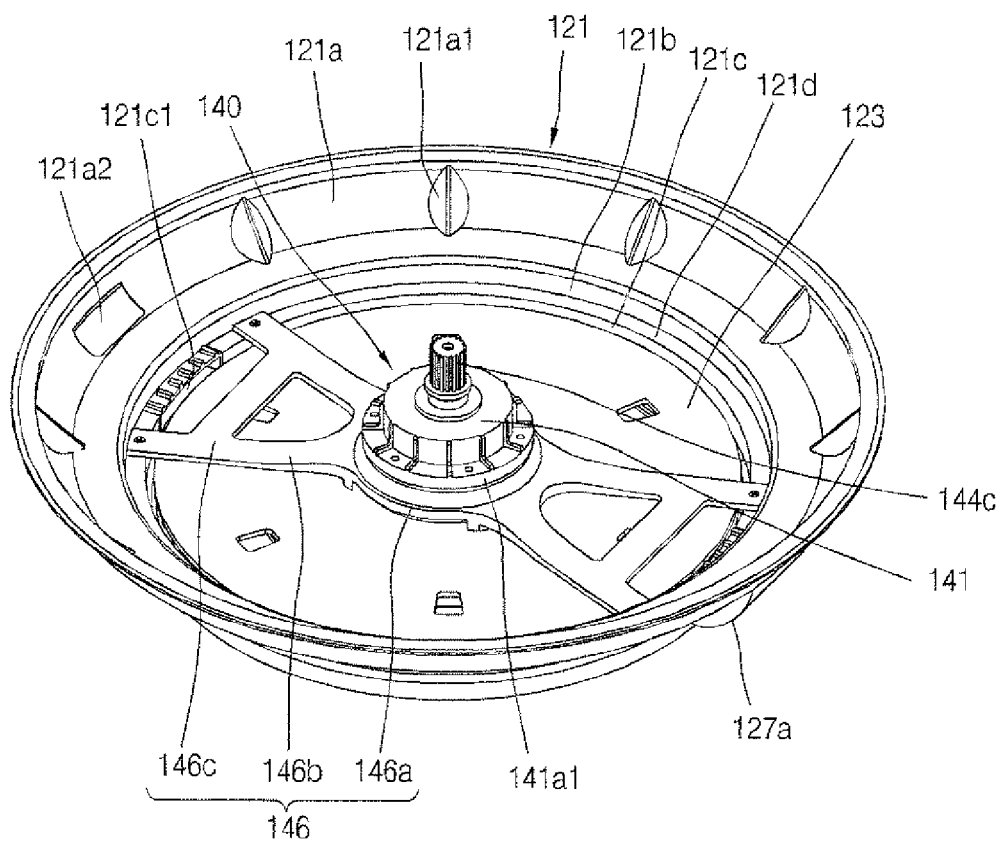

[Fig. 5]
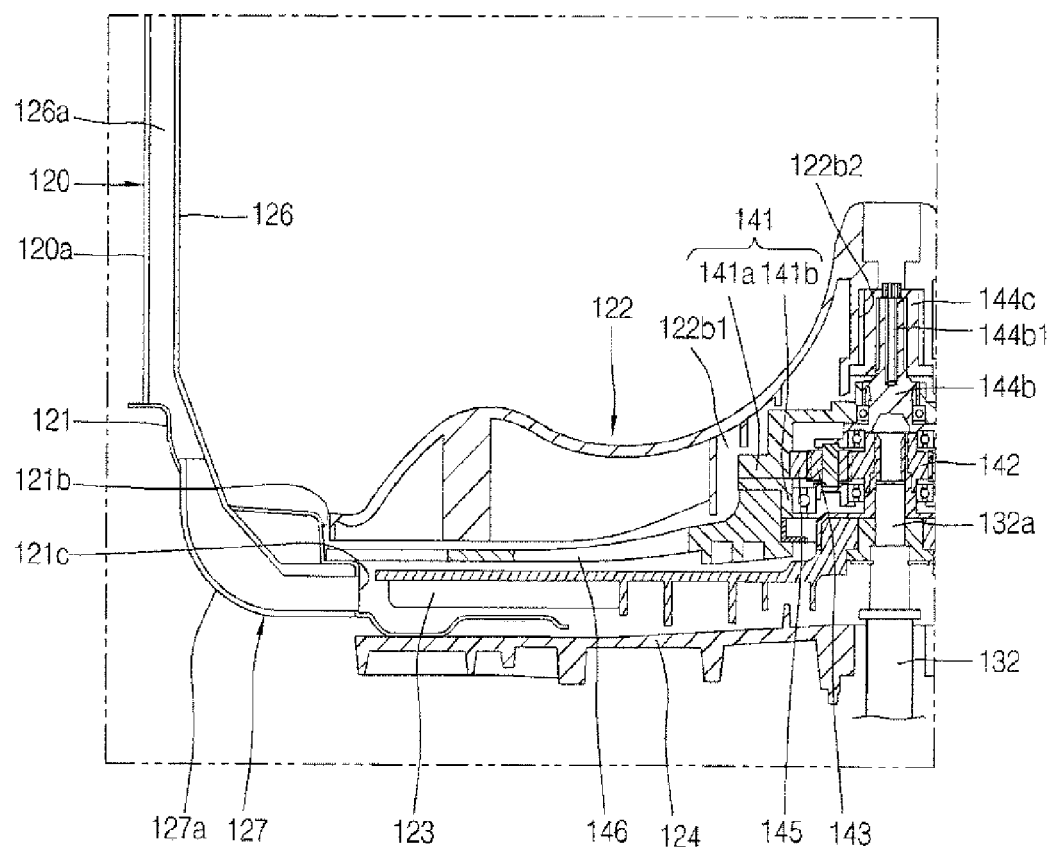

[Fig. 6]
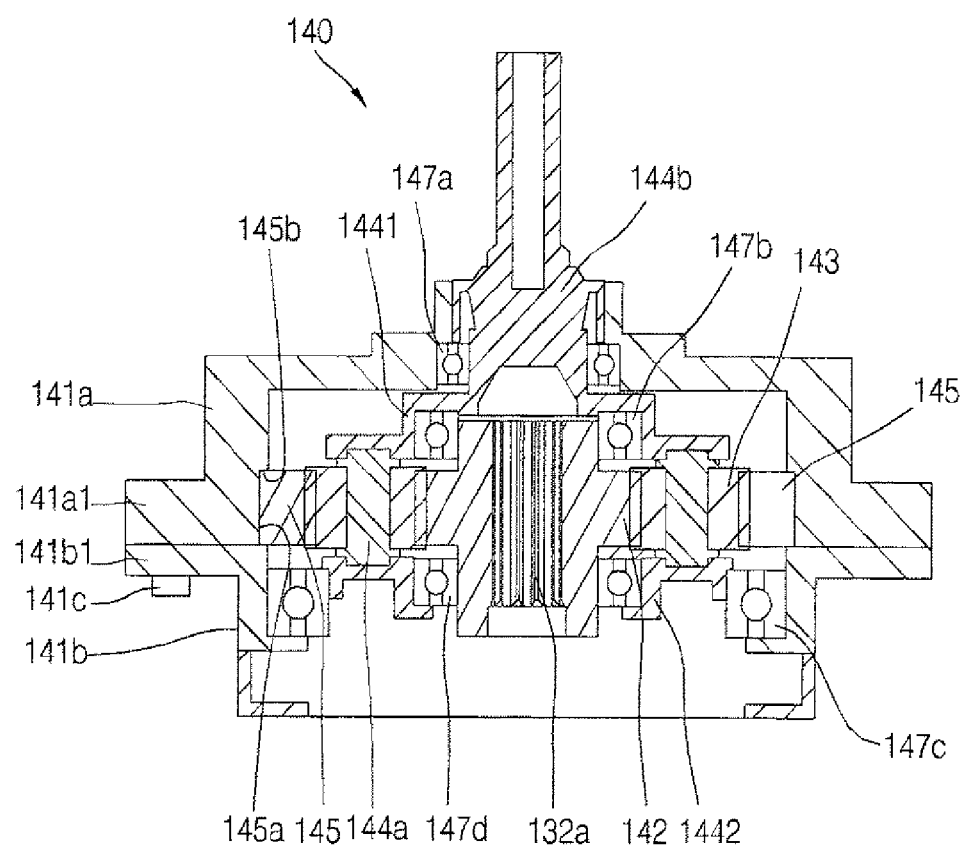

[Fig. 7]
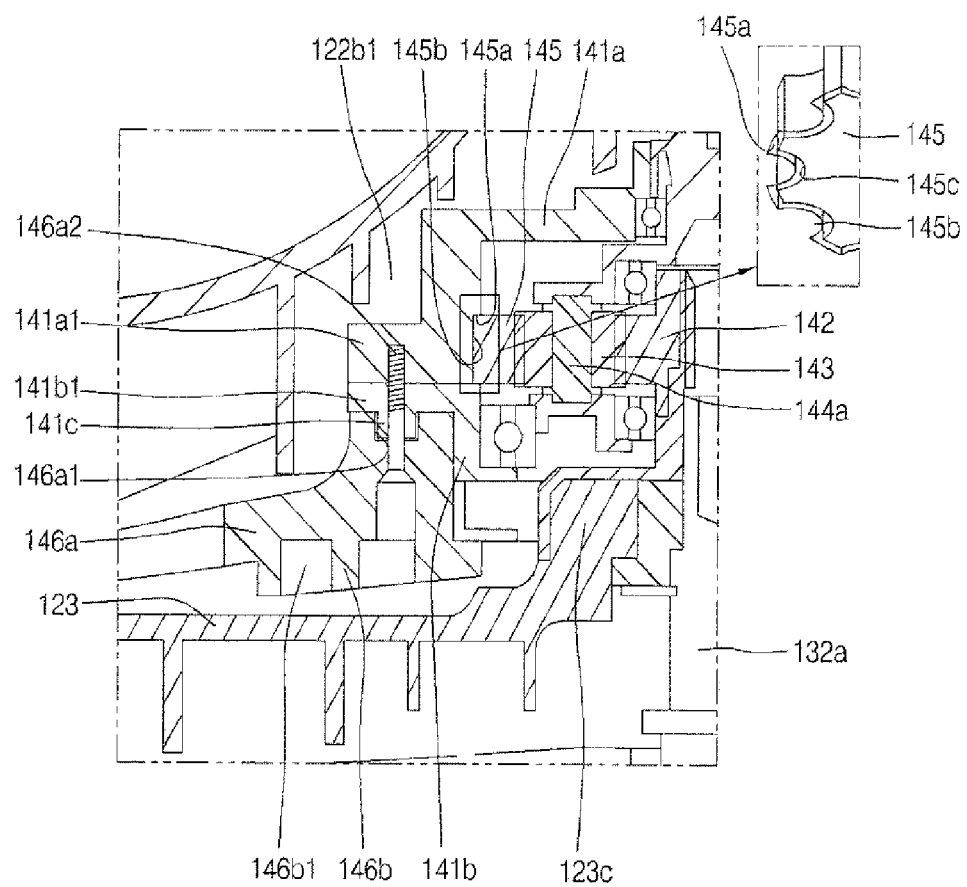

[Fig. 8a]
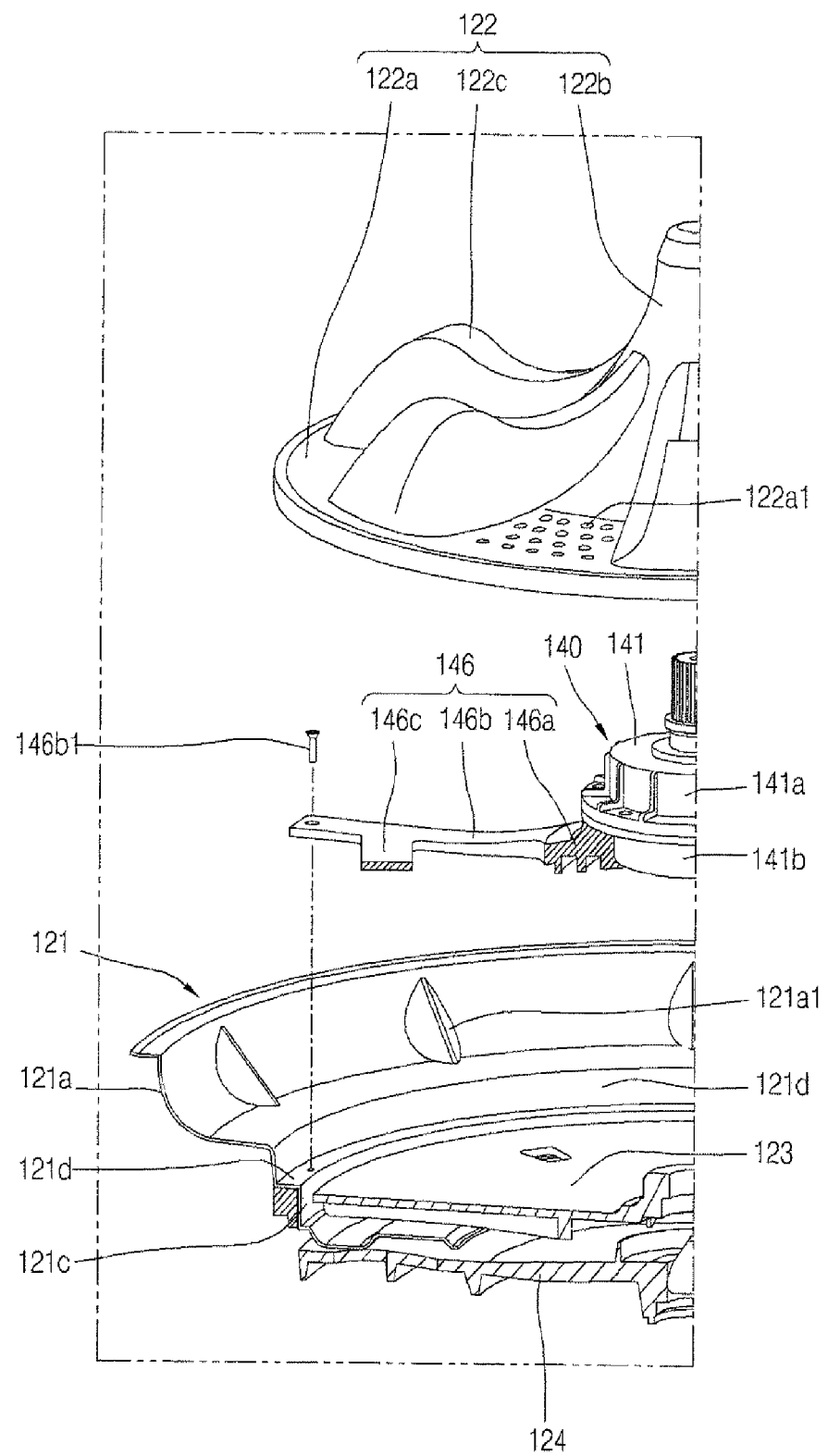

[Fig. 8b]
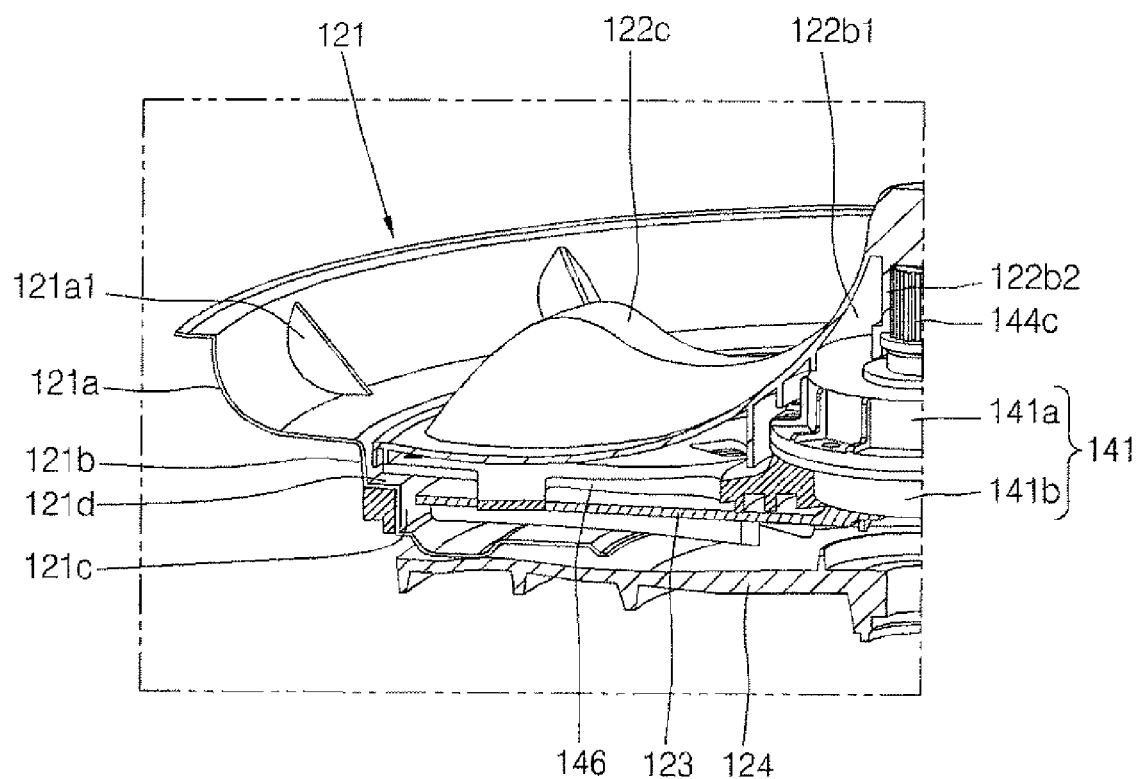

[Fig. 9a]
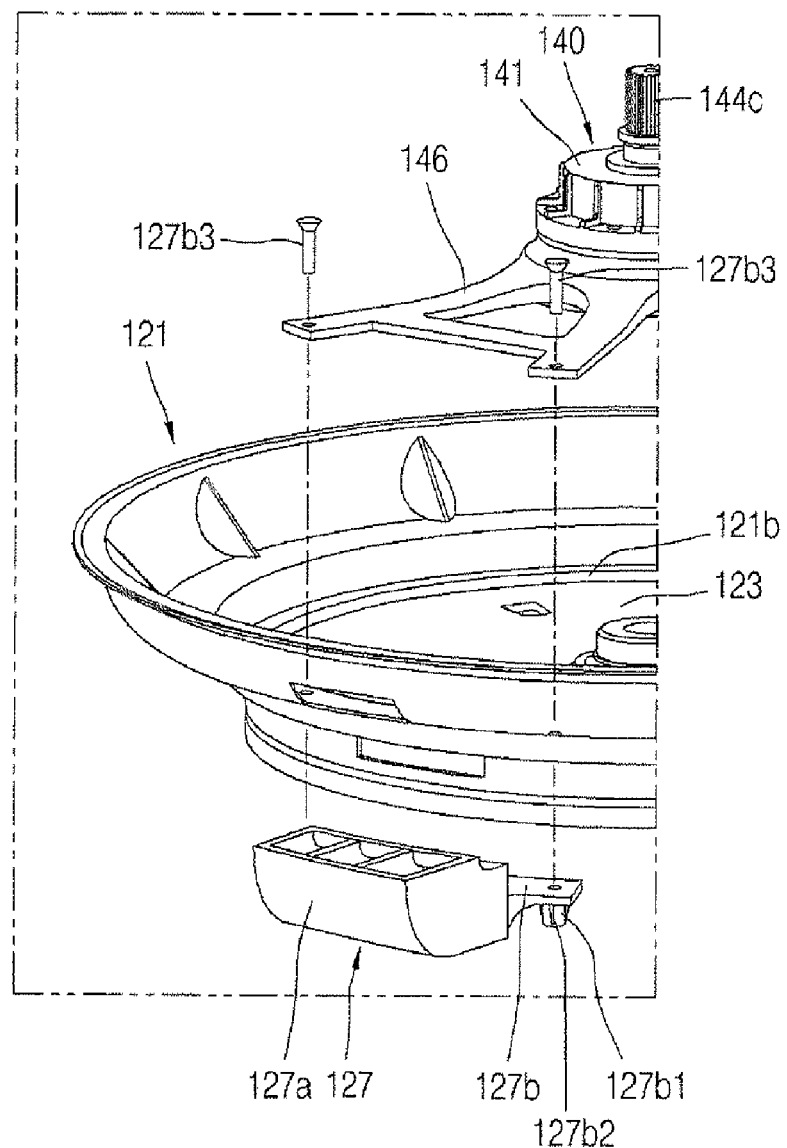

[Fig. 9b]
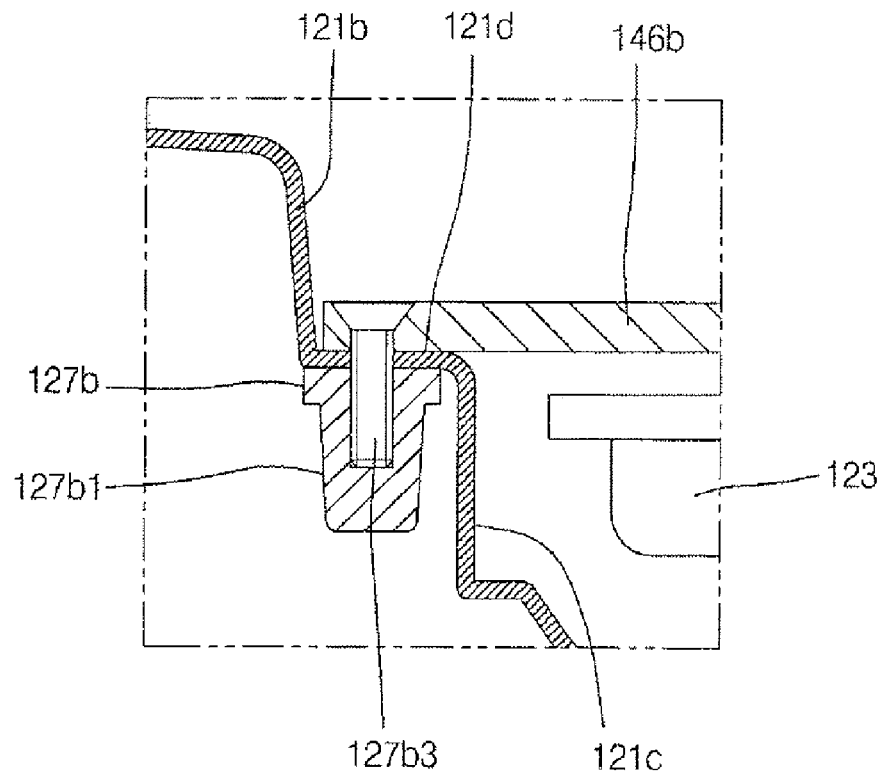
[Fig. 10]
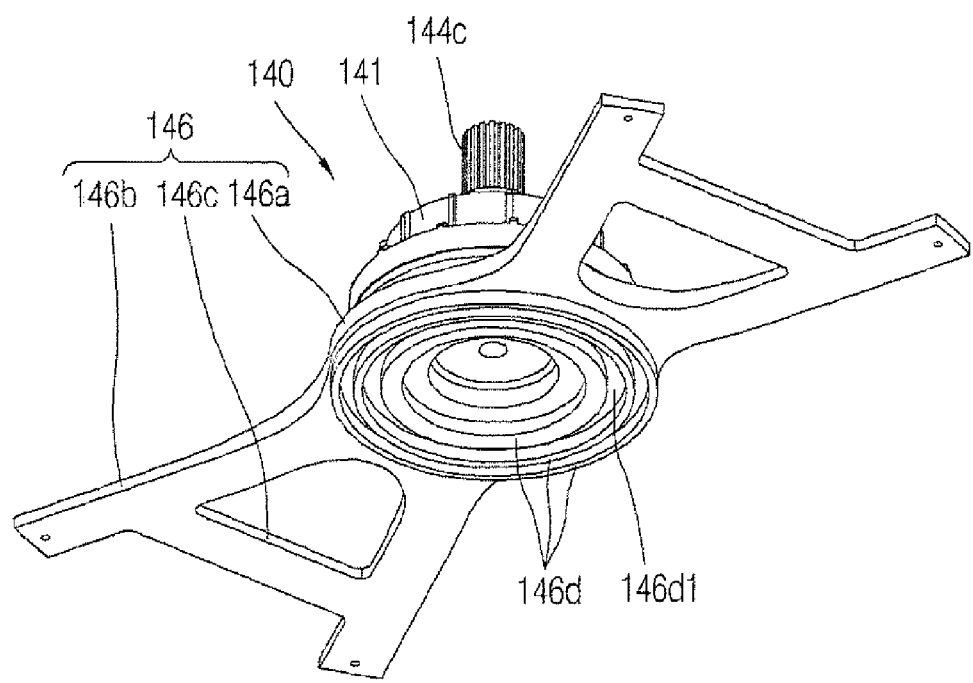

[Fig. 11]
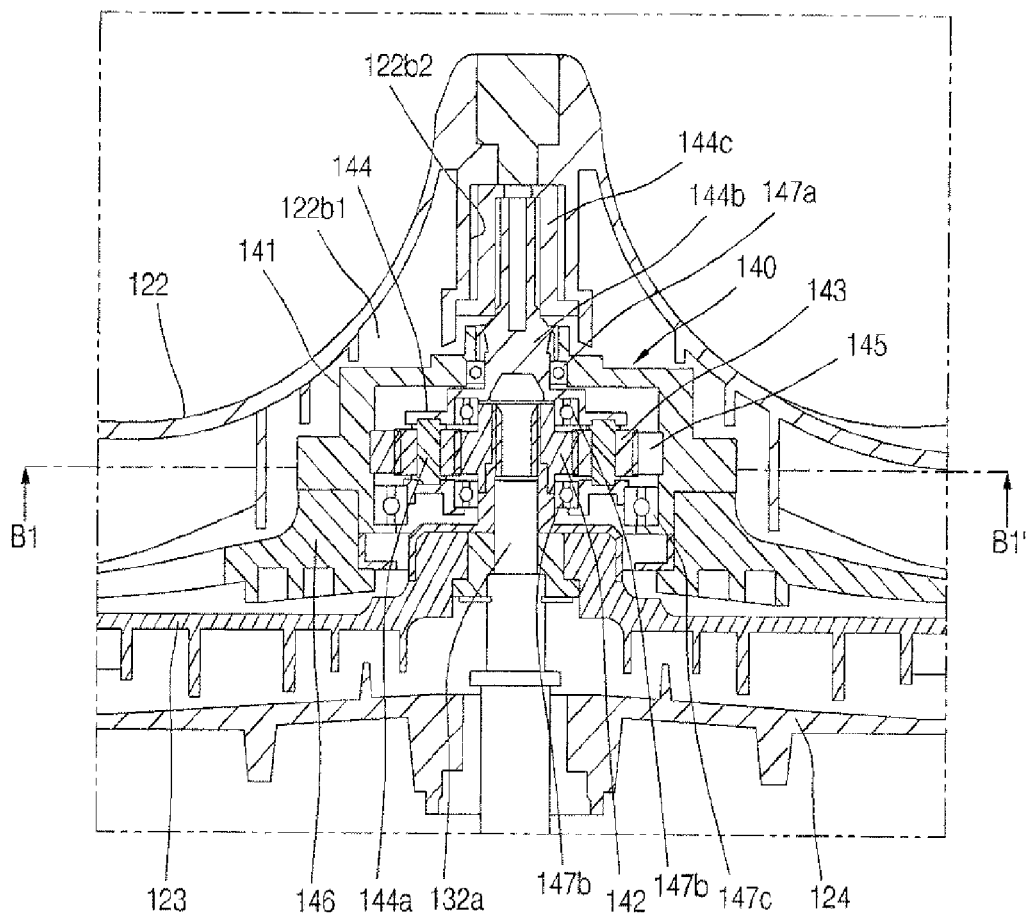

[Fig. 12]
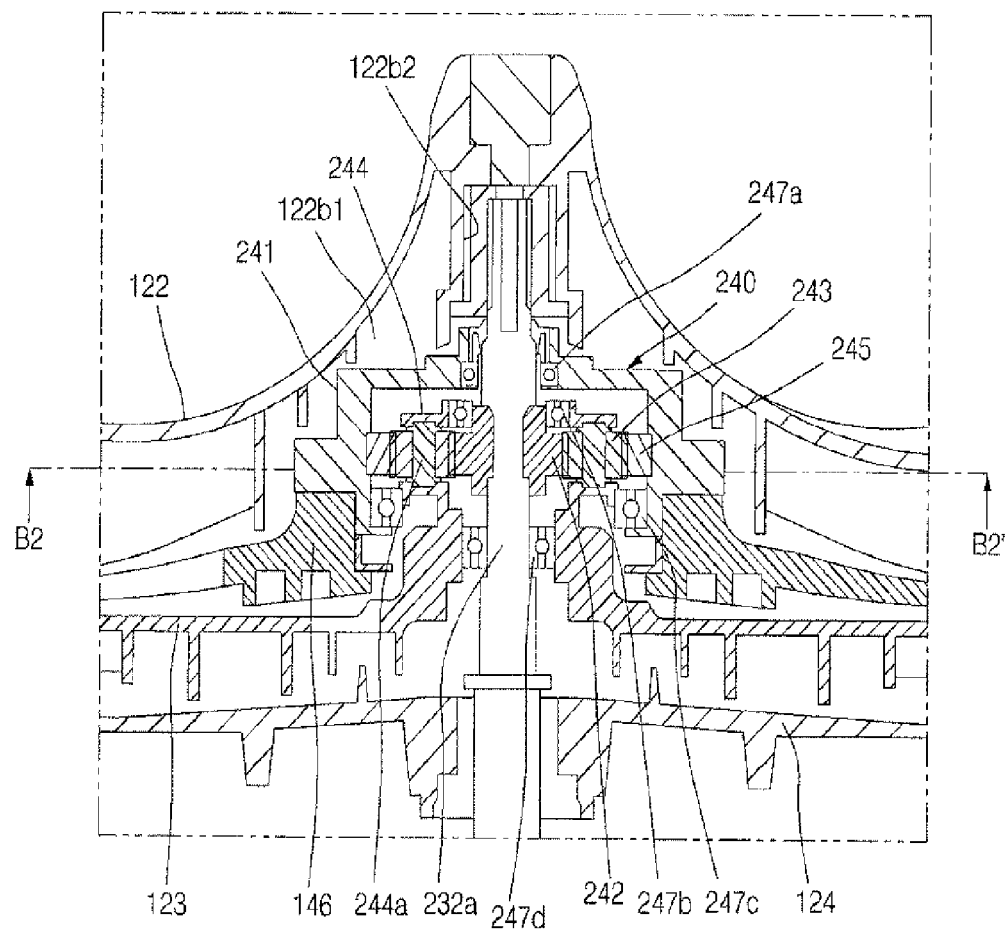

[Fig. 13]
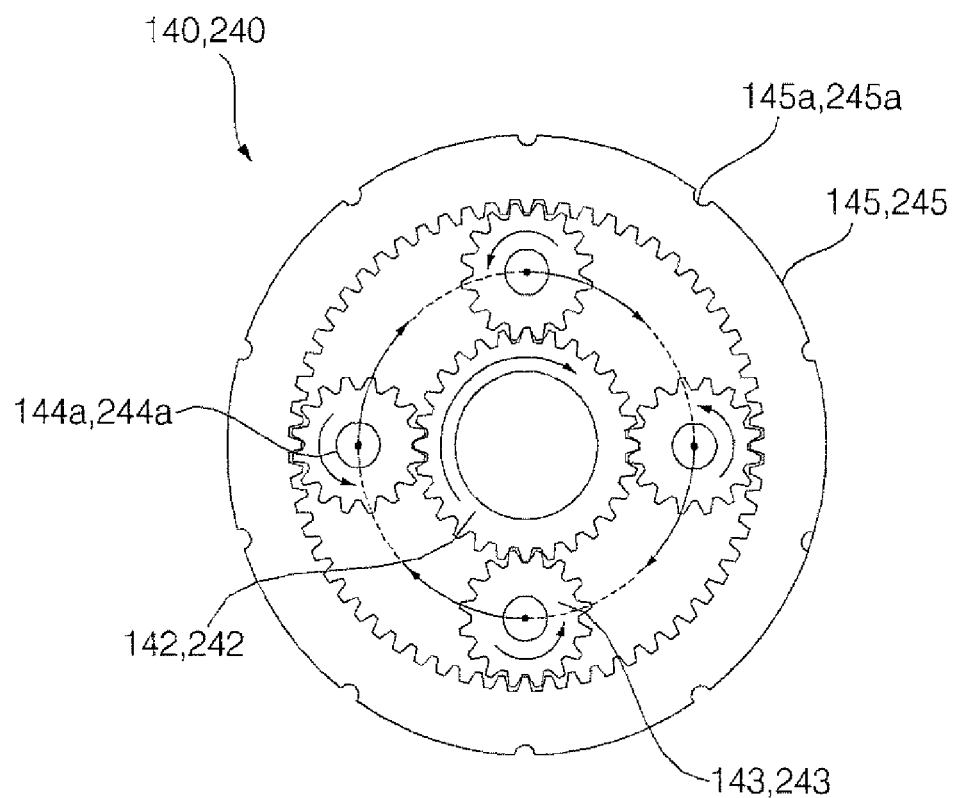

[Fig. 14]
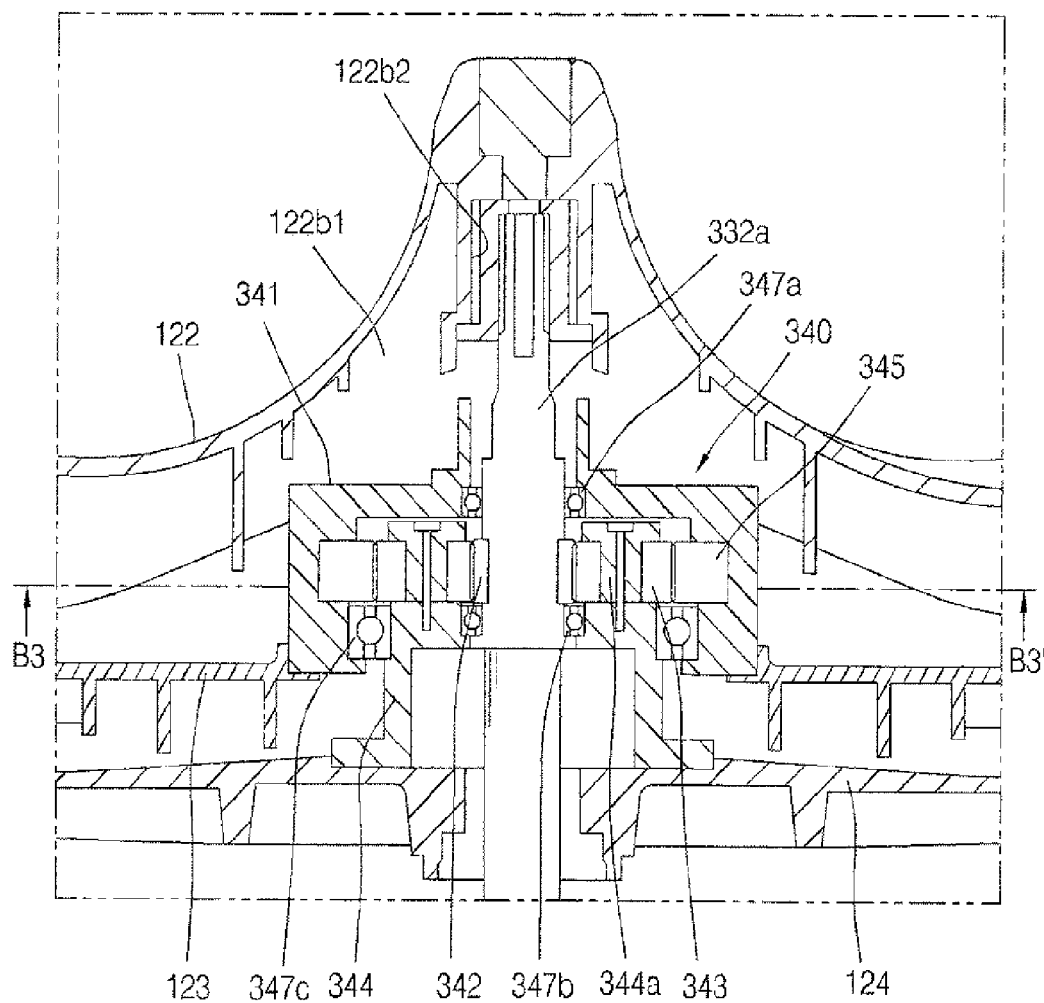

[Fig. 15]
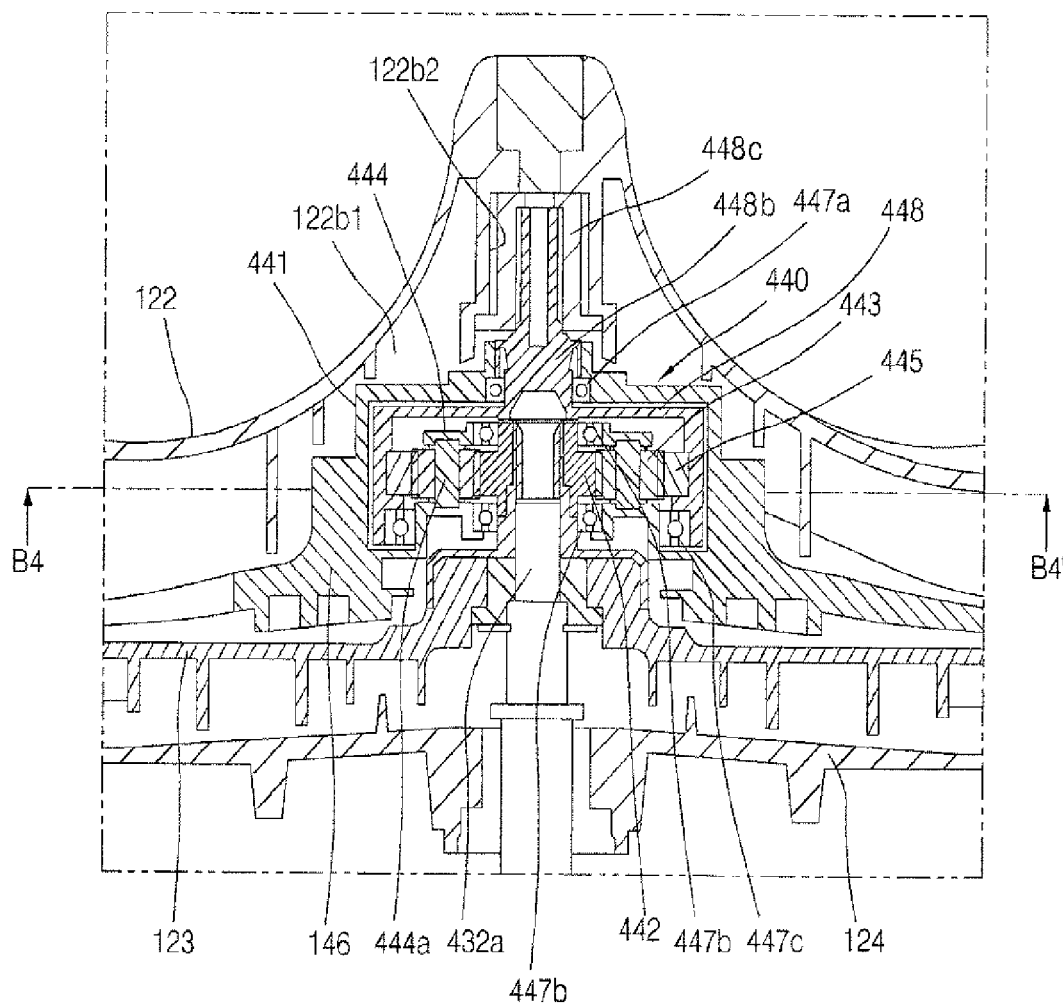

[Fig. 16]
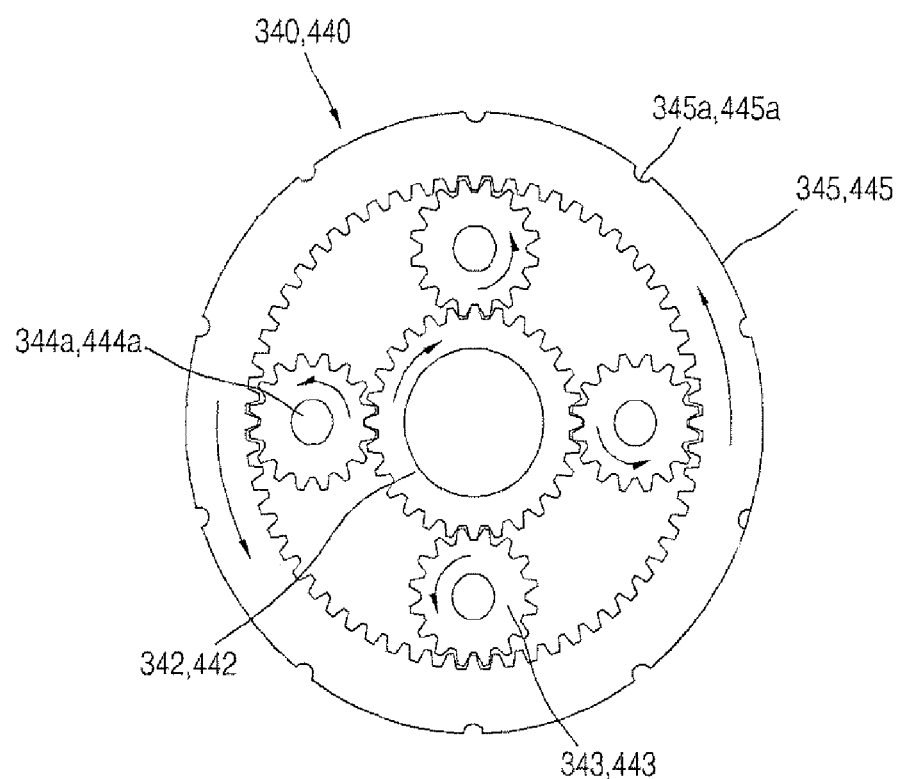

[Fig. 17a]
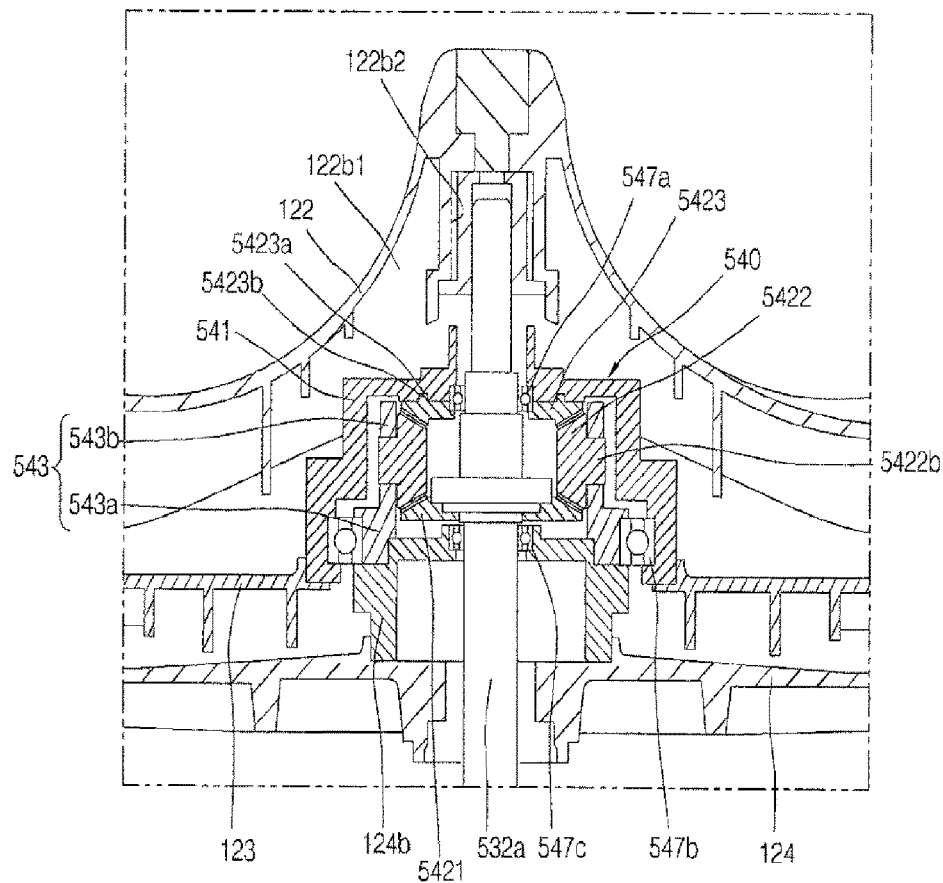
[Fig. 17b]
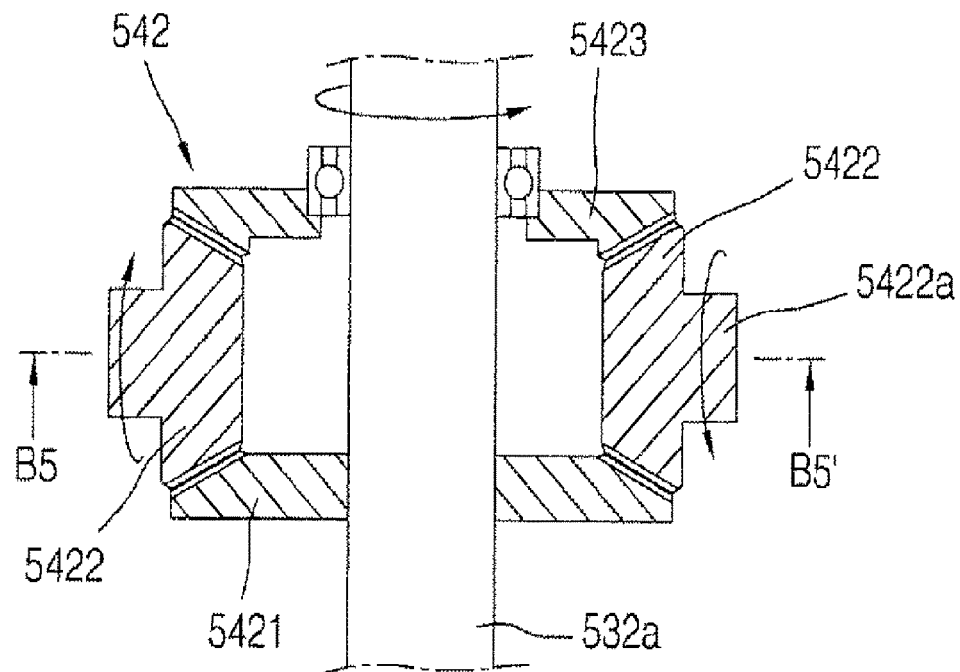

[Fig. 18a]
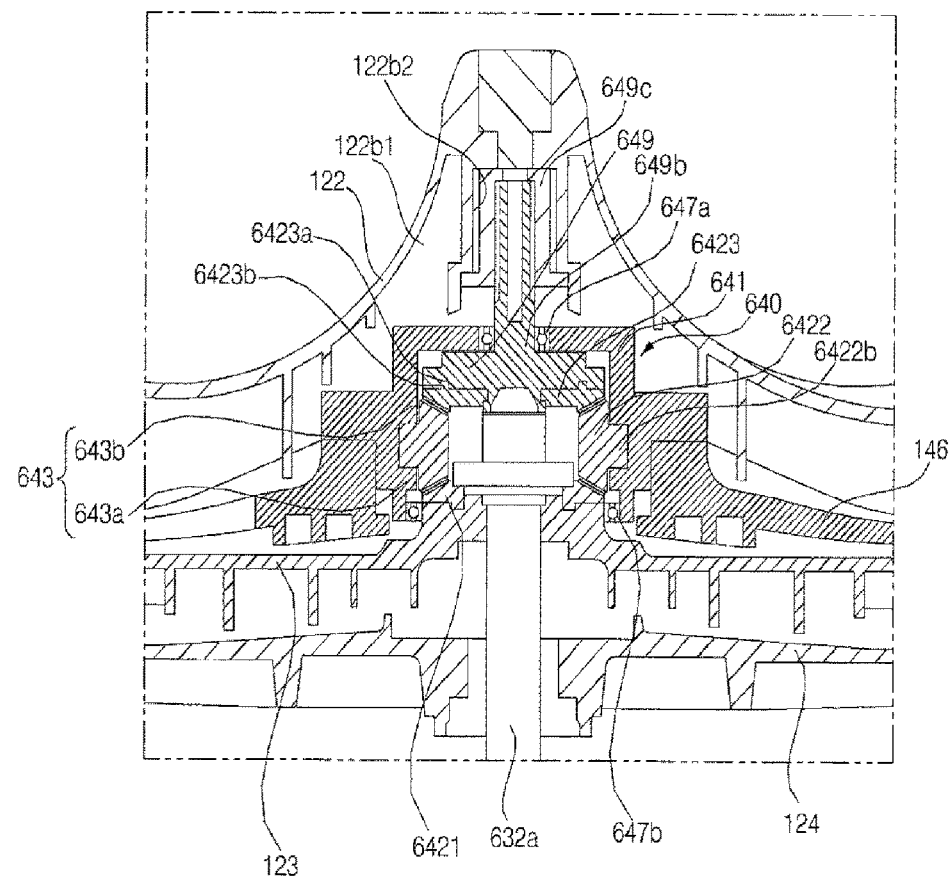
[Fig. 18b]
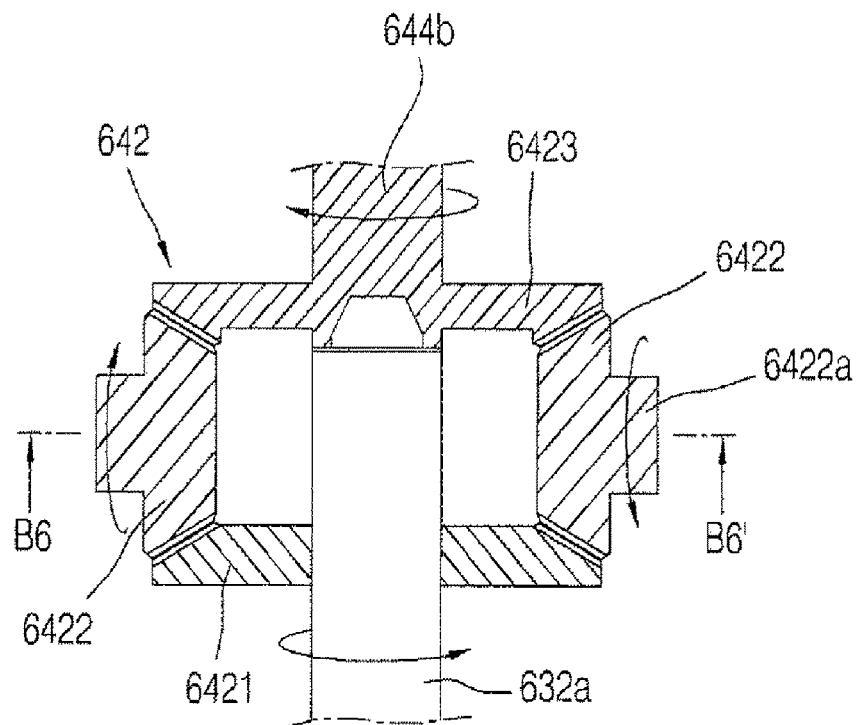

[Fig. 19]
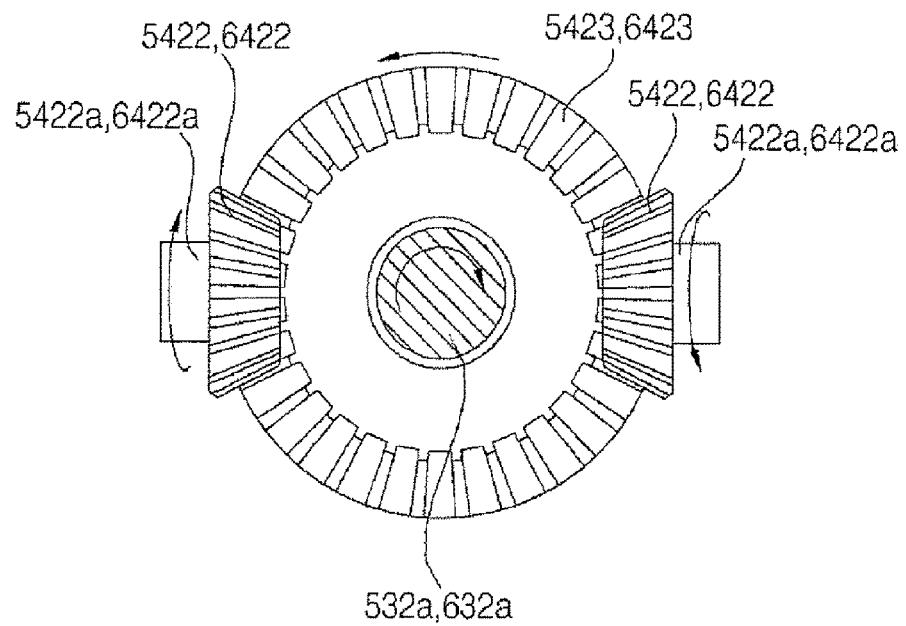
[Fig. 20a]
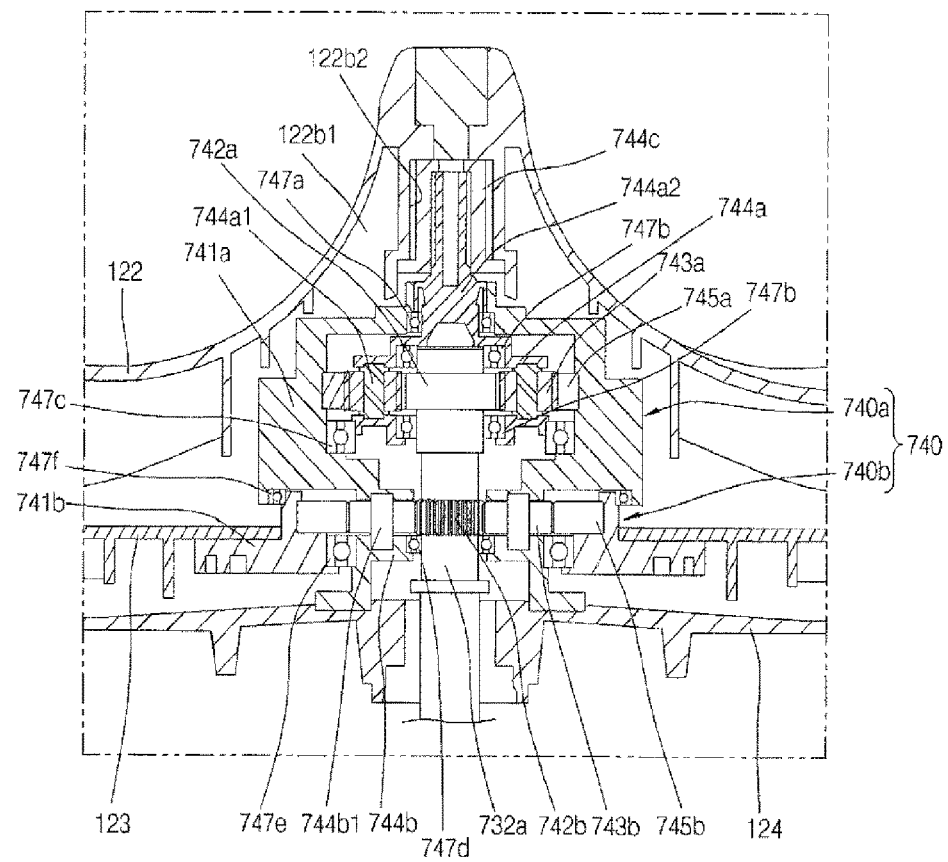

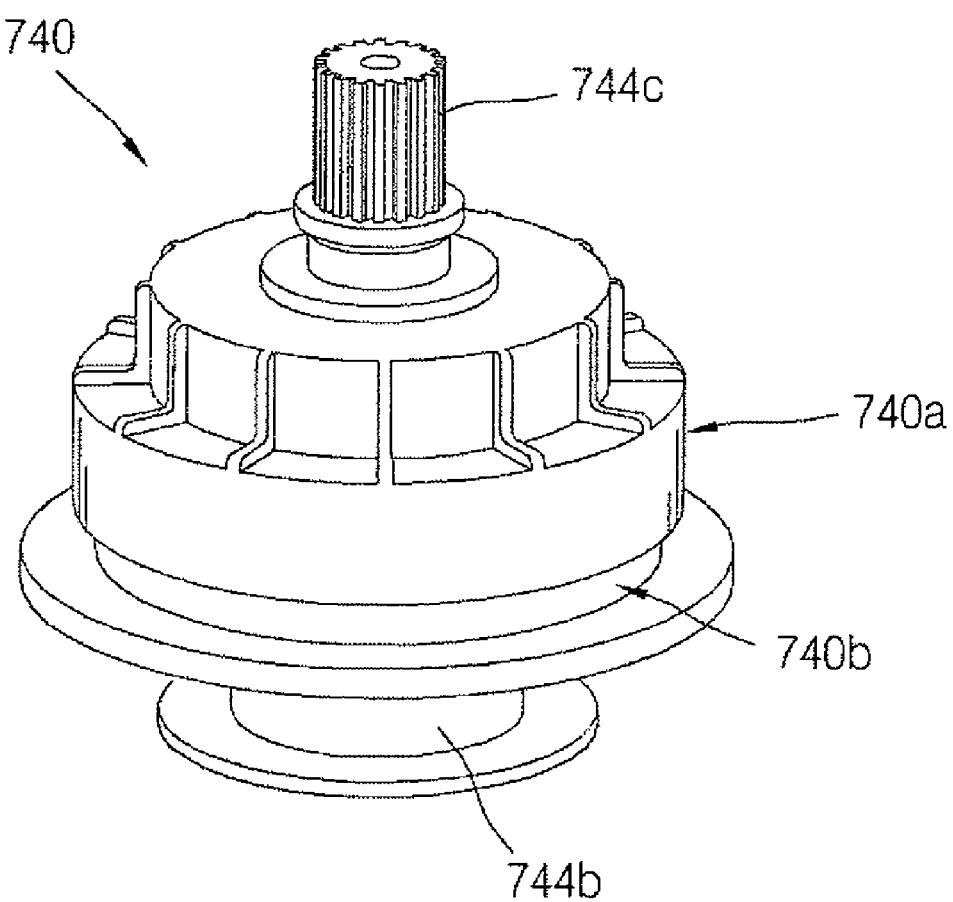
[Fig. 20b]

[Fig. 20c]
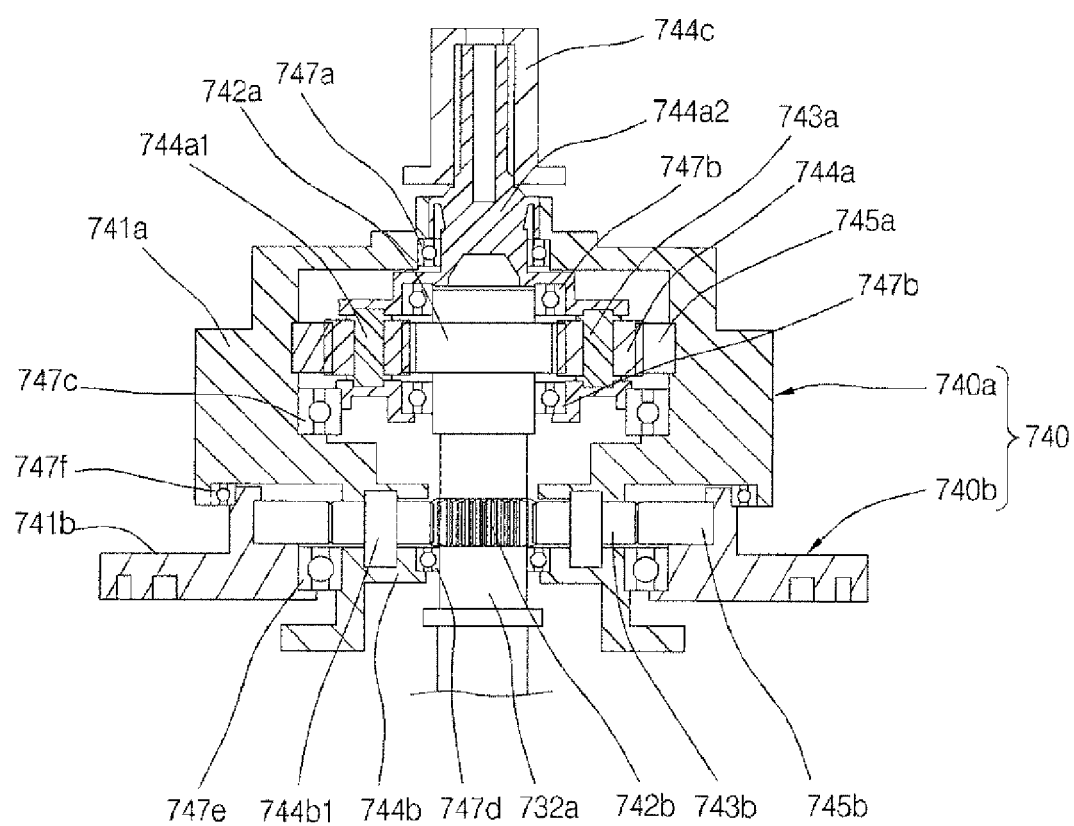

[Fig. 21]
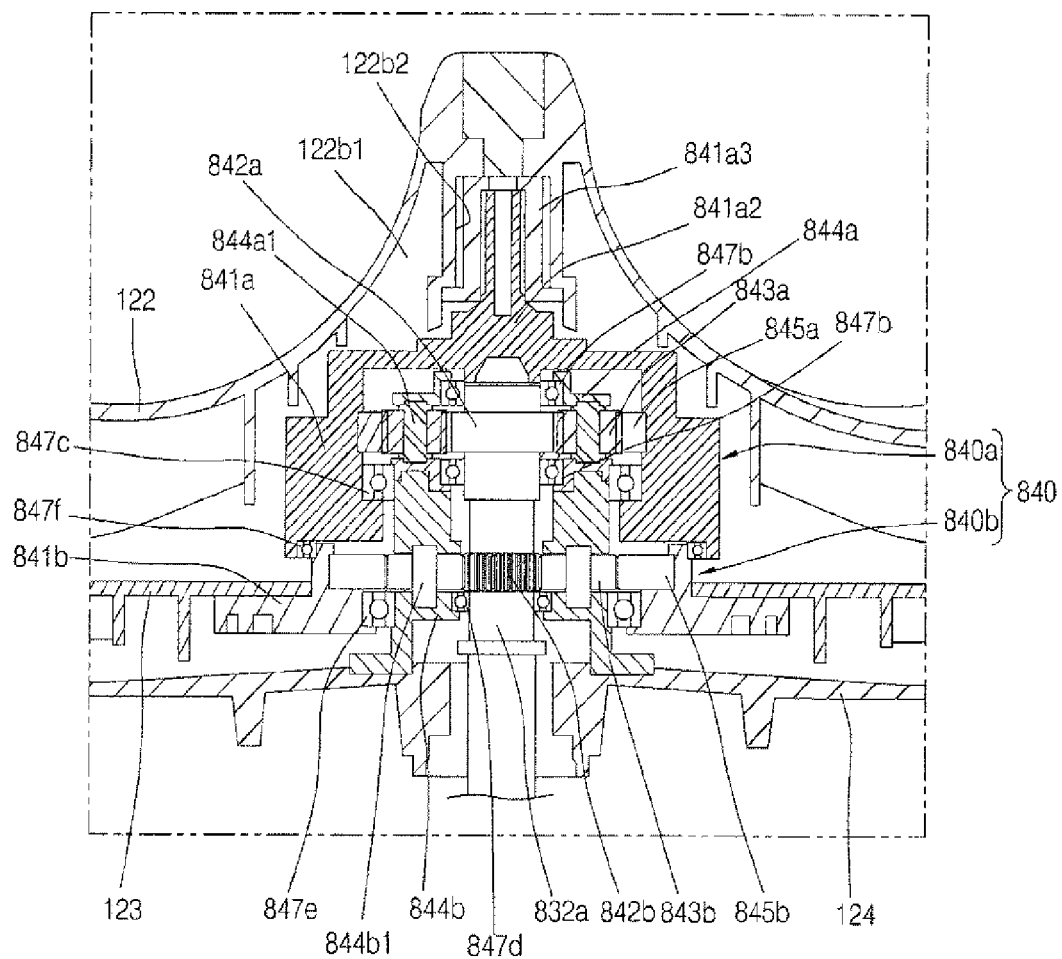

[Fig. 22]
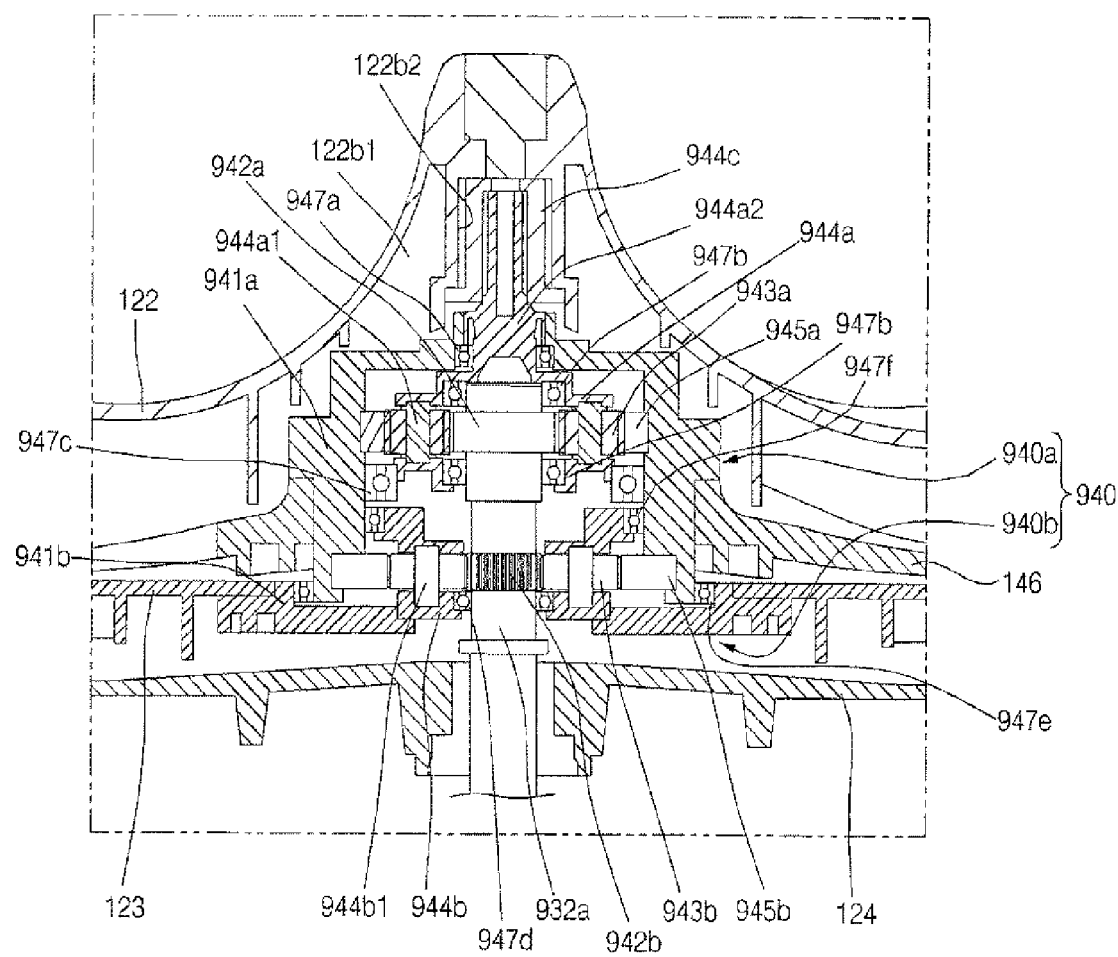

[Fig. 23]
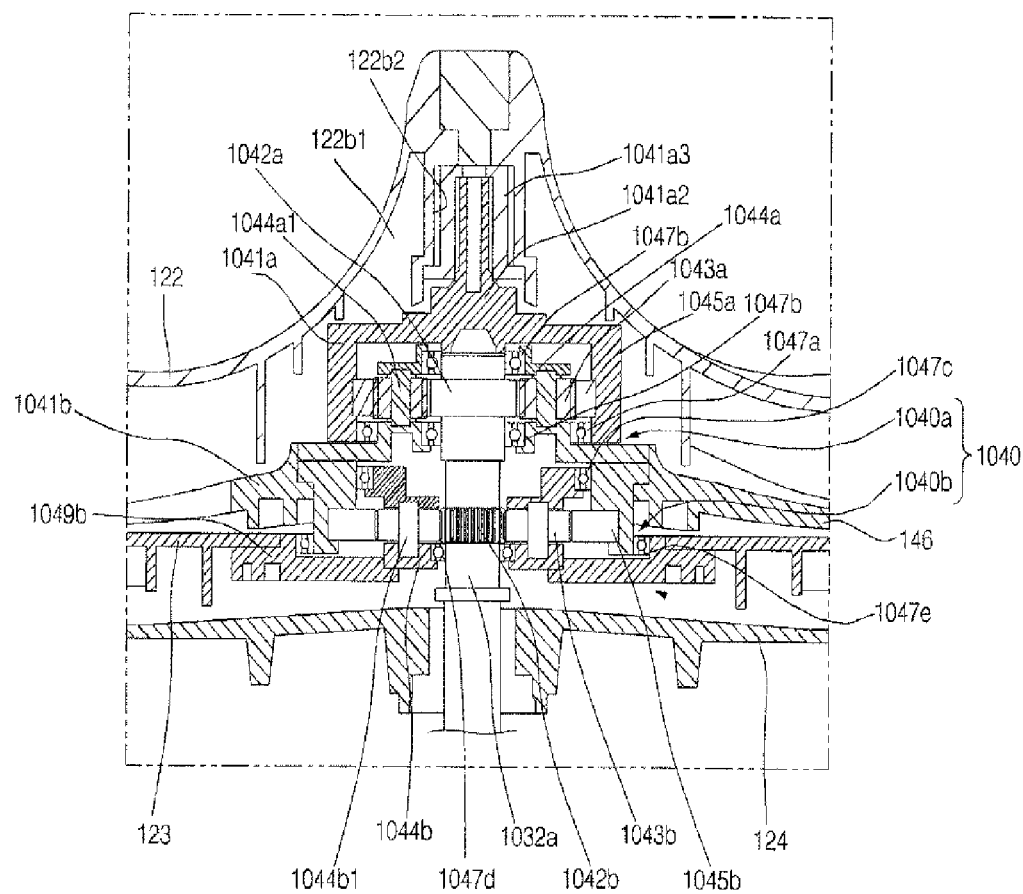

[Fig. 24]
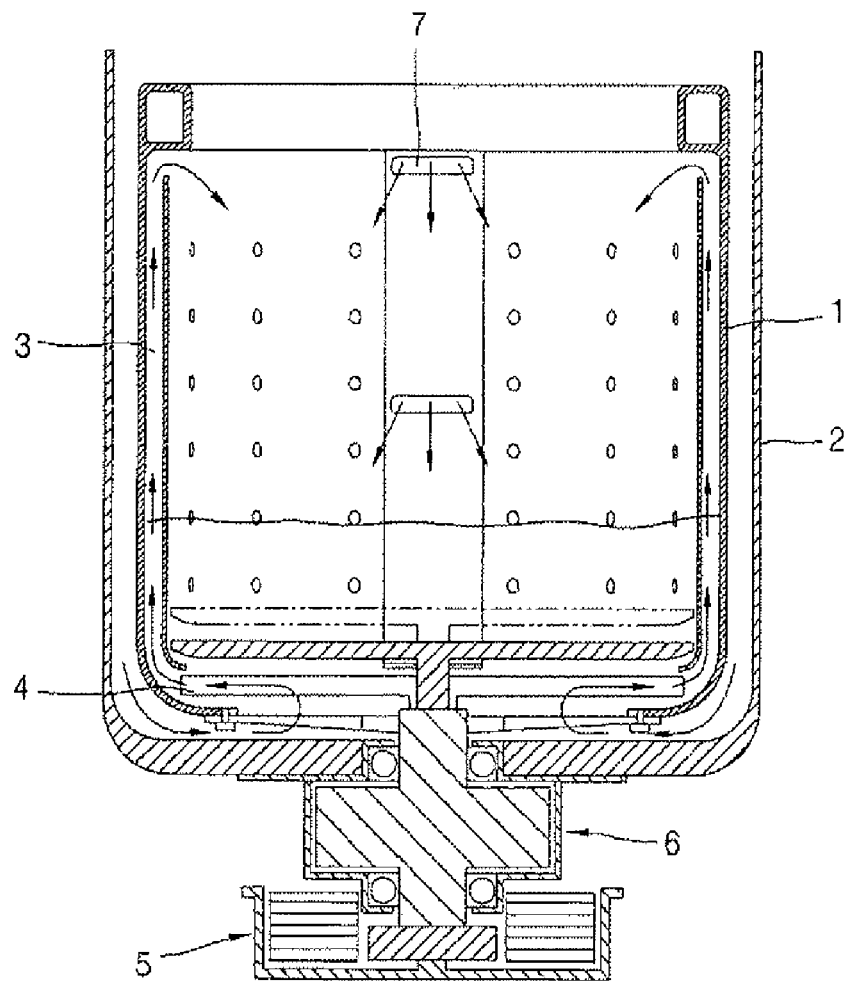

[Fig. 25]
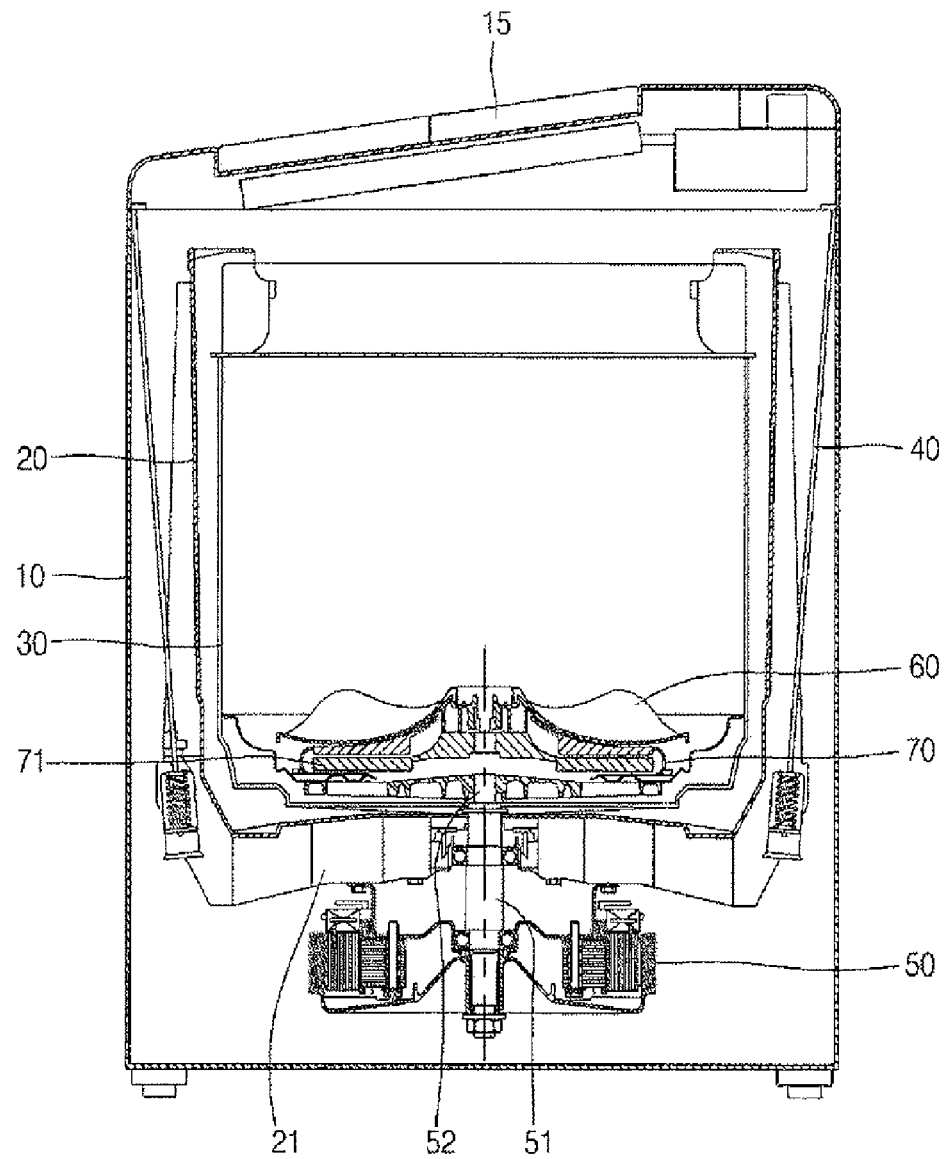

US 11,149,375 B2

WASHING MACHINE HAVING BLADE FOR CIRCULATING WASH WATER

CROSS-REFERENCE TO RELATED APPLICATIONS

This application is a National Stage application under 35 U.S.C. § 371 of International Application No. PCT/KR2016/011282, filed Oct. 8, 2016, which claims the benefit of Korean Application No. 10-2016-0119239, filed on Sep. 19, 2016, Korean Application No. 10-2016-0028420, filed on Mar. 9, 2016, Korean Application No. 10-2016-0027847, filed on Mar. 8, 2016, Korean Application No. 10-2015-0141716, filed on Oct. 8, 2015, and Korean Application No. 10-2015-0141715, filed on Oct. 8, 2015. The disclosures of the prior applications are incorporated by reference in their entirety.

TECHNICAL FIELD

The present invention relates to a washing machine for circulating wash water by pumping wash water to an upper portion of a washtub using centrifugal force.

BACKGROUND ART

Typically, a top loading washing machine refers to a washing machine that allows laundry to be inserted and retrieved through the top of the washing machine. The most typical type of top loading washing machine is a pulsator type washing machine. The pulsator type washing machine washes laundry washed in a washtub containing a detergent, wash water and the objects introduced thereinto, using wash water streams, and friction and an emulsification process, which are caused by the wash water streams. The wash water streams are generated when wash water is forcibly moved by the mechanical force of a rotating pulsator, installed inside the lower portion of the washtub.

The pulsator, which is rotated by a drive motor, may create various water streams in the washtub through forward and reverse rotations.

Conventionally, a washing machine provided with a circulation pump for pumping circulation water at the outside of a washtub separately from a drive motor has been developed. This washing machine may cause even a small amount of wash water to easily soak laundry (also referred to as "fabric") which are introduced into the washtub, by pumping up wash water positioned at the lower portion of the washtub such that wash water is sprayed from the upper portion of the washtub onto the fabric.

However, if the pump is provided separately from the drive motor, additional costs are taken for purchase of the pump. Thereby, production costs of the washing machine increase, and control operation becomes complex as the operation of the pump needs to be additionally controlled.

As shown in FIG. 24, Prior Art 1 discloses a washing plate 3 installed inside a washtub 1 to move up and down to pump wash water in a space between the washtub 1 and an outer tub 2, an impeller 4 rotatably installed in a lower portion of the washtub 1, and a power transmission means 6 for decreasing and transmitting the rotational speed of a drive motor 5 to an impeller 4. Wash water pumped by the washing plate 3 and the impeller 4 is raised through a flow guide channel 3 and is then supplied back to the washtub through a pumped water stream discharge hole 7.

As shown in FIG. 25, Prior Art 2 discloses a washing machine including a pulsator 60 rotatably provided in a drum 30, a drive motor 50 mounted to the exterior of the tub 20 to generate rotational power of the drum 30 and the pulsator 60, a water stream creation means 70 provided to a lower portion of the pulsator 60 to create a stream projected into the drum 30 as a direct stream. The water stream creation means 70 includes a centrifugal blade portion 71 to create a spouting pressure using centrifugal force produced by rotation. The centrifugal blade portion 71 and the pulsator 60 integrally rotate at the rotational speed of the drive motor 50.

PRIOR ART LITERATURE

Patent Document

Prior Art 1: Korean Patent Application Publication No. 2003-0049818 (Jun. 25, 2003)
Prior Art 2: Korean Patent Application Publication No. 2013-004 9094 (May 30, 2013).

Non-Patent Document

DISCLOSURE OF INVENTION

Technical Problem

In the case of conventional typical washing machines, dissolution of the detergent and soaking of the fabric are implemented simply through rotation of the pulsator with supplied wash water contained. Thereby, the solubility of the detergent is low and washing performance is thus degraded. In addition, it takes a large amount of time to dissolve the detergent and soak the fabric. Therefore, the present invention has been made in view of the above problems, and it is an object of the present invention to provide a washing machine capable of quickly implementing detergent dissolution and fabric soaking by providing a structure for creating water streams as well as a pulsator.

In conventional washing machines, wash water is supplied into an inner tub up to a relatively high level to dissolve the detergent and soak the fabric. Thereby, the amount of water used for washing increases. It is another object of the present invention to provide a washing machine that facilitates dissolution of the detergent and fabric soaking even with a small amount of water.

In conventional washing machines, when the inner tub is rotating with the laundry introduced into the inner tub and concentrated at one position, vibrations are generated in the inner tub. It is another object of the present invention to provide a washing machine capable of reducing exciting force generated by a pulsator to attenuate vibration generated in an inner tub assembly when laundry are concentrated at one position in the inner tub assembly.

In the case of Prior Art 1, contact between the impeller 4 and laundry is limited, and thus washing force according to friction is mitigated. It is another object of the present invention to provide a structure in capable of pumping wash water upward while generating fresh air force according to a contact between an impeller and the laundry.

In Prior Art 2, if the rate of rotation of the drive motor 50 is increased to increase the spouting pressure through the centrifugal blade portion 71, the rate of rotation of the pulsator 60 may excessively increase, thereby interfering with smooth washing, increasing the degree of wear of the laundry, and even excessively increasing load caused by the laundry. On the other hand, in Prior Art 2, if the rate of rotation of the drive motor 50 is limited so as not to increase the rate of rotation of the pulsator 60 beyond a predetermined value, the spouting pressure according to the centrifugal blade portion 71 is also limited. That is, in Prior Art 2, since the centrifugal blade portion 71 and a pulsator 60 integrally rotate, both increasing and decreasing the number of revolutions per minute of the drive motor 50 may cause a problem. It is another object of the present invention to provide a pulsator and a blade structure which rotate separately from each other.

In the case where a pulsator and a blade structure which rotate separately using two drive motors are provided, additional costs of components of the drive motors are taken, and the whole shaft structure for transmitting power from the drive motors needs to be changed. Further, motor control is additionally required. Therefore, it is another object of the present invention to provide a structure for transmitting power from one drive motor.

It is another object of the present invention to provide a washing machine that provides both the function of increasing the pumping pressure and the function of limiting the rate of rotation of the pulsator by increasing the number of revolutions per minute of a blade and decreasing the number of revolutions per minute of a pulsator using power from the same drive motor.

It is another object of the present invention to provide a washing machine which may enhance the functions of detergent dissolution, fabric soaking and washing through complex water streams created by rotating a blade and a pulsator in different directions using power from the same drive motor.

It is another object of the present invention to provide a power transmission structure which may be designed by adjusting the number of revolutions per minute of a blade and the pulsator with a desired reduction ratio using the power from the same drive motor.

It is another object of the present invention to provide a support structure for supporting a structure for transmitting power to a blade and a pulsator using the power from the same drive motor, while not interfering with flow of water streams.

Solution to Problem

In accordance with an aspect of the present invention, the above and other objects can be accomplished by the provision of a washing machine including an inner tub assembly for accommodating laundry, a pulsator rotatably provided to an inner lower portion of the inner tub assembly, a blade installed below the pulsator to be rotatable independently from the pulsator, the blade being configured to pump wash water to raise the wash water to an upper end of the inner tub assembly, a drive motor providing rotational power to the pulsator and the blade, and a power transmission unit transmitting power of the drive motor to the pulsator and the blade, respectively.

The power transmission unit includes a first planetary gear module transmitting a rotational speed of the drive motor to the pulsator by decreasing the rotational speed, and a second planetary gear module transmitting the rotational speed of the drive motor to the blade by decreasing the rotational speed.

The first planetary gear module transmits power to the pulsator such that a rotational speed of the pulsator is decreased, and The second planetary gear module transmits power to the blade such that a rotational speed of the blade is decreased.

Referring to seventh to tenth embodiments, which will be described later, the first planetary gear module may be disposed at an upper side of the second planetary gear module.

Referring to the seventh to tenth embodiments, which will be described later, the washing machine may further include a washing shaft transmitting the rotational power of the drive motor. The first planetary gear module may include a first sun gear connected to the washing shaft and integrally rotating with the washing shaft, a first planetary gear rotating by being engaged with an outer circumferential surface of the first sun gear, a first carrier connecting the first planetary gear using a first planetary gear connection shaft, the first planetary gear connection shaft being coupled with the first planetary gear by penetrating a center portion of the first planetary gear, and a first ring gear having an inner side engaged with the first planetary gear, the first planetary gear being inscribed in the first ring gear. The second planetary gear module may include a second sun gear connected to the washing shaft and integrally rotating with the washing shaft, a second planetary gear rotating by being engaged with an outer circumferential surface of the second sun gear, a second carrier connecting the second planetary gear using a second planetary gear connection shaft, the second planetary gear connection shaft being coupled with the second planetary gear by penetrating a center portion of the second planetary gear, and a second ring gear having an inner side engaged with the second planetary gear, the second planetary gear being inscribed in the second ring gear.

The first planetary gear module transmits power to the pulsator such that a rotational speed of the pulsator is lower than a rotational speed of the drive motor, and the second planetary gear module transmits power to the blade such that a rotational speed of the blade is lower than a rotational speed of the drive motor.

Referring to the seventh to tenth embodiments, which will be described later, the pulsator may integrally rotate with one of the first carrier and the first ring gear. The other one of the first carrier and the first ring gear may be fixed to the inner tub assembly.

Referring to the seventh to tenth embodiments, which will be described later, the pulsator may integrally rotate with one of the first carrier and the first ring gear. The other one of the first carrier and the first ring gear may be fixed to one of the second carrier and the second ring gear.

Referring to the seventh to tenth embodiments, which will be described later, the blade may integrally rotate with one of the second carrier and the second ring gear. The other one of the second carrier and the second ring gear may be fixed to the inner tub assembly.

Referring to the seventh to tenth embodiments, which will be described later, the blade may integrally rotate with one of the second carrier and the second ring gear. The other one of the second carrier and the second ring gear may be fixed to one of the first carrier and the first ring gear.

Referring to the seventh to tenth embodiments, which will be described later, the pulsator may integrally rotate with one of the first carrier and the first ring gear. The blade may integrally rotate with one of the second carrier and the second ring gear. The other one of the first carrier and the first ring gear may be fixed to the other one of the second carrier and the second ring gear. The other one of the second carrier and the second ring gear may be fixed to the inner tub assembly.

Referring to the seventh to tenth embodiments, which will be described later, the power transmission unit may transmit power such that a direction of rotation of the pulsator is opposite to a direction of rotation of the blade.

Referring to the seventh embodiment, which will be described later, the pulsator may integrally rotate with the first carrier. The blade may integrally rotate with the second ring gear. The first ring gear, the second carrier and the inner tub assembly may be fixed by each other.

Referring to the tenth embodiment, which will be described later, the pulsator may integrally rotate with the first ring gear. The blade may integrally rotate with the second carrier. The first carrier, the second ring gear and the inner tub assembly may be fixed by each other.

Referring to the seventh, eighth and tenth embodiments, which will be described later, the first planetary gear module may include a first gearbox housing accommodating the first sun gear, the first planetary gear, the first ring gear and the first carrier. The second planetary gear module may include a second gearbox housing accommodating the second sun gear, the second planetary gear, the second ring gear and the second carrier. The first gearbox housing and the second gearbox housing may be rotatable relative to each other.

Referring to the seventh and ninth embodiments, which will be described later, the first planetary gear module may include a first gearbox housing accommodating the first sun gear, the first planetary gear, the first ring gear and the first carrier. The first ring gear may be fixed to the first gearbox housing. The first carrier forms an upper connection shaft penetrating an upper surface of the first gearbox housing. The pulsator receives rotational power transmitted from the first carrier via the upper connection shaft.

Referring to the eighth and tenth embodiments, which will be described later, the first planetary gear module may include a first gearbox housing accommodating the first sun gear, the first planetary gear, the first ring gear and the first carrier. The first ring gear may be fixed to the first gearbox housing. The first gearbox housing may form an upper connection shaft. The pulsator may receive rotational power transmitted from the first gearbox housing via the upper connection shaft.

Referring to the seventh and eighth embodiments, which will be described later, the second planetary gear module may include a second gearbox housing accommodating the second sun gear, the second planetary gear, the second ring gear and the second carrier. The second ring gear may be fixed to the second gearbox housing. The blade may be fixed to the second gearbox housing.

Referring to the seventh and eighth embodiments, which will be described later, the second carrier may be fixedly coupled with a lower surface of the inner tub assembly.

Referring to the ninth and tenth embodiments, which will be described later, the second planetary gear module may include a second gearbox housing accommodating the second sun gear, the second planetary gear, the second ring gear and the second carrier. The second ring gear may be fixed to the second gearbox housing. The blade may be fixed to the second carrier at a lower side of the second gearbox housing.

Referring to the ninth and tenth embodiments, which will be described later, the washing machine may further include a jig provided between the pulsator and the blade and extending from an outer circumferential portion of the power transmission unit in a radial direction of the inner tub assembly, the jig being fastened to an inner bottom surface of the inner tub assembly. The second gearbox housing may be fixed to the jig.

When viewed from an upper side of the pulsator, the blade may be disposed to be fully hidden.

The washing machine may further include a wash water circulation module for guiding the wash water moved by the blade to an upper side of the inner tub assembly to spray the wash water.

BRIEF DESCRIPTION OF DRAWINGS

The above and other objects, features and other advantages of the present invention will be more clearly understood from the following detailed description taken in conjunction with the accompanying drawings, in which:

FIG. 1 is a cross-sectional view of a washing machine according to an embodiment of the present invention, seen from a lateral side of the washing machine;

FIG. 2A is a perspective view illustrating a pulsator and a circulation duct provided in an inner tub assembly of FIG. 1;

FIG. 2B is a cross-sectional view, taken along line A-A' of FIG. 2A;

FIG. 3 is an exploded view of FIG. 2A;

FIG. 4 is a perspective view illustrating a jig 146 of FIG. 3 seated on a seating surface of a base;

FIG. 5 is an enlarged cross-sectional view illustrating a part of FIG. 2B;

FIG. 6 is a cross-sectional view illustrating a power transmission unit of FIG. 2B;

FIG. 7 is a cross-sectional view illustrating fastening between the gearbox housing and jig of FIG. 5:

FIG. 8A is an exploded perspective view illustrating the pulsator and jig of FIG. 5 before being seated on the seating surface of a base;

FIG. 8B is a cut-away perspective view illustrating the pulsator and jig of FIG. 5, which are seated on the seating surface of a base;

FIG. 9A, is a perspective view illustrating a jig and a wash water discharge portion before being triple-fastened to the base of FIG. 4;

FIG. 9B is a cross-sectional view illustrating the jig and wash water discharge portion triple-fastened to the base of FIG. 4;

FIG. 10 is a bottom perspective view illustrating an air gap formed in the bottom surface of the jig of FIG. 4;

FIG. 11 is a cross-sectional view illustrating a power transmission unit according to a first embodiment of the present invention;

FIG. 12 is a cross-sectional view illustrating a power transmission unit according to a second embodiment of the present invention;

FIG. 13 is a conceptual cross-sectional view illustrating rotation of a plurality of gears engaged with each other, taken along line B1-B1' of FIG. 11 and line B2-B2' of FIG. 12;

FIG. 14 is a cross-sectional view illustrating a power transmission unit according to a third embodiment of the present invention;

FIG. 15 is a cross-sectional view illustrating a power transmission unit according to a fourth embodiment of the present invention;

FIG. 16 is a conceptual cross-sectional view illustrating rotation of a plurality of gears engaged with each other, taken along line B3-B3' of FIG. 14 and line B4-B4' of FIG. 15;

FIG. 17A is a cross-sectional view illustrating a power transmission unit according to a fifth embodiment of the present invention;

FIG. 17B is a conceptual cross-sectional view illustrating rotation of a plurality of bevel gears of FIG. 17A engaged with each other;

FIG. 18A is a cross-sectional view illustrating a power transmission unit according to a sixth embodiment of the present invention;

FIG. 18B is a conceptual cross-sectional view illustrating rotation of a plurality of bevel gears of FIG. 18A engaged with each other;

FIG. 19 is a conceptual cross-sectional view illustrating rotation of a plurality of bevel gears engaged with each other, taken along line B5-B5' of FIG. 17B and line B6-B6' of FIG. 18B;

FIG. 20A is a cross-sectional view illustrating a power transmission unit according to a seventh embodiment of the present invention;

FIG. 20B is a perspective view illustrating the power transmission unit of FIG. 20A;

FIG. 20C is a cross-sectional view illustrating the power transmission unit of FIG. 20A;

FIG. 21 is a cross-sectional view illustrating a power transmission unit according to an eighth embodiment of the present invention;

FIG. 22 is a cross-sectional view illustrating a power transmission unit according to a ninth embodiment of the present invention;

FIG. 23 is a cross-sectional view illustrating a power transmission unit according to a tenth embodiment of the present invention;

FIG. 24 is a view disclosed in Prior Art 1; and

FIG. 25 is a view disclosed in Prior Art 2.

BEST MODE FOR CARRYING OUT THE INVENTION

Reference will now be made in detail to the preferred embodiments of a washing machine related to the present invention with reference to the accompanying drawings. Wherever possible, the same reference numbers will be used even in different embodiments throughout the specification to refer to the same or like parts, and redundant description thereof will not be given. A singular expression includes a plural expression unless the two expressions are contextually different from each other.

Throughout the application, the use of ordinal numbers such as "first," "second," "third" and so on serves to distinguish between respective elements rather than to denote particular ordering, importance or priorities of those elements. For example, it is possible to implement a display apparatus including only a second element without a first element.

When one component is mentioned as being "fixed" to another, it should be understood that the statement covers not only a case where a first component is directly combined with a second component, but also a case where the first component is combined with a third component, and the third component is combined with the second component with the position of the first component maintained relative to the second component.

As used herein, stating that a first component and a second component "integrally rotate" means that the first component and the second component rotate at the same rotational speed in the same direction. This covers not only the case where the first component and second component rotate by being coupled with each other, but also a case where the first component and the second component rotate together with the first component coupled with the third component and the third component coupled with the second component.

FIG. 1 is a cross-sectional view of a washing machine according to an embodiment of the present invention, seen from a lateral side of the washing machine.

The washing machine shown in FIG. 1 includes a cabinet 100 defining the exterior of the washing machine, an outer tub 110 provided in the cabinet 100, and an inner tub assembly 120 rotatably installed in the outer tub 110.

The cabinet 100 may have a shape of a hollow rectangular parallelepiped. However, this shape of the cabinet 100 is merely an example, and the exterior shape and frame are not limited to the rectangular parallelepiped.

An upper portion of the cabinet 100 is provided with a door 101, which allows an object to be washed to be introduced into and retrieved from the cabinet 100.

The outer tub 110 has a cylindrical shape with an open top. The outer tub 110 is suspended from a suspension bar 111 in the cabinet 100. The outer tub 110 stores wash water supplied from a wash water supply unit, and receives a detergent supplied from a detergent supply unit to dissolve the detergent in the wash water and mix the detergent with wash water.

The inner tub assembly 120 is rotatably installed in the outer tub 110 to accommodate an object to be washed and perform the washing operation. The inner tub assembly 120 is rotated by the power transmitted from a drive motor 130. The power from the drive motor 130 is selectively transmitted to the inner tub assembly 120 by control of a clutch. The inner tub assembly 120 is held fixed during washing and rinsing, and is rotated during dehydration. The inner tub assembly 120 may include an inner tub 120a provided with a plurality of dehydration holes, a balancer 125 mounted to an upper portion of the inner tub 120a, a base 121 coupled to a lower portion of the inner tub 120a, and a hub 124 coupled with the lower portion of the base 121. Wash water stored in the outer tub 110 is introduced into the lower portion of the inner tub assembly 120 through wash water introduction holes 124a of a hub.

The hub 124 may be formed of a circular member thicker than the inner tub assembly 120, and secure the overall rigidity of the inner tub assembly 120. The hub 124 is provided with a plurality of wash water introduction holes 124a arranged in a circumferential direction.

The inner tub assembly 120 is rotatably installed in the outer tub 110 to accommodate laundry therein and perform washing. The inner tub assembly 120 is rotated by power transmitted from the drive motor 130. The power from the drive motor 130 is selectively transmitted to the inner tub assembly 120 by control of a clutch. The inner tub assembly 120 is held fixed in performing washing and rinsing, and is rotated in performing dehydration. The inner tub assembly 120 may include an inner tub 120a provided with a plurality of dehydration holes, a balancer 125 mounted to an upper portion of the inner tub 120a, a base 121 coupled with a lower portion of the inner tub 120a, and a hub 124 coupled with a lower portion of the base 121. Wash water stored in the outer tub 110 is introduced into the lower portion of the inner tub assembly 120 through a wash water introduction hole 124a of the hub.

A pulsator 122 is rotatably provided in the lower portion of the inner tub assembly 120. The pulsator 122, which is a washboard, may include a rotating plate 122a, a center projection 122b formed at the center of the rotating plate 122a in a protruding manner, and a plurality of protrusions 122c protruding upward from the upper surface of the rotating plate 122a. An upper cap may be installed at an upper portion of the center projection 122b. The protrusions 122c are spaced a certain distance from each other in a circumferential direction. One end of each of the protrusions 122c is connected to the center projection 122b, and the other end of each of the protrusions 122c extends toward the outer circumference of the rotating plate 122a. Herein, the protrusions 122c may be curved upward to rotate wash water introduced into the inner tub assembly 120 in the forward/reverse directions to create water streams. The pulsator 122 receives power from the drive motor 130. The pulsator 122 obtains an effect of rubbing and washing laundry through water streams rotating in the forward/reverse directions.

The pulsator 122 is provided with a plurality of through holes 122a1, and wash water may flow down to a lower portion of the inner tub assembly 120 through the through holes 122a1.

A concave groove 122b1 is formed in the bottom surface of the center portion of the pulsator 122, and a power transmission unit 140, 240, 340, 440, 540, 640, 740, 840, 940, 1040 according to first to tenth embodiments, which will be described later, is provided therein. The power transmission unit 140, 240, 340, 440, 740, 840, 940, 1040 may include a planetary gear module. The power transmission unit 540, 640 may include a plurality of bevel gears. The power transmission unit 740, 840, 940, 1040 may include a dual planetary gear module.

The power transmission unit 140, 440, 740, 840, 940, 1040 transmits the rotational power of the drive motor 130 to the pulsator 122 by decreasing the rotational speed of the drive motor 130. As the rotational speed of the drive motor 130 is decreased and transmitted to the pulsator 122, torque of the pulsator 122 increases.

The power transmission unit 240, 340, 740, 840, 940, 1040 transmits the rotational power of the drive motor 130 to a blade 123 by decreasing the rotational speed of the drive motor 130. As the rotational speed of the drive motor 130 is decreased and transmitted to the blade 123, torque of the blade 123 increases.

The power transmission unit 340, 440, 540, 640, 740, 1040 transmits the rotational power of the drive motor 130 to the pulsator 122 and the blade 123 such that the pulsator 122 and the blade 123 rotate in the opposite directions. The rotational speeds of the pulsator 122 and the blade 123 increase relative to each other, and more complex water streams are created.

The blade 123 is rotatably provided to a lower portion of the pulsator 122. The blade 123 is installed below the pulsator 122.

The blade 123 serves to raise wash water to an upper portion of the inner tub using centrifugal force.

The blade 123 includes a circular rotating plate 123a. The blade 123 includes a plurality of pumping blade portions 123b protruding downward from the lower surface of the rotating plate 123a. The rotating plate 123a serves to receive rotational power transmitted from the drive motor 130, and the pumping blade portions 123b serve to rotate wash water filling a portion below the rotating plate 123a to pump wash water using centrifugal force. One end of a pumping blade portion 123b is arranged spaced from one end of other pumping blade portions 123b around the center portion of the rotating plate 123a in the circumferential direction, and the other end of each of the pumping blade portions 123b extends radially toward the outer circumference of the rotating plate 123a.

The washing machine includes a wash water circulating module for guiding wash water caused to flow by the blade 123 to an upper side of the inner tub assembly 120 and spraying the same. A plurality of wash water circulating modules may be provided. In this embodiment, two wash water circulating modules are provided. The two wash water circulating modules are symmetrically disposed with respect to the center of the rotation shaft of the inner tub assembly 120 such that they face each other.

The wash water circulating module includes a wash water discharge portion 127 coupled to the base 121. Wash water caused to flow by the blade 123 is introduced into the wash water discharge portion 127. The wash water circulating module includes a circulation duct 126 provided to the inner surface of the inner tub 120a to guide wash water introduced into the wash water discharge portion 127 to an upper end of the inner tub 120a. The wash water circulating module includes a filter unit 128 disposed at the upper end of the inner tub 120a to spray wash water guided through the circulation duct 126.

The circulation duct 126 is connected to the inner tub assembly 120 to provide a circulation flow channel 126a for raising wash water from the lower portion of the inner tub assembly 120 to the upper portion of the inner tub assembly 120 and resupplying and circulating the same into the inner tub assembly 120.

The circulation duct 126 may be mounted on the inner circumferential surface of the inner tub assembly 120 in the form of a cover. The back surface of the circulation duct 126 is open, and the side ends of the circulation duct 126 may be formed through curling or be curved. The back surface of the curling portion is provided with a fastening lug, and the circulation duct 126 may be fastened to the inner circumferential surface of the inner tub assembly 120 by the fastening lug. The inner circumferential surface of the inner tub assembly 120 may be provided with a vertically elongated slit, and the fastening lug may be inserted into the slit so as to be fastened. A space (flow channel) allowing wash water to rise therethrough is formed in the circulation duct 126. The circulation duct 126 defines a space, namely a circulation flow channel 126a independent of the inner space of the inner tub 120a, such that wash water in the circulation flow channel is not mixed with wash water in the inner tub 120a.

The wash water discharge portion 127 is connected to a lower portion of the circulation duct 126. The wash water discharge portion 127 is a passage for receiving wash water discharged by the blade 123 and moving the same to the circulation duct 126.

The wash water discharge portion 127 is disposed at an outer lower portion of the base 121. The wash water discharge portion 127 includes a wash water discharge port formed at a lower portion of a discharge body 127a and a duct communication port formed at an upper portion of the discharge body 127a.

The discharge body 127a may be formed to be round. Thereby, when wash water moves from the blade 123 to the circulation duct 126, the movement direction thereof may be smoothly switched from the radial direction to the vertical direction.

The wash water discharge port may be communicatively connected to the inner portion of the base 121 and disposed to face the outer circumferential portion of the blade 123, and wash water pumped by the blade 123 may be introduced into the discharge body 127a through the wash water discharge port.

The upper side of the discharge body 127a is communicatively coupled to the circulation duct 126 via the duct communication port, and wash water introduced into the discharge body 127a rises into the circulation duct 126.

The filter unit 128 may be installed at the upper end of the circulation duct 126.

The filter unit 128 includes a filter housing 128*a* and a filter formed in a net structure provided in the filter housing 128*a*. The holes of the net are very small. For example, the diameter of the holes of the net is a few μm to a few hundred μm, small enough to filter out all fine lint from the laundry. In the case of the pulsator 122-type washing machine for washing laundry through the rubbing operation, a lot of impurities including lint may be separated from the laundry. In this case, when wash water containing lint passes through the filter, impurities including the lint may be removed from the wash water.

The lower side of the filter housing 128*a* communicates with the upper end of the circulation duct 126, and one lateral face of the filter housing 128*a* communicates with the interior of the inner tub 120*a*. One lateral face of the filter housing 128*a* is provided with an outlet 128*a*1. The outlet 128*a*1 has a small vertical height and a large horizontal width. Thereby, pumped wash water may be sprayed through the outlet 128*a*1 onto a wide area in the inner tub.

The outer lower portion of the outer tub 110 is provided with the drive motor 130.

The drive motor 130 provides power for driving the pulsator 122 and the blade 123 through rotational power from one motor. A washing shaft 132*a* transmits rotational power of the drive motor 130. The drive motor 130 is connected to the pulsator 122 and the blade 123 by the washing shaft 132*a*. Thereby, when the drive motor 130 operates, the pulsator 122 and blade 123 will be rotated. If the pulsator 122 or the blade 123 is connected to the power transmission unit 140, 240, 340, 440, 740, 840, 940, 1040, it may be rotated at revolutions per minute different from the rotational speed of the drive motor 130. If the pulsator 122 or the blade 123 is connected to the power transmission unit 340, 440, 540, 640, 740, 840, 1040, it may be rotated in a direction opposite to the direction of rotation of the drive motor 130.

The drive motor 130 may include a motor casing 131 and a rotor and stator, which are provided in the motor casing 131. The stator is fixed to the interior of the motor casing 131, and the rotor is rotated by electromagnetic interaction with the stator. The rotor is connected to the drive motor 130 to rotate the rotation shaft 132. The rotation shaft 132 extends upwardly from the bottom surface of the center portion of the motor casing 131 toward the interior of the inner tub assembly 120. The washing shaft 132*a* is provided to an upper portion of the rotation shaft 132 to transmit power to the pulsator 122 and the blade 123. The drive motor 130 is integrally connected to the washing shaft 132*a*, which will be described later.

The power transmission unit 140, 240, 340, 440, 740, 840, 940, 1040 is disposed between the drive motor 130 and the pulsator 122. Thereby, power of the rotation shaft 132 is transmitted to the pulsator 122 via the power transmission unit 140, 240, 340, 440, 740, 840, 940, 1040. In addition, as the power transmission unit 140, 240, 340, 440, 740, 840, 940, 1040 is disposed between the drive motor 130 and the blade 123, the power of the drive motor 130 is transmitted to the blade 123.

The power transmission unit 140, 240, 340, 440, 740, 840, 940, 1040 is positioned at an inner lower portion of the inner tub assembly 120. More specifically, as the power transmission unit 140, 240, 340, 440, 740, 840, 940, 1040 is disposed between the pulsator 122 and the blade 123, the installation space for the power transmission unit 140, 240, 340, 440, 740, 840, 940, 1040 may become compact, thereby reducing the volume of the washing machine.

The bottom surface of the outer tub 110 is provided with a drainage port.

The drainage port discharges wash water stored in the outer tub 110 after washing is completed. The drainage port is connected to a drainage hose. One end of the drainage hose is connected to the drainage port, and the other end of the drainage hose is connected to the outside of the cabinet 100. Thereby, the drainage hose discharges wash water used for washing and wash water obtained through dehydration after washing is completed.

Hereinafter, a description will be given with reference to FIGS. 2A, 2B and 3.

The inner tub assembly 120 is provided with a base 121, which defines the bottom surface of the inner tub. The upper portion of the base 121 is coupled to the lower end of the inner tub through welding or curling. The lower portion of the base 121 is provided with step portions 121*b* and 121*c*. The lower portion of the base 121 is provided with a first step portion 121*b*. The lower portion of the base 121 is provided with a second step portion 121*c*.

The blade 123 is disposed to be completely hidden when viewed from the upper side of the pulsator 122. When viewed from the upper side, the pulsator 122 is disposed to cover the entire inner tub assembly 120. Because the upper side of the blade 123 is hidden, the blade 123 cannot come into contact with an object to be washed inside the inner tub assembly 120. Thereby, when rotating, the blade 123 is not subjected to load attributable to contact with the object to be washed, but is subjected to load resulting from pumping of wash water. The pulsator 122 is provided so as to come into contact with the object to be washed.

The entirety of the base 121 is depressed downward. As the base 121 is depressed downward, a space is formed between the bottom surface of the base 121 and the lower surface of the pulsator 122. The blade 123 is disposed in the space between the outer surface of the base 121 and the lower surface of the pulsator 122.

When the base 121 is viewed from the upper side, the center portion (the portion close to the center) of the inner tub assembly 120 forms the lowest upper side surface. A second step portion 121*c* and a first step portion 121*b* are sequentially arranged in the direction from the center portion to the edge. As a position is shifted from the center portion of the base 121 toward the edge thereof along the upper surface of the base 121, the upper surface of the base 121 is raised by the second step portion 121*c*. As a position is shifted from the second step portion 121*c* of the base 121 toward the edge thereof along the upper surface of the base 121, the upper surface of the base 121 is raised by the first step portion 121*b*. The first step portion 121*b* extends circumferentially around the rotation shaft 132. The second step portion 121*c* extends circumferentially around the rotation shaft 132.

The base 121 is also provided with a round portion 121*a* rounded downward. The round portion 121*a* minimizes friction with laundry and allows wash water to easily flow down the inner tub assembly 120. When the base 121 is viewed from the upper side, the round portion 121*a* is disposed at the edge of the base 121. The round portion 121*a* extends circumferentially around rotation shaft 132. When the inner tub assembly 120 is viewed from the upper side, the round portion 121*a* is inclined downward from the edge of the base 121 to the rotation shaft 132. The edge of the round portion 121*a* is connected to the lower end of the inner tub 120*a*.

The round portion 121*a* is provided with projections 121*a*1, which are inclined upward facing each other. The projections 121*a*1 are arranged spaced a certain distance from each other in a circumferential direction. As the projections 121*a*1 protrude from the round portion 121*a* upward, the strength of the base 121 may be enhanced, and the rubbing effect produced by the stirring operation of the pulsator 122 may be maximized in performing washing.

The first step portion 121*b* is formed to surround the outer circumferential portion of the pulsator 122. When viewed from the upper side, the inner tub assembly 120 is disposed at the inside of the periphery of the first step portion 121*b*. The first step portion 121*b* includes a vertical surface vertically arranged to face the outer circumferential portion of the pulsator 122. The first step portion 121*b* is connected to a lower portion of the round portion 121*a*. The upper portion of the first step portion 121*b* is connected to the inner circumferential portion of the round portion 121*a* (the end portion of the round portion 121*a* proximal to the rotation shaft). A certain gap is formed between the first step portion 121*b* and the outer circumferential portion of the pulsator 122. Thereby, interference between the first step portion 121*b* and the pulsator 122 may be avoided when the pulsator 122 rotates. As long as the gap between the first step portion 121*b* and the pulsator 122 is large enough to avoid interference, a smaller gap is the better. For example, a gap as small as 1 mm is enough to prevent a coin coming out of an object to be washed from falling thereinto.

The second step portion 121*c* is formed to surround the outer circumferential portion of the blade 123. When viewed from the upper side, the periphery of the second step portion 121*c* is disposed at the inner side of the periphery of the first step portion 121*b*. When viewed from the upper side, the periphery of the second step portion 121*c* is disposed at the inner side of the periphery of the pulsator 122. The second step portion 121*c* includes a vertical surface vertically arranged to face the outer circumferential portion of the blade 123. The second step portion 121*c* is connected to the bottom surface of the base 121. The center portion of the base 121 forms the lowest surface. The lower portion of the second step portion 121*c* is connected to the outer circumferential portion of the center portion of the base 121.

The bottom surface of the base 121 is provided with an opening. The opening is formed at the center of the center portion of the base 121. Water may be introduced from the outer lower portion of the base 121 into the base 121 through the opening of the base 121.

The bottom surface of the base 121 is provided with a hub 124. The hub 124 is disposed at the center portion of the base 121. The hub 124 may be formed of a circular member thicker than the inner tub 120*a*, and secure overall rigidity of the inner tub assembly 120. The hub 124 is provided with a plurality of wash water introduction holes 124*a*. While the wash water introduction holes 124*a* are illustrated as having an arc shape, embodiments of the present invention are not limited thereto.

A seating surface 121*d* is horizontally formed between the first step portion 121*b* and the second step portion 121*c* in a circumferential direction. A jig 146 for fixing the power transmission unit 140, 240, 440, 640, 940, 1040, which will be described later, is seated on and fixed to the seating surface 121*d*. The jig 146 is fastened to the seating surface 121*d*. The need for the jig 146 depends on the embodiments.

The sun gear 142, 242, 342, 442, planetary gears 143, 243, 343, 443 and ring gear 145, 245, 345, 445 of the power transmission unit 140, 240, 340, 440, which is provided with a planetary gear module, are sequentially disposed from the rotation shaft 132. If a gear integrally rotating with the blade 123 is disposed closer to the rotating plate 123*a* than a gear integrally rotating with the pulsator 122 among the sun gear 142, 242, 342, 442, planetary gears 143, 243, 343, 443 and ring gear 145, 245, 345, 445, the jig 146 is needed. The jig 146 is implemented in the first, second and fourth embodiments, which will be described later. In this case, a gear arranged farther from the rotating plate 123*a* than a gear integrally rotating with the blade 123 among the sun gear 142, 242, 442, planetary gears 143, 243, 443 and ring gear 145, 245, 445 is fixed. The position of the gear fixed by the jig 146 is fixed relative to the position of the inner tub assembly 120. The jig 146 fixes the remaining gears other than the gear integrally rotating with the blade 123 or the pulsator 122 among the sun gear 142, 242, 442, planetary gears 143, 243, 443 and ring gear 145, 245, 445.

In the power transmission unit 540, 640 provided with a plurality of bevel gears, the first bevel gear 5421, 6421 and third bevel gear 5423, 6423 are sequentially disposed from the lower side to the upper side. Of the first bevel gear 5421, 6421 and third bevel gear 5423, 6423, if a gear integrally rotating with the blade 123 is disposed lower than the other gear integrally rotating with the pulsator 122, the jig 146 is needed. The jig 146 is implemented in the sixth embodiment, which will be described later. In this case, the jig 146 fixes a second bevel gear 6422. The position of the second bevel gear 6422 fixed by the jig 146 is fixed relative to the position of the inner tub assembly 120. The jig 146 fixes the remaining gears other than the gear integrally rotating with the blade 123 or the pulsator 122 among the first bevel gear 6421, second bevel gear 6422 and third bevel gear 6423.

A first planetary gear module 740*a*, 840*a*, 940*a*, 1040*a* and second planetary gear module 740*b*, 840*b*, 940*b*, 1040*b* of the power transmission unit 740, 840, 940, 1040, which is provided with a dual planetary gear module, are sequentially disposed from the upper side to the lower side. A first sun gear 742*a*, 842*a*, 942*a*, 1042*a*, first planetary gear 743*a*, 843*a*, 943*a*, 1043*a* and first ring gear 745*a*, 845*a*, 945*a*, 1045*a* of the first planetary gear module 740*a*, 840*a*, 940*a*, 1040*a* are disposed sequentially from an proximal position to a distal position with respect to the rotation shaft 132. A second sun gear 742*b*, 842*b*, 942*b*, 1042*b*, second planetary gear 743*b*, 843*b*, 943*b*, 1043*b* and second ring gear 745*b*, 845*b*, 945*b*, 1045*b* of the second planetary gear module 740*b*, 840*b*, 940*b*, 1040*b* are disposed sequentially from an proximal position to a distal position with respect to the rotation shaft 132. One of the first planetary gear 743*a*, 843*a*, 943*a*, 1043*a* and the first ring gear 745*a*, 845*a*, 945*a*, 1045*a* is integrally rotatably connected to one of the second planetary gear 743*b*, 843*b*, 943*b*, 1043*b* and the second ring gear 745*b*, 845*b*, 945*b*, 1045*b*. The other one of the first planetary gear 743*a*, 843*a*, 943*a*, 1043*a* and the first ring gear 745*a*, 845*a*, 945*a*, 1045*a* is integrally rotatably connected to the pulsator 122. One of the second planetary gear 743*b*, 843*b*, 943*b*, 1043*b* and the second ring gear 745*b*, 845*b*, 945*b*, 1045*b* is integrally rotatably connected to the blade 123. In this case, four combinations are possible, which will be described in the seventh to tenth embodiments. If the second planetary gear 943*b*, 1043*b* among the second planetary gears 743*b*, 843*b*, 943*b*, 1043*b* and the second ring gear 745*b*, 845*b*, 945*b*, 1045*b* integrally rotates with the blade 123, the jig 146 for fixing the second ring gear 945*b*, 1045*b* is needed. The jig 146 is implemented in the ninth and tenth embodiments, which will be described later. In this case, the jig 146 also fixes one of the first planetary gear 1043*a* and the first ring gear 945*a*, which are integrally rotatably connected to the second ring gear 945*b*, 1045*b*.

The position of the gear fixed by the jig 146 is fixed relative to the position of the inner tub assembly 120. The jig 146 fixes the remaining gears other than the gear integrally rotating with the blade 123 or the pulsator 122 among the first planetary gear 743*a*, 843*a*, 943*a*, 1043*a*, the first ring gear 745*a*, 845*a*, 945*a*, 1045*a*, the second planetary gear 743*b*, 843*b*, 943*b*, 1043*b* and the second ring gear 745*b*, 845*b*, 945*b*, 1045*b*.

The jig 146 is disposed between the pulsator 122 and the blade 123. In another embodiment, if the jig 146 protrudes longer than the diameter of the pulsator 122 in the radial direction, a cover for covering the jig 146 may be needed. For the inner tub assembly 120 according to this embodiment, the base 121 is formed to have two step portions, and the pulsator 122 and the jig 146 are surrounded by the first step portion 121*b* with the same diameter. Accordingly, the cover for covering the jig 146 is not needed.

To transmit power of the drive motor 130 to the power transmission unit 140, 240, 340, 440, 740, 840, 940, 1040, a washing shaft 132*a* integrated with the upper portion of the rotation shaft 132 of the drive motor 130 is provided. The power transmission unit 140, 240, 340, 440, 740, 840, 940, 1040 includes a plurality of gears. The gears include a sun gear, a planetary gear, a ring gear, a first bevel gear, a second bevel gear and a third bevel gear.

The jig 146 fixes one of the gears. The jig 146 is fastened to the inner bottom surface of the inner tub assembly 120 to fix the position of the gear fixed to the jig 146 among the gears relative to the position of the inner tub assembly 120.

The washing shaft 132*a* extends vertically upward from the bottom surface of the base 121 so as to be inserted into the power transmission unit 140, 240, 340, 440, 740, 840, 940, 1040, penetrating the center portion of the hub 124 and the center portion of the blade 123.

The center portion of the blade 123 is provided with a circular shaft coupling portion 123*c*, and the washing shaft 132*a* is coupled to the shaft coupling portion 123*c*. Thereby, the rotational power of the drive motor 130 is transmitted from the washing shaft 132*a* to the blade 123 via the shaft coupling portion 123*c*. Accordingly, the blade 123 may rotate at the same rotational speed (revolutions per minute) as the drive motor 130, for example, at 300 rpm even higher than the rotational speed of the pulsator 122. The rotational speed of the blade 123 may secure a desired pumping pressure and pumping head, increase the pumping speed of circulation water flowing along the circulation duct 126, and increase the spray force for spraying water through the outlet 128*a*1 of the filter housing 128*a*. In addition, fabric may be sufficiently soaked even with a small amount of water.

Hereinafter, a specific description will be given of the first embodiment, with reference to FIGS. 1 to 10. Description of all elements in FIGS. 1 to 10 are applicable to the second to tenth embodiments, which will be described later, except for the configuration of the power transmission unit 140 and presence or absence of the jig 146.

The power transmission unit 140 includes a sun gear 142, a plurality of planetary gears 143, and a ring gear 145. The power transmission unit 140 includes a carrier 144. The sun gear 142, the plurality of planetary gears 143, and the ring gear 145 are provided in a gearbox housing 141. The carrier 144 is provided in the gearbox housing 141.

The power transmission unit 140 receives power via the sun gear 142 connected with the washing shaft 132*a*. The power transmission unit 140 transmits power by decreasing the rotational speed according to the gear ratio between the sun gear 142 and the ring gear 145. The power transmission unit 140 transmits power to the pulsator 122 via the carrier 144, which connects the plurality of planetary gears 143.

The ring gear 145 is fixed to the inner tub assembly 120. To fix the ring gear 145, the gearbox housing 141 is provided with a ring gear accommodation groove 145*a*, and thus a portion of the ring gear 145 is inserted into the ring gear accommodation groove 145*a*. The gearbox housing 141 not only restricts the vertical movement of the ring gear 145, but also restricts rotation thereof. In addition, the gearbox housing 141 may be fixed to the inner tub assembly 120 by the jig 146.

The jig 146 may support the outer lower portion of the gearbox housing 141. The jig 146 is disposed between the pulsator 122 and blade 123. The jig 146 may be fixed to a portion of the base 121.

The jig 146 may include a center coupling portion 146*a* fastened to the outer edge portion of the gearbox housing 141 by a fastening member 146*b*1 and an extension 146*b* fastened by the seating surface 121*d* of the base 121 and a fastening member 127*b*3.

The center coupling portion 146*a* has a ring shape, surrounds the lower portion of the gearbox housing 141, and is fastened with the gearbox housing 141 by the fastening member 146*b*1 such as a screw.

The extensions 146*b* radially extend from the center coupling portion toward the first step portion 121*b* of the base 121. The extensions 146*b* may be disposed spaced from each other in the circumferential direction. Two adjacent extensions 146*b* may be connected to each other by a connector 146*c*. The extensions 146*b* are seated on the seating surface 121*d* of the base 121 and fastened to the seating surface 121*d* by the fastening member 146*b*1 such as a screw.

The wash water discharge portion 127 further includes a coupling member 127*b* circumferentially extending from the opposite lateral surfaces of the discharge body 127*a*. The coupling member 127*b* is disposed to overlap the jig 146 and the base 121 in the thickness direction, and is fastened to the jig 146 and the base 121 by the fastening member 127*b*3.

The coupling member 127*b* may have the shape of a circular arc along the second step portion 121*c* with a curvature identical or similar to that of the second step portion 121*c*. The coupling member 127*b* includes an upper surface allowing the fastening member 127*b*3 to pass therethrough and a lateral surface vertically extending down from the upper surface and having a certain curvature.

The coupling member 127*b* is provided with a fastening groove formed therein and a nut portion 127*b*1 for fastening the fastening member 127*b*3. A reinforcement rib 127*b*2 connecting the outer circumferential surface of the nut portion 127*b*1 to the lateral surface of the coupling member 127*b* may be provided, thereby reinforcing the coupling members 127*b*. An end of the extensions 146*b* of the jig 146, the seating surface 121*d* of the base 121 and the nut portion 127*b*1 of the coupling member 127*b* are disposed in an overlapping manner in the thickness direction, and the three overlapping members are fastened to each other by the fastening member 127*b*3.

Referring to FIGS. 2A to 4, a balancer 125 is mounted to the upper end of the inner tub. The balancer 125 has a circular ring shape. The balancer 125 has a hollow portion therein. The balancer 125 is provided to attenuate vibration caused by maldistribution of laundry. The balancer 125 may store a fluid such as salt water occupying 40% to 70% of the entire volume of the interior of the balancer 125. When the inner tub 120*a* is rotated with the laundry maldistributed at one side in the inner tub 120*a*, the balancer 125 cancels vibration of the inner tub assembly 120 caused by maldistribution of the laundry, by causing the fluid in the balancer 125 to move to a position opposite to the position of the objects in the resonance region of the inner tub 120*a*.

The circulation duct 126 is provided to circulate wash water through the inner tub assembly 120.

The circulation duct 126 is connected to the inner tub assembly 120 to provide a circulation flow channel 126*a* for raising wash water from the lower portion of the inner tub assembly 120 to the upper portion of the inner tub assembly 120 and resupplying and circulating the same into the inner tub assembly 120.

The circulation duct 126 may be mounted on the inner circumferential surface of the inner tub assembly 120 in the form of a cover. The back surface of the circulation duct 126 is open, and the side end of the circulation duct 126 may be formed through curling or be curved. The back surface of the curling portion is provided with a fastening lug, and the circulation duct 126 may be fastened to the inner circumferential surface of the inner tub assembly 120 by the fastening lug. The inner circumferential surface of the inner tub assembly 120 may be provided with a slit vertically elongated to allow the fastening lug to be fastened to the inner circumferential surface of the inner tub assembly 120 therethrough. An O-ring formed of rubber may be installed on the back surface of the circulation duct along the edge of the open portion of the circulation duct, thereby sealing the space between the circulation duct and the inner tub. A space (flow channel) allowing wash water to rise therethrough is formed in the circulation duct 126.

The wash water discharge portion 127 is connected to a lower portion of the circulation duct 126. The wash water discharge portion 127 is a passage for receiving wash water discharged from the base by the blade 123 and moving the same to the circulation duct 126.

The wash water discharge portion 127 is disposed at an outer lower portion of the round portion 121*a* of the base 121. The wash water discharge portion 127 includes a discharge body 127*a*, a wash water discharge port formed at a lower portion of the discharge body 127*a* and a duct communication port formed at an upper portion of the discharge body 127*a*.

The discharge body 127*a* may be formed to be round. Thereby, when wash water moves from the blade 123 to the circulation duct 126, the movement direction thereof may be smoothly switched from the radial direction to the vertical direction. The upper surface of the discharge body 127*a* may be further provided with a support extending upward so as to be connected with the first step portion 121*b* and the round portion 121*a*. As the angled portion between the round portion 121*a* and second step portion 121*c* is supported by the support, the strength of the structure may be maintained.

The wash water discharge port is formed to face the outer circumferential portion of the blade 123, and the duct communication port is formed to face the lower end of the circulation duct 126. The second step portion 121*c* is provided with a first communication hole 121*c* through which water pumped by the blade 123 is discharged. The base 121 forms, in the second step portion 121*c*, the first communication hole 121*c* allowing the wash water discharge port to communication with the outer circumferential portion of the blade 123. The base 121 forms, in the round portion 121*a*, a second communication hole 121*a*2 allowing the duct communication port to communicate with the lower end of the circulation duct 126. Wash water pumped by the blade 123 is introduced into the discharge body 127*a* through the first communication hole 121*c* and the wash water discharge port. The wash water introduced into the discharge body 127*a* may rise to the circulation flow channel 126*a* through the duct communication port and second communication hole 121*a*2.

The filter unit 128 may be installed at the upper end of the circulation duct 126.

The filter unit 128 includes a filter housing 128*a* and a filter with a net structure provided in the filter housing 128*a*. The holes of the net are very small. For example, the diameter of the holes of the net has a size of a few μm to a few hundred μm, small enough to filter out all fine lint from the laundry. In the case of the pulsator 122-type washing machine for washing laundry through the rubbing operation, a lot of impurities including lint may be separated from the laundry. In this case, as wash water containing lint passes through the filter, impurities including the lint may be removed from the wash water. If the lint is not filtered out by the filter, the lint may be stuck to the interior of the inner tub assembly 120. As a result, the lint may stick to the laundry again in the rinsing and dehydration operations.

One side of the filter housing 128*a* communicates with the upper end of the circulation duct 126, and the other side of the filter housing 128*a* communicates with the interior of the inner tub assembly 120. The outlet 128*a*1 is formed in the opposite lateral surface of the filter housing 128*a*. The outlet 128*a*1 may have a small vertical height and a large horizontal width. Thereby, pumped wash water may be sprayed onto a wide area in the inner tub assembly 120.

Referring to FIGS. 5 and 6, the pulsator 122, the jig 146 and the blade 123 may be disposed spaced from each other in the vertical direction in an overlapping manner so as not interfere with each other. For example, they may be disposed spaced 4 mm from each other. The pulsator 122 may be disposed to be rotatable with respect to the jig 146, and blade 123 may be disposed to be rotatable with respect to the jig 146. The jig 146 is fixed to the base 121 of the inner tub assembly 120 in washing and rinsing.

The power transmission unit 140 includes a gearbox housing 141, a sun gear 142, a planetary gears 143, a carrier 144, and a ring gear 145.

The gearbox housing 141 may include an upper housing 141*a* and a lower housing 141*b*. The upper and lower housings 141*a* and 141*b* may be detachably coupled to each other. The upper housing and the lower housing 141*b* are disposed at an upper and lower positions to face each other. A first fastening portion 141*a*1 having the shape of a flange with a large diameter is formed at the outer edge of the upper housing 141*a*, and a second fastening portion 141*b*1 having the shape of a flange with a large diameter is formed at the outer edge of the lower housing 141*b*. The first fastening portion 141*a*1 and second fastening portion 141*b*1 are disposed to overlapping each other in the vertical direction in which thickness is defined and fastened to each other by a fastening member.

The gearbox housing 141 is provided with a ring gear accommodation groove 145*a* having a cross-section of a square bracket shape at the interior thereof. The ring gear accommodation groove 145*a* is open to the inside such that a portion of the ring gear 145 is inserted thereinto. The ring gear accommodation groove 145*a* may be formed by coupling between a first accommodation grooved formed in the upper housing 141*a* and a second accommodation groove formed in the lower housing. When the ring gear 145 is inserted into the ring gear accommodation groove 145*a*, vertical rotation of the ring gear 145 is restricted by the ring gear accommodation groove 145*a*. In addition, the ring gear accommodation groove 145*a* is provided with a plurality of ring gear rotation preventing lugs 145b to restrict rotation of the ring gear 145. The ring gear rotation preventing lugs 145b may be formed on the inner circumferential surface of the ring gear accommodation groove 145a to face the outer circumferential surface of the ring gear 145, or formed on the upper surface or lower surface of the ring gear accommodation groove 145a to face the upper surface or lower surface of the ring gear 145. A plurality of ring gear rotation preventing grooves 145c is formed on the outer circumferential surface of the ring gear 145 to face the ring gear rotation preventing lugs 145b. Thereby, rotation of the ring gear 145 is restricted as the ring gear rotation preventing lugs 145b are inserted into the ring gear rotation preventing grooves 145c.

The sun gear 142 is rotatably provided in the gearbox housing 141. The power transmission unit 140 is connected to the washing shaft 132a, which extends through the lower surface of the gearbox housing 141, and thus receives rotational power of the drive motor 130 from the washing shaft 132a. The sun gear 142 integrally rotates with the washing shaft 132a. To transmit power from the washing shaft 132a, a plurality of lugs such as serrations may be formed along the circumferential surface of the washing shaft 132a, and a plurality of lugs may also be formed on the inner circumferential surface of the sun gear 142 to engage with the serrations. As the washing shaft 132a is coupled with the sun gear 142 through the center portion of the sun gear 142, the sun gear 142 rotates about the washing shaft 132a. A plurality of gear teeth is formed along the outer circumferential surface of the sun gear 142.

A plurality of planetary gears 143 is engaged with the outer circumferential surface of the sun gear 142. Each of the planetary gears 143 has a plurality of gear teeth on the outer circumferential surface thereof. The planetary gears 143 may be disposed spaced from each other in a circumferential direction. The planetary gears 143 spaced from each other may be connected to the carrier 144 via a connection shaft 144a. The planetary gears 143 are disposed between the sun gear 142 and the ring gear 145 such that the gear teeth of the planetary gears 143 are engaged with the gear teeth of the sun gear 142 and the ring gear 145. Thereby, the planetary gears 143 performs rotation and revolution. The direction of rotation of the planetary gears 143 is opposite to the direction of rotation of the sun gear 142. To allow the planetary gears 143 to revolve around sun gear 142, the ring gear 145 is fixed. The direction of revolution of the planetary gears 143 is identical to the direction of rotation of the sun gear 142.

The ring gear 145 is provided with a plurality of gear teeth along the inner circumferential surface thereof so as to be engaged with the gear teeth on the outer circumferential surface of the planetary gears 143.

The carrier 144 connects the planetary gears 143 via the connection shaft 144a. The connection shaft 144a is coupled to the planetary gears 143 by vertically penetrating the planetary gears 143, and carrier 144 connects the upper surface and lower surface of the connection shaft 144a.

One side of the carrier 144 may be connected to the connection shaft 144a so as to cover the upper surface or lower surface of the connection shaft 144a. The other side of the carrier 144 is provided with an upper connection shaft 144c for transmitting power to the pulsator 122. The upper connection shaft 144c is disposed on the washing shaft 132a such that the upper connection shaft 144c is positioned on the same vertical line as the washing shaft 132a. However, the upper connection shaft 144c and the washing shaft 132a rotate independently.

The upper connection shaft 144c extends to the outside through the upper surface of the upper housing 141a. The upper connection shaft 144c is connected to the pulsator 122. Thereby, torque increased or decreased by the power transmission unit 140 is transmitted to the pulsator 122 via the carrier 144 and the upper connection shaft 144c.

A power transmission cap 144c may be mounted on the upper connection shaft 144 so as to surround the exterior of the upper connection shaft 144c. The outer circumferential surface of the power transmission cap 144c has a lug structure such as a serration, and the power transmission cap 144c is mounted to an upper portion of the upper connection shaft 144c such that the upper connection shaft 144c and the power transmission cap 144c overlap in the axial direction. The center projection 122b of the pulsator 122 is mounted on the power transmission cap 144c such that the center projection 122b and the power transmission cap 144c overlap in the axial direction. The pulsator 122, the power transmission cap 144c, and the upper connection shaft 144c are fastened to each other by a fastening member 144b1 such as a bolt. Thereby, the rotational power transmitted from the carrier 144 is transmitted to the pulsator 122.

The upper connection shaft 144c is supported by a first bearing 147a inserted into the upper surface of the gearbox housing 141, and rotates with respect to the gearbox housing 141.

The carrier 144 may include an upper carrier 1441 connecting the upper portions of the planetary gears 143 and a lower carrier 1442 for connecting the lower portions of the planetary gears 143. The upper carrier 1441 and the lower carrier 1442 are connected to each other so as to integrally rotate. A second bearing 147b is provided between the inner side surface of the upper carrier 1441 and the upper surface of the sun gear 142, and a fourth bearing 147d is provided between the inner side surface of the lower carrier 1442 and the lower surface of the sun gear 142. Thereby, the carrier 144 and the upper connection shaft 144c are supported so as to rotate independently with respect to the washing shaft 132a and the sun gear 142.

Referring to FIG. 7, the lower housing 141b of the gearbox housing 141 is inserted into the center coupling portion 146a of the jig 146, and thus mounted to the jig 146. The first fastening portion 141a1 of the upper housing 141a, the second fastening portion 141b1 of the lower housing 141b and the center coupling portion 146a of the jig 146 are disposed to overlap each other in the thickness direction.

To fastened the gearbox housing 141 and the jig 146, a coupling portion 141c is formed on the lower surface of the second fastening portion 141b1 in a protruding manner, and two or more coupling holes 146a1 are formed in the center coupling portion 146a of the jig 146 such that the coupling portion 141c is inserted into. In addition, fastening holes may be formed in the coupling portions of the gearbox housing and the jig, and a fastening member may be fastened to the gearbox housing and the changed by penetrating the coupling portions. Thereby, the gearbox housing and the jig may be fastened to each other. The coupling portions may have a diameter greater than that of the fastening member, thereby increasing the strength of fastening between the gearbox housing and the jig. In addition, when the coupling portions are inserted into the coupling holes, the gearbox housing is fixedly seated on the jig. Accordingly, connectivity of the fastening member may be enhanced in performing the fastening operation.

Referring to FIG. 8A, the second step portion 121c of the base 121 is formed to be stepped vertically upward with respect to the bottom surface of the inner tub assembly 120.

The second step portion 121c is spaced a predetermined distance from the outer circumferential portion of the blade 123 so as to face the outer circumferential portion of the blade 123 while surrounding the outer circumferential portion of the blade 123.

Referring to FIG. 8B, the first step portion 121b of the base 121 is formed to be stepped vertically upward with respect to the bottom surface and the seating surface 121d of the inner tub assembly 120. The first step portion 121b is spaced a predetermined distance from the outer circumferential portion of the jig 146 and the outer circumferential portion of the pulsator 122 so as to face the outer circumferential portions of the jig 146 and the pulsator 122 while surrounding the outer circumferential portion of the pulsator 122. Thereby, gaps formed between the first step portion 121b, inner tub assembly 120, and jig 146 are narrow, and thus foreign substances such as a coin may be prevented from being inserted thereinto even without a separate cover provided in the base 121.

Referring to FIGS. 9A and 9B, a first fastening hole is formed in an end of each extension 146b of the jig 146, and a second fastening hole is formed in the seating surface 121d of the base 121. In addition, a fastening groove is formed in the nut portion 127b1 of the coupling member 127b of the wash water discharge portion 127, and a fastening member 127b3 is inserted into and fastened to the nut portion 127b1 through the first and second fastening holes. Thereby, the jig 146 may be easily connected to the base 121 by the nut portion 127b1 integrated with the wash water discharge portion 127 even without a separate nut.

Referring to FIG. 10, a plurality of projections 146d protruding downward are formed on the bottom surface of the center coupling portion 146a of the jig 146. The projections 146d may be continuously arranged in the circumferential direction. An air gap 146d1 serving as a pocket is formed between the projections 146d to allow air to easily leave therethrough.

When water stored between the base 121 and the bottom surface of the outer tub 110 rises into the base, and the air in the center coupling portion 146a of the jig 146 is caused to escape, the air gap 146d1 serving as an air pocket delays escape of the air until the water level rises to the air gap 146d1. At this time, air failing to escape pushes back water, thereby serving as a sealer that prevents components such as shafts from being immersed in water.

Hereinafter, a movement path of water will be described with reference to FIG. 1.

Wash water is supplied into the outer tub 110 through a wash water supply hose connected to the wash water supply unit. At this time, a detergent may be supplied from a detergent supply unit into the outer tub 110, together with the wash water.

Wash water supplied into the outer tub 110 flows into the space between the inner tub assembly 120 and the outer tub 110 and is thus stored in a lower portion of the outer tub 110.

Wash water supplied into the lower portion of the outer tub 110 is introduced into the base 121 through the wash water introduction holes 124a of the hub 124. The wash water introduced into the base is pumped by the blade 123, and is spouted into the inner tub assembly 120 through the outlet 128a1 of the filter housing 128a via the wash water discharge portion 127 and circulation duct 126.

Thereby, wash water spouted to an upper portion of the inner tub assembly 120 spreads out to easily soak laundry. In addition, wash water may also be uniformly sprayed onto laundry which are floating on the wash water in the inner tub assembly. Accordingly, a detergent may uniformly infiltrate into the laundry, and thus washing performance may be improved.

After soaking the laundry, the wash water moves down to the bottom surface of the inner tub assembly 120 through the through holes 122a1 of the pulsator 122, or permeates the gap between the first step portion 121b of the base 121 and the pulsator 122, and then moves down to the bottom surface of the inner tub assembly 120.

The wash water having moved down to the bottom surface of the inner tub assembly 120 is pumped by the blade 123 again to circulate through the inner tub assembly 120.

Hereinafter, support structures of the pulsator 122, the power transmission unit 140 and the like, and a power transmission mechanism will be described with reference FIGS. 1 and 5.

The outer tub 110 is supported by the suspension bar 111 in a suspending manner so as to be suspended on the cabinet 100.

The motor casing 131 is fixed to a lower portion of the outer tub 110 by the fixation bracket 133.

The rotation shaft 132 extends vertically upward to the bottom surface of the outer tub 110, and is rotatably supported with respect to the outer tub 110 by the bearings installed in a lower portion of the outer tub 110. The washing shaft 132a integrated with the upper portion of the rotation shaft 132 extends vertically upward, penetrating the center portion of the hub 124.

The washing shaft 132a is coupled to the shaft coupling portion 123c having a circular shape and protruding from the center portion of the blade 123. Thereby, the washing shaft 132a transmits the rotational power of the drive motor 130 to the blade 123 without decreasing the rotational speed. In addition, the washing shaft 132a is arranged in the direction of gravitation, and is coupled to the sun gear 142 by passing through the bottom surface of the gearbox housing 141 of the power transmission unit 140. The washing shaft 132a axially supports the planetary gears 143 connected to the sun gear 142, the ring gear 145 and carrier 144 connected to the planetary gears 143, and the gearbox housing 141 connected to the carrier 144, and the like.

The upper connection shaft 144c is disposed on the washing shaft 132a such that the upper connection shaft 144c and washing shaft 132a are placed on the same straight line. However, the upper connection shaft 144c operates separately from the washing shaft 132a. The upper connection shaft 144c is integrally provided to an upper portion of the carrier 144. The upper connection shaft 144c is inserted into the concave groove 122b1 of the pulsator 122 through the power transmission cap 144c.

A shaft support groove 122b2 is concavely formed inside the concave groove 122b1 of the pulsator 122. The power transmission cap 144c placed on top of the upper connection shaft 144c is inserted into the shaft support groove 122b2. A serration lug is formed in the shaft support groove 122b2 so as to face the outer circumferential surface of the power transmission cap 144c. Thereby, the shaft support groove 122b2 is coupled with the power transmission cap 144c in an engaging manner. Thereby, the rotational power may be transmitted from the upper connection shaft 144c to the pulsator 122.

The pulsator 122 is axially supported by the upper connection shaft 144c.

The rotational power generated by the drive motor 130 is transmitted from the washing shaft 132a to the blade 123, thereby rotating the blade 123 at the same revolutions per minute as the drive motor 130. Thereby, the blade 123 may rotate at a rotational speed, for example, 300 rpm, and thus wash water may be pumped to rise and circulate from the base 121 up to the upper end of the inner tub 120a. The circulated wash water is easily mixed with the detergent. The wash water mixed with the detergent uniformly soaks laundry even if the amount thereof is small. Thereby, washing performance may be improved, and power consumption may be reduced.

In addition, the rotational power generated by the drive motor 130 is transmitted from the washing shaft 132a to the sun gear 142 of the power transmission unit 140, and torque increased by decreasing the rotational speed of the drive motor 130 according to the gear ratio among the sun gear 142, the planetary gears 143 and the ring gear 145 is transmitted to the pulsator 122 via the carrier 144, thereby rotating the pulsator 122. Thereby, it is possible to rotate the blade 123 and the pulsator 122 at different numbers of revolutions per minute using the same drive motor 130. In particular, using deceleration of the pulsator 122 and the increased torque, the rotation load of the drive motor 130 may be reduced, and wash water and laundry may be easily stirred. In addition, efficient power transmission of the drive motor 130 may be implemented.

Hereinafter, the first to tenth embodiments will be described in detail, respectively.

Referring to FIGS. 11 to 16, the power transmission unit 140, 240, 340, 440 according to the first to fourth embodiments includes a planetary gear module 140, 240, 340, 440. The planetary gear module 140, 240, 340, 440 is provided to transmit power generated by the same drive motor 130 to the pulsator 122 and the blade 123 to rotate the pulsator 122 and the blade 123 at different revolutions per minute. The planetary gear module 140, 240, 340, 440 includes a sun gear 142, 242, 342, 442, a plurality of planetary gears 143, 243, 343, 443, a ring gear 145, 245, 345, 445 and carrier 144, 244, 344, 444. The planetary gear module 140, 240, 340, 440 includes a gearbox housing 141, 241, 341, 441. The gearbox housing 141, 241, 341, 441 accommodates the sun gear 142, 242, 342, 442, the plurality of planetary gears 143, 243, 343, 443, the ring gear 145, 245, 345, 445 and the carrier 144, 244, 344, 444.

According to the first to fourth embodiments, the sun gear 142, 242, 342, 442 is connected to washing shaft 132a, 232a, 332a, 442a to receive power of the drive motor 130. The sun gear 142, 242, 342, 442 is coupled with the washing shaft 132a, 232a, 332a, 442a. The washing shaft 132a, 232a, 332a, 442a is coupled with the sun gear 142, 242, 342, 442 by passing through the center portion of the sun gear 142, 242, 342, 442. The rotational power of the washing shaft 132a, 232a, 332a, 442a is transmitted to the sun gear 142, 242, 342, 442. The rotational speed and rotation direction of sun gear 142, 242, 342, 442 are identical to the rotational speed and rotation direction of the drive motor 130. A plurality of grooves may be formed in one of the outer circumferential surface of the washing shaft 132a, 232a, 332a, 442a and the inner circumferential surface of the sun gear 142, 242, 342, 442, and a plurality of lugs to be engaged with the grooves may be formed on the other one of the outer circumferential surface of the washing shaft 132a, 232a, 332a, 442a and the inner circumferential surface of the sun gear 142, 242, 342, 442. The sun gear 142, 242, 342, 442 rotates together with the washing shaft 132a, 232a, 332a, 442a. A plurality of gear teeth is formed on the outer circumferential surface of the sun gear 142, 242, 342, 442.

According to the first to fourth embodiments, the planetary gears 143, 243, 343, 443 and the sun gear 142, 242, 342, 442 are coupled to each other in a manner that the gear teeth thereof are engaged with each other. The planetary gears 143, 243, 343, 443 are rotated by rotational power received from the sun gear 142, 242, 342, 442. The planetary gears 143, 243, 343, 443 rotate about a connection shaft 144a, 244a, 344a, 444a coupled therewith by vertically penetrating the center portions of the planetary gears 143, 243, 343, 443. The planetary gears 143, 243, 343, 443 rotate in the direction opposite to the direction of rotation of the sun gear 142, 242, 342, 442. The planetary gears 143, 243, 343, 443 are disposed spaced from each other along the circumference of the sun gear 142, 242, 342, 442.

According to the first to fourth embodiments, the ring gear 145, 245, 345, 445 has a ring shape. A plurality of gear teeth is formed along the inner circumferential surface of the ring gear 145, 245, 345, 445. The plurality of planetary gears 143, 243, 343, 443 is inscribed in the ring gear 145, 245, 345, 445. The ring gear 145, 245, 345, 445 surrounds the plurality of planetary gears 143, 243, 343, 443 and is engaged with the planetary gears 143, 243, 343, 443. The outer side of the ring gear 145, 245, 345, 445 is fixed to the gearbox housing 741, 841, 941, 1041.

According to the first to fourth embodiments, the carrier 144, 244, 344, 444 is arranged such that the plurality of planetary gears 143, 243, 343, 443 is placed between the upper surface and lower surface of the carrier 144, 244, 344, 444. The carrier 144, 244, 344, 444 includes a connection shaft 144a, 244a, 344a, 444a rotatably connecting the planetary gears 143, 243, 343, 443. The connection shaft 144a, 244a, 344a, 444a penetrates the center portion of the planetary gears 143, 243, 343, 443. The number of the provided connection shafts 144a, 244a, 344a, 444a is equal to the number of the planetary gears 143, 243, 343, 443. The connection shafts 144a, 244a, 344a, 444a are arranged between the upper surface and lower surface of the carrier 144, 244, 344, 444. The upper ends of the connection shafts 144a, 244a, 344a, 444a are coupled to the upper surface of the carrier 144, 244, 344, 444. The lower ends of the connection shafts 144a, 244a, 344a, 444a are coupled to the lower surface of the carrier 144, 244, 344, 444. The connection shafts 144a, 244a, 344a, 444a serve to support the planetary gears 143, 243, 343, 443 such that the planetary gears 143, 243, 343, 443 rotate around the sun gear 142, 242, 342, 442 in the circumferential direction, keeping a predetermined distance from each other.

Hereinafter, the power transmission unit 140 according to the first embodiment will be described in detail with reference to FIGS. 11 and 13.

In the first embodiment, the rotational speed of the pulsator 122 is lower than the rotational speed of the blade 123. The power transmission unit 140 transmits power of the drive motor 130 to the pulsator 122 such that the rotational speed of the pulsator 122 is lower than the rotational speed of the drive motor 130. The power transmission unit 140 transmits power to the blade 123 such that the rotational speed of the drive motor 130 is equal to the rotational speed of the blade 123. For example, the pulsator 122 may be rotated at a speed within the range between 100 rpm and 120 rpm, and the blade 123 may be rotated at a speed within the range between 280 rpm and 320 rpm. For example, revolutions per minute of the drive motor 130 may be 300 rpm. By decreasing the rotational speed of the pulsator 122, the rotation load of the drive motor 130 may be reduced. That is, due to decrease in rotational speed of the carrier 144, torque transmitted to the pulsator 122 increases. Due to the increased torque, the pulsator 122 may apply less load to the drive motor 130 than the blade 123 even if a relatively large amount of water and soaked laundry is rotated. By the rotational speed of the blade 123 higher than the rotational speed of the pulsator 122, a pumping pressure for pumping water up to the upper end of the inner tub assembly 120 along the circulation duct 126 and a pumping speed of wash water may be sufficiently secured.

In the first embodiment, the direction of rotation of the pulsator 122 is identical to the direction of rotation of the blade 123. That is, the direction of rotation of the washing shaft 132a, the direction of rotation of the sun gear 142, the direction of rotation of the blade 123, the direction of revolution of the planetary gears 143, and the direction of rotation of the pulsator 122 are the same.

The inner side surface of the gearbox housing 141 is provided with a ring gear accommodation groove for accommodating the ring gear 145. The ring gear 145 is inserted into and fixed to the ring gear accommodation groove.

The gearbox housing 141 is fixed to the inner tub assembly 120 by the jig 146. The jig 146 is disposed to connect the outer circumferential portion of the gearbox housing 141 to the base 121. The jig 146 includes a center portion having a ring shape. The jig 146 includes a plurality of extensions radially extending from the center portion toward the base. A coupling portion is formed on the outer circumferential portion of the gearbox housing 141. The coupling portion of the gearbox housing 141 is coupled to the center portion of the jig 146. The center portion of the jig 146 and the outer circumferential portion of the gearbox housing 141 are fastened to each other by a fastening member. The extensions of the jig 146 may be fastened to the base 121 by a fastening member such as a bolt.

The ring gear 145 is fixed to the gearbox housing 141. A plurality of lugs is formed on one of the gearbox housing 141 and the ring gear 145, and a plurality of ring gear accommodation grooves 145a to be engaged with the lugs is formed on the other one of the gearbox housing 141 and the ring gear 145. Referring to FIG. 13, the ring gear accommodation grooves 145a are formed in the outer circumferential surface of the ring gear 145, and spaced a certain distance from each other in a circumferential direction. The lugs are formed on the inner circumferential surface of the gearbox housing 141 at a predetermined distance from each other in the circumferential direction. The lugs are inserted into and coupled with the ring gear accommodation grooves 145a. Alternatively, the lugs may be formed on the outer circumferential surface of the ring gear 145, and the ring gear accommodation grooves 145a may be formed on the inner side surface of the gearbox housing 141. The ring gear 145 is fixed to the inner tub assembly 120 by the jig 146.

As the ring gear 145 is fixed to the inner tub assembly 120, the planetary gears 143 revolves along the inner circumferential surface of the ring gear 145, while being engaged with the ring gear 145. The planetary gears 143 revolve around the sun gear 142. The direction of revolution of the planetary gears 143 is identical to the direction of rotation of the sun gear 142. Revolutions per minute according to revolution of the plurality of planetary gears 143 may be set according to the gear ratio between the ring gear 145 and sun gear 142. Revolutions per minute of the carrier 144 are the same as revolutions per minute according to revolution of the plurality of planetary gears 143. Revolutions per minute of the carrier 144 are determined by the gear ratio between the ring gear 145 and the sun gear 142 and revolutions per minute of the sun gear 142.

The carrier 144 forms the upper connection shaft 144b. The upper connection shaft 144b integrally rotates with the carrier 144. The upper connection shaft 144b is inserted into and coupled with the shaft support groove 122b2 formed at the center of the bottom surface of the pulsator 122. The upper connection shaft 144b transmits power to the pulsator 122.

The carrier 144 includes a power transmission cap 144c disposed between the upper connection shaft 144b and the shaft support groove 122b2. The upper connection shaft 144c is inserted and coupled between the upper connection shaft 144b and the shaft support groove 122b2. The interior of the power transmission cap 144c is provided with a coupling portion allowing the upper connection shaft 144b to be press-fitted thereinto. Serration lugs for transmitting rotational power are formed on the outer circumferential surface of the power transmission cap 144c.

The blade 123 is directly connected to the drive motor 130, and thus rotates at the same speed as the drive motor 130 in the same direction of rotation as the drive motor 130. The center portion of the blade 123 is provided with a shaft coupling portion 123c. The washing shaft 132a, which is directly connected to the drive motor 130, is coupled to the shaft coupling portion 123c.

The pulsator 122 receives rotational power through the upper connection shaft 144b of the carrier 144. The upper connection shaft 144b is vertically disposed at an upper portion of the washing shaft 132a. The upper connection shaft 144b and washing shaft 132a rotate independently. The speed of the pulsator 122 is decreased according to the gear ratio of the planetary gear module 140.

The planetary gear module 140 includes a plurality of bearings 147a, 147b, 147c, which enable washing shaft 132a, carrier 144 and gearbox housing 141 to rotate relative to each other. A first bearing 147a may be installed between the upper surface of the gearbox housing 141 and the upper connection shaft 144b. Thereby, the upper connection shaft 144b may rotate relative to the gearbox housing 141. A second bearing 147b may be installed between the inner surface of the carrier 144 and the washing shaft 132a. Thereby, the washing shaft 132a may rotate independently from the carrier 144. A plurality of second bearings 147b may be provided. The second bearings 147b may be spaced from each other in the vertical direction. A third bearing 147c may be installed between the inner surface of the gearbox housing 141 and the outer side surface of the carrier 144. Thereby, the carrier 144 may rotate relative to the gearbox housing 141.

Referring to FIGS. 12 and 13, the second embodiment has the following differences from the first embodiment: i) the rotational speed of the pulsator 122 is decreased below the rotational speed of the blade 123 (the rotational speed of the pulsator 122 is lower than the rotational speed of the blade 123); ii) the pulsator 122 integrally rotates with the washing shaft 232a, and the blade 123 integrally rotates with the carrier 244; iii) the carrier 244 need not include either an upper connection shaft or a power transmission cap.

Hereinafter, a power transmission unit 240 according to the second embodiment will be described in detail.

In the second embodiment, the rotational speed of the blade 123 is lower than the rotational speed of the pulsator 122. The power transmission unit 240 transmits power to the blade 123 such that the rotational speed of the blade 123 is lower than the rotational speed of the drive motor 130. The power transmission unit 240 transmits power to the pulsator 122 such that the rotational speed of the drive motor 130 is equal to the rotational speed of the pulsator 122. For example, the blade 123 may be rotated at a speed within the range between 100 rpm and 120 rpm, and the pulsator 122 may be rotated at a speed within the range between 280 rpm and 320 rpm. For example, revolutions per minute of the drive motor 130 may be 300 rpm. The planetary gear module transmits, to the blade 123, torque increased by reducing the rotational speed of the drive motor 130.

In the second embodiment, the direction of rotation of the pulsator 122 is identical to the direction of rotation of the blade 123. That is, the direction of rotation of the washing shaft 232a, the direction of rotation of the sun gear 242, the direction of rotation of the pulsator 122, the direction of revolution of the planetary gear 243, and the direction of rotation of the blade 123 are the same.

The inner side surface of the gearbox housing 241 is provided with a ring gear accommodation groove for accommodating the ring gear 245. The ring gear 245 is fixed to the ring gear accommodation groove by being inserted into the ring gear accommodation groove.

The gearbox housing 241 is fixed to the inner tub assembly 120 by the jig 146. The jig 146 is disposed to connect the outer circumferential portion of the gearbox housing 241 to the base 121. The jig 146 includes a center portion having a ring shape. The jig 146 includes a plurality of extensions radially extending from the center portion toward the base. A coupling portion is formed on the outer circumferential portion of the gearbox housing 241. The coupling portion of the gearbox housing 241 is coupled to the center portion of the jig 146. The center portion of the jig 146 and the outer circumferential portion of the gearbox housing 241 are fastened to each other by a fastening member. The extensions of the jig 146 may be fastened to the base 121 by a fastening member such as a bolt.

The ring gear 245 is fixed to the gearbox housing 141. In order to transmit rotational power of the ring gear 245 to the gearbox housing 241, a plurality of lugs is formed on one of the gearbox housing 241 and the ring gear 245, and a plurality of lug accommodation grooves 245a to be engaged with the lugs is formed on the other one of the gearbox housing 241 and the ring gear 245. Referring to FIG. 13, the lug accommodation grooves 245a are formed on the outer circumferential surface of the ring gear 245, and spaced a certain distance from each other in a circumferential direction. The lugs are formed on the inner circumferential surface of the gearbox housing 241 at a predetermined distance from each other in the circumferential direction. The lugs are inserted into and coupled with the lug accommodation grooves 245a. Alternatively, the lugs may be formed on the outer circumferential surface of the ring gear 245, and the lug accommodation grooves 245a may be formed on the inner side surface of the gearbox housing 241. The ring gear 245 is fixed to the inner tub assembly 120 by the jig 146.

As the ring gear 245 is fixed to the inner tub assembly 120, the planetary gear 243 revolves along the inner circumferential surface of the ring gear 245, while being engaged with the ring gear 245. The planetary gear 243 revolves around the sun gear 242. The direction of revolution of the planetary gear 243 is identical to the direction of rotation of the sun gear 242. Revolutions per minute according to revolution of the plurality of planetary gear 243 may be set according to the gear ratio between the ring gear 245 and sun gear 242. Revolutions per minute of the carrier 244 are equal to revelations per minute according to revolution of the plurality of planetary gear 243. Revolutions per minute of the carrier 244 are determined by the gear ratio between the ring gear 245 and sun gear 242 and revolutions per minute of the sun gear 242.

The blade 123 is rotated by the rotational power transmitted from the carrier 244. The rotational speed of the blade 123 is decreased according to the gear ratio between the sun gear 242 and ring gear 245. The carrier 244 is coupled to the center portion of the inner tub assembly 120. The blade 123 is coupled to the lower portion of the carrier 244. The blade 123 integrally rotates with the carrier 244. A plurality of lugs and a plurality of lug accommodation grooves may be provided to the boundary surfaces between the carrier 244 and blade 123. The plurality of lugs is disposed to face the plurality of lug accommodation grooves. The rotational power received by the carrier 244 is transmitted to the blade 123. The lugs or lug accommodation grooves may be formed on the carrier 244, and the lug accommodation grooves or the lugs may be formed on the blade 123.

The pulsator 122 is directly connected to the drive motor 130, and thus rotates at the same speed as the drive motor 130 in the same direction of rotation as the drive motor 130. The washing shaft 232a is directly connected to the pulsator 122. The pulsator 122 receives power of the drive motor 130 via the washing shaft 232a. The washing shaft 232a penetrates the gearbox housing 241. The washing shaft 232a vertically extends up to the shaft support groove 122b2 of the pulsator 122. The upper portion of the washing shaft 232a is coupled to the pulsator 122.

The planetary gear module 240 includes a plurality of bearings 247a, 247b, 247c, 247d, which enable the washing shaft 232a, carrier 244 and gearbox housing 241 to rotate relative to each other. A first bearing 247a may be installed between the upper surface of the gearbox housing 241 and the washing shaft 232a. Thereby, the washing shaft 232a may rotate relative to the gearbox housing 241. A second bearing 247b may be installed between the inner surface of the carrier 244 and the washing shaft 232a. Thereby, the washing shaft 232a may rotate independently from the carrier 244. A third bearing 247c may be installed between the inner surface of the gearbox housing 241 and the outer side surface of the carrier 244. Thereby, the carrier 244 may rotate relative to the gearbox housing 241. A fourth bearing 247d may be installed between the inner side surface of the blade 123 and the washing shaft 232a. Thereby, the blade 123 may rotate relative to the washing shaft 232a.

Referring to FIGS. 14 and 15, the third embodiment has the following differences from the first embodiment: i) the rotational speed of the pulsator 122 is lower than the rotational speed of the blade 123; ii) the direction of rotation of the pulsator 122 is opposite to the direction of rotation of the blade 123; iii) the pulsator 122 integrally rotates with the washing shaft 332a, and the blade 123 integrally rotates with the ring gear 345; iv) the carrier 244 need not include either an upper connection shaft or a power transmission cap; the jig 146 is not needed; vi) the carrier 344 is fixed to the inner tub assembly 120.

Hereinafter, a power transmission unit 340 according to the third embodiment will be described in detail.

In the third embodiment, the rotational speed of the blade 123 is lower than the rotational speed of the pulsator 122. The power transmission unit 340 transmits power to the blade 123 such that the rotational speed of the blade 123 is lower than the rotational speed of the drive motor 130. The power transmission unit 340 transmits power to the pulsator 122 such that the rotational speed of the drive motor 130 is equal to the rotational speed of the pulsator 122. For example, the blade 123 may be rotated at a speed within the range between 100 rpm and 120 rpm, and the pulsator 122 may be rotated at a speed within the range between 280 rpm and 320 rpm. For example, revolutions per minute of the drive motor 130 may be 300 rpm. The planetary gear module transmits, to the blade 123, torque increased by reducing the rotational speed of the drive motor 130.

In the third embodiment, the direction of rotation of the pulsator 122 is opposite to the direction of rotation of the blade 123. The power transmission unit 340 transmits power such that the direction of rotation of the pulsator 122 is opposite to the direction of rotation of the blade 123. The direction of rotation of the washing shaft 332a, the direction of rotation of the sun gear 342, and the direction of rotation of the pulsator 122 are the same. The direction of rotation of the ring gear 345 is the same as the direction of rotation of the blade 123. The direction of rotation of the washing shaft 332a, the sun gear 342 and pulsator 122 is opposite to the direction of rotation of the ring gear 345 and blade 123. The pulsator 122 and the blade 123 rotate in the opposite directions, and wash water and the detergent introduced into the lower portion of the inner tub assembly 120 through the wash water introduction holes in the hub 124 are easily mixed by the stirring operation of the blade 123. According, washing performance may be improved. In addition, in the case where laundry on the pulsator 122 are concentrated at one position in the inner tub 120a, if washing is performed solely by rotation of the pulsator 122, vibration develops in the inner tub assembly 120. However, if the blade 123 rotates in the direction opposite to the direction of rotation of the pulsator 122, the exciting force generated by the pulsator 122 may be reduced. This effect is the same as the effect of vibration attenuation according to the principle of the gyro effect. The gyro effect refers to a tendency of a body of rotation rotating at a high speed to uniformly maintain the axis of rotation thereof.

The inner side surface of the gearbox housing 341 is provided with a ring gear accommodation groove for accommodating the ring gear 345. The ring gear 345 is fixed to the ring gear accommodation groove by being inserted into the ring gear accommodation groove.

The gearbox housing 341 is not fixed to the inner tub assembly 120. The gearbox housing 341 rotates relative to the inner tub assembly 120.

The carrier 344 is fixed to the inner tub assembly 120. The carrier 344 is fixed to the hub 324. The carrier 344 is coupled to the center portion of the hub 324. A plurality of lugs and a plurality of lug accommodation grooves are formed between the carrier 344 and hub 124. Thereby, the carrier 344 is fixed by the hub 124.

The ring gear 345 is fixed to the gearbox housing 341. In order to transmit rotational power of the ring gear 345 to the gearbox housing 341, a plurality of lugs is formed on one of the gearbox housing 341 and the ring gear 345, and a plurality of lug accommodation grooves 345a to be engaged with the lugs is formed on the other one of the gearbox housing 341 and the ring gear 345. Referring to FIG. 16, the lug accommodation grooves 345a are formed on the outer circumferential surface of the ring gear 345, and spaced a certain distance from each other in a circumferential direction. The lugs are formed on the inner circumferential surface of the gearbox housing 341 at a predetermined distance from each other in the circumferential direction. The lugs are inserted into and coupled with the lug accommodation grooves 345a. Alternatively, the lugs may be formed on the outer circumferential surface of the ring gear 345, and the lug accommodation grooves 345a may be formed on the inner side surface of the gearbox housing 341.

The gearbox housing 341 and the ring gear 345 rotate. The gearbox housing 341 and the ring gear 345 rotate relative to the inner tub assembly 120. A jig 146 for fixing the ring gear 345 need not be provided between pulsator 122 and blade 123. As the carrier 344 is fixed to the inner tub assembly 120, the ring gear 345 rotates around the planetary gears 343 while being engaged with the planetary gears 343. The ring gear 345 rotates about the sun gear 342. The direction of rotation of the ring gear 345 is opposite to the direction of rotation of the sun gear 342, and is identical to the direction of rotation of the planetary gears 343. Revolutions per minute of the ring gear 345 are determined by the gear ratio between the ring gear 345 and sun gear 342 and revolutions per minute of the sun gear 342.

The blade 123 is rotated by the rotational power transmitted from the gearbox housing 341. Rotation of the blade 123 is decreased according to the gear ratio between the sun gear 342 and ring gear 345. The gearbox housing 341 is coupled to the center portion of the blade 123. The blade 123 is coupled to the lower portion of the gearbox housing 341. The blade 123 integrally rotates with the gearbox housing 341. The blade 123 integrally rotates with the ring gear 345. A plurality of lugs and a plurality of lug accommodation grooves may be provided to the boundary surfaces between the gearbox housing 341 and blade 123. The plurality of lugs is disposed to face the plurality of lug accommodation grooves. The rotational power received by the gearbox housing 341 is transmitted to the blade 123. The lugs or lug accommodation grooves may be formed on the gearbox housing 341, and the lug accommodation grooves or the lugs may be formed on the blade 123.

The pulsator 122 is directly connected to the drive motor 130, and thus rotates at the same speed as the drive motor 130 and in the same direction of rotation as the drive motor 130. The washing shaft 232a is directly connected to the pulsator 122. The pulsator 122 receives power of the drive motor 130 via the washing shaft 232a. The washing shaft 232a penetrates the gearbox housing 241. The washing shaft 232a vertically extends up to the shaft support groove 122b2 of the pulsator 122. The upper portion of the washing shaft 232a is coupled to the pulsator 122.

The planetary gear module 340 includes a plurality of bearings 347a, 347b, 347c which enable the washing shaft 332a, carrier 344 and gearbox housing 341 to rotate relative to each other. A first bearing 347a may be inserted and installed between the upper surface of the gearbox housing 341 and washing shaft 332a. Thereby, the washing shaft 332a and the gearbox housing 341 may rotate independently at different revolutions per minute. A second bearing 347b may be inserted and installed between the carrier 344 and the washing shaft 332a. Thereby, the washing shaft 332a may rotate relative to the carrier 344. A third bearing 347c may be inserted and installed between the gearbox housing 341 and the carrier 344. Thereby, the gearbox housing 341 may rotate relative to the carrier 344.

Referring to FIGS. 15 and 16, the fourth embodiment has the following differences from the first embodiment: i) the direction of rotation of the pulsator 122 is opposite to the direction of rotation of the blade 123; ii) the pulsator 122 integrally rotates with the ring gear 345, and the blade 123 integrally rotates with the washing shift 442a; iii) the gearbox housing 441 fixes the carrier 444, rather than fixing the ring gear 445; iv) the ring gear 445 is fixed, and a support member 448 rotating relative to the gearbox housing 441 is separately provided; v) the upper connection shaft 448b and the power transmission cap 448c are formed on the support member 448, rather than on the carrier 444.

Hereinafter, a power transmission unit 440 according to the fourth embodiment will be described in detail.

In the fourth embodiment, the rotational speed of the pulsator 122 is lower than the rotational speed of the blade 123. The power transmission unit 440 transmits power to the pulsator 122 such that the rotational speed of the pulsator 122 is lower than the rotational speed of the drive motor 130. The power transmission unit 440 transmits power to the blade 123 such that the rotational speed of the drive motor 130 is equal to the rotational speed of the blade 123. For example, the pulsator 122 may be rotated at a speed within the range between 100 rpm and 120 rpm, and the blade 123 may be rotated at a speed within the range between 280 rpm and 320 rpm. For example, revolutions per minute of the drive motor 130 may be 300 rpm. The resulting effect is the same as the effect of the first embodiment.

In the fourth embodiment, the direction of rotation of the pulsator 122 is opposite to the direction of rotation of the blade 123. The power transmission unit 440 transmits power such that the direction of rotation of the pulsator 122 is opposite to the direction of rotation of the blade 123. The direction of rotation of the washing shaft 432a, the direction of rotation of the sun gear 442, and the direction of rotation of the blade 123 are the same. The direction of rotation of the ring gear 445 is the same as the direction of rotation of the pulsator 122. The direction of rotation of the washing shaft 432a, the sun gear 442 and blade 123 is opposite to the direction of rotation of the ring gear 445 and pulsator 122. The resulting effect is the same as the effect of the third embodiment.

The planetary gear module 440 includes a support member 448. The support member 448 is disposed in the gearbox housing 441. The support member 448 is a separate member rotating independently from the gearbox housing 441. The planetary gear module 440 rotates relative to the gearbox housing 441. A ring gear accommodation groove for accommodating the ring gear 445 is provided in the inner side surface of the planetary gear module 440. The planetary gear module 440 is inserted into and fixed to the ring gear accommodation groove.

The gearbox housing 441 fixes the carrier 444. The jig 146 fixes the gearbox housing 441 to the inner tub assembly 120. The carrier 444 is fixed to the inner tub assembly 120 by the gearbox housing 441 and jig 146.

The gearbox housing 441 is fixed by the jig 146. The jig 146 is disposed to connect the outer circumferential portion of the gearbox housing 441 to the inner tub assembly 120. The jig 146 includes a center portion having a ring shape. The jig 146 includes a plurality of extensions radially extending from the center portion toward the base. A coupling portion is formed on the outer circumferential portion of the gearbox housing 441. The coupling portion of the gearbox housing 441 is coupled to the center portion of the jig 146. The center portion of the jig 146 and the outer circumferential portion of the gearbox housing 441 are fastened to each other by a fastening member. The extensions of the jig 146 may be fastened to the base 121 by a fastening member such as a bolt.

The ring gear 445 is fixed to the support member 448. In order to transmit rotational power of the ring gear 445 to the support member 448, a plurality of lugs is formed on one of the support member 448 and the ring gear 445, and a plurality of lug accommodation grooves 445a to be engaged with the lugs is formed on the other one of the support member 448 and the ring gear 445. Referring to FIG. 16, the lug accommodation grooves 445a are formed on the outer circumferential surface of the ring gear 445, and spaced a certain distance from each other in a circumferential direction. The lugs are formed on the inner circumferential surface of the support member 448 at a predetermined distance from each other in the circumferential direction.

The lugs are inserted into and coupled with the lug accommodation grooves 445a. Alternatively, the lugs may be formed on the outer circumferential surface of the ring gear 445, and the lug accommodation grooves 445a may be formed on the inner side surface of the support member 448.

The ring gear 445 and the support member 448 rotate. The support member 448 and the ring gear 445 rotate relative to the inner tub assembly 120. The jig 146 disposed between the pulsator 122 and the blade 123 does not fix the ring gear 445. As the carrier 444 is fixed to the inner tub assembly 120, the ring gear 445 rotates around the planetary gears 443 while being engaged with the planetary gears 443. The ring gear 445 rotates about the sun gear 442. The direction of rotation of the ring gear 445 is opposite to the direction of rotation of the sun gear 442, and is identical to the direction of rotation of the planetary gears 443. Revolutions per minute of the ring gear 445 are determined by the gear ratio between the ring gear 445 and sun gear 442 and revolutions per minute of the sun gear 442.

The support member 448 forms the upper connection shaft 448b. The upper connection shaft 448b integrally rotates with the support member 448. The upper connection shaft 448b is inserted into and coupled with the shaft support groove 122b2 formed at the center of the bottom surface of the pulsator 122. The upper connection shaft 448b transmits power to the pulsator 122.

The support member 448 includes a power transmission cap 448c disposed between the upper connection shaft 448b and the shaft support groove 122b2. The power transmission cap 448c is inserted and coupled between the upper connection shaft 448b and the shaft support groove 122b2. The interior of the power transmission cap 448c is provided with a coupling portion allowing the upper connection shaft 448b to be press-fitted thereinto. Serration lugs for transmitting rotational power are formed on the outer circumferential surface of the power transmission cap 448c.

The blade 123 is directly connected to the drive motor 130, and thus rotates at the same speed as the drive motor 130 and in the same direction of rotation as the drive motor 130. The center portion of the blade 123 is provided with a shaft coupling portion 123c. The washing shaft 432a, which is directly connected to the drive motor 130, is coupled to the shaft coupling portion 123c.

The pulsator 122 receives rotational power through the upper connection shaft 448b of the support member 448. The upper connection shaft 448b is vertically disposed at an upper portion of the washing shaft 432a. The upper connection shaft 448b and the washing shaft 432a rotate independently. The rotational speed of the pulsator 122 is decreased according to the gear ratio of the planetary gear module 440.

The planetary gear module 440 includes a plurality of bearings 447a, 447b, 447c which enable the washing shaft 432a, carrier 444 and support member 448 to rotate relative to each other. A first bearing 447a may be installed between the upper portion of the gearbox housing 441 and upper connection shaft 448b of the support member 448. Thereby, the upper connection shaft 448b may rotate relative to the gearbox housing 441. A second bearing 447b may be installed between the inner surface of the carrier 444 and the washing shaft 432a. Thereby, the washing shaft 432a may rotate independently from the carrier 444. A plurality of second bearings 447b may be provided. The second bearings 447b may be spaced from each other in the vertical direction. A third bearing 447c may be installed between the inner side surface of the support member 448 and the outer side surface of the carrier 444. Thereby, the support member 448 may rotate relative to the carrier 444.

Referring FIGS. 17A, 17B, 18A, 18B and 19, the power transmission unit 540, 640 according to the fifth and sixth embodiments includes a plurality of bevel gears. The plurality of bevel gears according to the fifth and sixth embodiments is rotatably provided in the gearbox housing 541, 641. The plurality of bevel gears includes a first bevel gear 5421, 6421 and a third bevel gear 5423, 6423, whose axes of rotation are arranged in the vertical direction. The plurality of bevel gears includes a plurality of second bevel gears 5422, 6422, whose axes of rotation are arranged in the horizontal direction. Herein, the horizontal direction is the direction parallel with the surface of wash water, and the vertical direction is a direction identical to or parallel with the direction of gravitation.

Referring FIGS. 17A, 17B, 18A, 18B and 19, the first bevel gear 5421, 6421 according to the fifth and sixth embodiments integrally rotates with the washing shaft 532a, 632a. The first bevel gear 5421, 6421 is a truncated conical gear. The first bevel gear 5421, 6421 includes a bottom surface, an upper surface, and a lateral surface having a diameter decreasing from the bottom surface to the upper surface and connecting the upper surface with the bottom surface. A plurality of gear teeth is formed on the lateral surface of the first bevel gear 5421, 6421. The inclination angle of the gear teeth of the first bevel gear 5421, 6421 may be, for example, 45°, but embodiments of the present invention are not limited thereto. The washing shaft 532a, 632a serves as the rotation shaft of the first bevel gear 5421, 6421. The washing shaft 532a, 632a penetrates the bottom surface and upper surface of the first bevel gear 5421. The washing shaft 532a, 632a is coupled with the center portion of the first bevel gear 5421. The first bevel gear 5421 is rotated about the washing shaft 532a, 632a by the power transmitted from the drive motor 130. A plurality of lugs is formed on one of the first bevel gear 5421, 6421 and the washing shaft 532a, 632a, and a plurality of lug accommodation grooves to be engaged with the lugs is formed on the other one of the first bevel gear 5421, 6421 and the washing shaft 532a, 632a. Thereby, the rotational power of the drive motor 130 is transmitted from the washing shaft 532a, 632a to the first bevel gear 5421, 6421. The plurality of lugs may be formed on the washing shaft 532a, 632a, and the plurality of lug accommodation grooves may be formed on the first bevel gear 5421, 6421. The positions of the plurality of lugs and the plurality of lug accommodation grooves may be switched. The lugs are a position to face the lug accommodation grooves. The first bevel gear 5421, 6421 rotates at the same speed as the drive motor 130 and in the same direction of rotation as the drive motor 130.

Referring FIGS. 17A, 17B, 18A, 18B and 19, the second bevel gears 5422, 6422 according to the fifth and sixth embodiments is a truncated conical gear. The rotation shaft 5422a, 6422a of the second bevel gears 5422, 6422 is disposed perpendicular to the washing shaft 532a, 632a. A plurality of second bevel gears 5422, 6422 may be provided. The plurality of second bevel gears 5422, 6422 is engaged with the first bevel gear 5421, 6421. The second bevel gears 5422, 6422 are disposed to face each other. The second bevel gears 5422, 6422 are disposed spaced from each other in the circumferential direction. Each of the second bevel gears 5422, 6422 is provided with the rotation shaft 5422a, 6422a. The second bevel gears 5422, 6422 rotate about the rotation shafts 5422a, 6422a. The rotation shafts 5422a, 6422a of the second bevel gears 5422, 6422 are rotatably supported by a support member 543, 643. The support member 543, 643 includes a support body 543a, 643a extending around the washing shaft 532a, 632a in a circumferential direction. The support member 543, 643 includes a support portion 543b, 643b protruding from the support body 543a, 643a toward the rotation shaft 5422a, 6422a. The support portion 543b, 643b protrudes from the support body 543a, 643a upward. A plurality of support portions 543b, 643b may be provided. Each of the support portions 543b, 643b is provided with a shaft accommodation hole. Bearings may be mounted in the shaft accommodation hole of each of the support portions 543b, 643b, rotatably supporting the rotation shafts 5422a, 6422a.

Referring FIGS. 17A, 17B, 18A, 18B and 19, the third bevel gear 5423, 6423 according to the fifth and sixth embodiments is a truncated conical gear. The third bevel gear 5423, 6423 is disposed to face the first bevel gear 5421, 6421. The third bevel gear 5423, 6423 is rotatably provided to the upper portion of the gearbox housing 541, 641. A plurality of gear teeth is provided to the lateral surface of the third bevel gear 5423, 6423 so as to be engaged with the second bevel gears 5422, 6422. The third bevel gear 5423, 6423 receives rotational power transmitted from the second bevel gears 5422, 6422.

In the fifth and sixth embodiments, the blade 123 and the pulsator 122 rotate at the same rotational speed. The power transmission unit 540, 640 transmits power to the pulsator 122 such that the rotational speed of the drive motor 130 is equal to the rotational speed of the pulsator 122. The power transmission unit 540, 640 transmits power to the blade 123 such that the rotational speed of the drive motor 130 is equal to the rotational speed of the blade 123. The blade 123 and the pulsator 122 rotate at the same rotational speed as the drive motor 130. The first bevel gear 5421, 6421 and the third bevel gear 5423, 6423 have the same number of gear teeth. The gear ratio between the first bevel gear 5421, 6421 and the third bevel gear 5423, 6423 is 1:1. The third bevel gear 5423 rotates at the same rotational speed as the first bevel gearing 5421.

In the fifth and sixth embodiments, the direction of rotation of the blade 123 is opposite to the direction of rotation of the pulsator 122. The power transmission unit 540, 640 transmits power such that the direction of rotation of the pulsator 122 is opposite to the direction of rotation of the blade 123. As the blade 123 and pulsator 122 rotate in the opposite direction is, dissolution of the detergent may be further enhanced, and vibration caused by the pulsator 122 due to mass distribution of laundry on the pulsator 122 may be attenuated.

Hereinafter, the power transmission unit 540 according to the fifth embodiment will be described in detail with reference to FIGS. 17A, 17B, and 19.

The gearbox housing 541 is not fixed to the inner tub assembly 120. The gearbox housing 541 rotates relative to the inner tub assembly 120. The gearbox housing 541 is disposed between the pulsator 122 and blade 123. The gearbox housing 541 is inserted into the concave groove 122b1 of the pulsator 122.

The support member 543 is fixed to the inner tub assembly 120. The support member 543 is fixed to the hub 124. A center coupling portion 124b for coupling with the rotation shaft 5422a of the drive motor 130 is provided to the interior of the hub 124. The support member 543 is fixedly coupled with the center coupling portion 124b of the hub 124. The lower side of the support body 543a is fixed to the center coupling portion 124b of the hub 124. The upper surface of the center coupling portion 124b is coupled with the lower side of the support body 543a. The inner circumferential surface of the center coupling portion 124b of the hub 124 is provided with a plurality of lug grooves with which gear teeth may be engaged. The support body 543a accommodates the first bevel gear 5421 in a surrounding manner. The support body 543a is spaced from the first bevel gear 5421. The upper side of the support body 543a is configured to connect the plurality of support portions 543b. The second bevel gear 5422 is supported by the support portions 543b. Thus, the second bevel gear 5422 does not revolve around the washing shaft 532a, but only rotates about the rotation shaft 5422b.

The third bevel gear 5423 integrally rotates with the blade 123. The third bevel gear 5423 integrally rotates with the gearbox housing 541. The third bevel gear 5423 rotates relative to the washing shaft 532b. A plurality of lugs 5423b is formed on one of the third bevel gear 5423 and the gearbox housing 541, and a plurality of lug accommodation grooves 5423a to be engaged with the lugs 5423b is formed on the other one of the third bevel gear 5423 and the gearbox housing 541. The lugs 5423b may be formed on the third bevel gear 5423, and the lug accommodation grooves 5423a may be formed on the gearbox housing 541. The lugs 5423b are inserted into and coupled with the lug accommodation grooves 5423a. The rotational power of the third bevel gear 5423 is transmitted to the gearbox housing 541. In order to transmit the rotational power of the third bevel gear 5423 to the gearbox housing 541, the lugs 5423b are arranged to face the lug accommodation grooves 5423a. The positions of the plurality of lugs 5423b and the plurality of lug accommodation grooves 5423a may be switched.

The blade 123 integrally rotates with the third bevel gear 5423. The blade 123 receives power from the drive motor 130 via the third bevel gear 5423 and the gearbox housing 541. The outer circumferential portion of the gearbox housing 541 is coupled with the center portion of the blade 123. The rotational power of the third bevel gear 5423 is transmitted to the blade 123 via the gearbox housing 541. The blade 123 rotates at the same rotational speed as the drive motor 130 in the direction opposite to the direction of rotation of the drive motor 130. The direction of rotation of the blade 123 is opposite to the direction of rotation of the washing shaft 532a.

The pulsator 122 integrally rotates with the first bevel gear 5421. The pulsator 122 integrally rotates with the washing shaft 532a. The washing shaft 532a extends upward, penetrating the bottom surface of the gearbox housing 541. The washing shaft 532a is coupled to the shaft support groove 122b2 of the pulsator 122. The pulsator 122 may be fastened to the washing shaft 532a by a fastening member such as its groove. The pulsator 122 receives power from the drive motor 130 via the washing shaft 532a. The washing shaft 532a penetrates the third bevel gear 5423 as well as the first bevel gear 5421. The washing shaft 532a is engaged with the first bevel gear 5421. The washing shaft 532a is separated from the third bevel gear 5423. The pulsator 122 rotates at the same speed as the drive motor 130 and in the same direction of rotation as the drive motor 130. The direction of rotation of the pulsator 122 is identical to the direction of rotation of the washing shaft 532a.

The power transmission unit 540 includes a plurality of bearings 547a, 547b, 547c which enable the washing shaft 532a, gearbox housing 541 and center coupling portion 124b to rotate relative to each other and enable the washing shaft 532a, gearbox housing 541 and support member 543 to rotate relative to each other. A first bearing 547a may be installed between the upper portion of the gearbox housing 541 and the washing shaft 532a. The first bearing 547a may be installed between the center portion of the third bevel gear 5423 and washing shaft 532a. The washing shaft 532a is coupled to the inner circumferential surface of the first bearing 547a. The first bearing 547a enables the third bevel gear 5423 to rotate relative to the washing shaft 532a. The washing shaft 532a and the third bevel gear 5423 may rotate independently. In addition, a second bearing 547b is installed between the inner circumferential surface of the gearbox housing 541 and the outer circumferential surface of the support body 543a, and gearbox housing 141 may rotate relative to the support body 543a. In addition, a third bearing 547c is installed between the center coupling portion 124b of the hub 124 and washing shaft 532a. The washing shaft 532a is coupled to the inner circumferential surface of the third bearing 547c. The washing shaft 532a may rotate relative to the hub 124.

Referring to FIGS. 18A, 18B and 19, the sixth embodiment, which will be described below, has the following differences from the fifth embodiment: i) the blade 123 integrally rotates with the washing shift 442a and a first bevel gear 6421, and the pulsator 122 integrally rotates with the third bevel gear 6423 and an upper connection shaft 649b; ii) the gearbox housing 441 is fixed to the inner tub assembly 120 by the jig 146, and fixes a support member 643; iii) a third bevel gear support member 649 coupled to a third bevel gear 6423 and rotating relative to the gearbox housing 441 is separately provided; iv) the upper connection shaft 448b and the power transmission cap 448c are formed on the support member 649.

Hereinafter, a power transmission unit 640 according to the sixth embodiment will be described in detail.

The gearbox housing 641 is fixed to the inner tub assembly 120. The gearbox housing 641 is fixed to the inner tub assembly 120 by the jig 146. The gearbox housing 641 is disposed between the pulsator 122 and blade 123. The gearbox housing 641 is inserted into the concave groove 122b1 of the pulsator 122.

The gearbox housing 641 is fixed by the jig 146. The jig 146 is disposed to connect the outer circumferential portion of the gearbox housing 641 to the base 121. The jig 146 includes a center portion having a ring shape. The jig 146 includes a plurality of extensions radially extending from the center portion toward the base. A coupling portion is formed on the outer circumferential portion of the gearbox housing 641. The coupling portion of the gearbox housing 641 is coupled to the center portion of the jig 146. The center portion of the jig 146 and the outer circumferential portion of the gearbox housing 641 are fastened to each other by a fastening member. The extensions of the jig 146 may be fastened to the base 121 by a fastening member such as a bolt.

The support member 643 is fixed to the gearbox housing 641. The support member 643 is fixed to the inner tub assembly 120 by the gearbox housing 641 and jig 146. The support body 643a accommodates the first bevel gear 6421 in a surrounding manner. The support body 643a is spaced from the first bevel gear 6421. The upper side of the support body 643a is configured to connect the plurality of support portions 643b. The second bevel gear 6422 is supported by the support portions 643b. Thus, the second bevel gear 6422 does not revolve around the washing shaft 632a, but only rotates about the rotation shaft 6422b.

The third bevel gear 6423 integrally rotates with the pulsator 122. The power transmission unit 640 includes a support member 649. The support member 649 is disposed in the gearbox housing 641. The support member 649 is a separate member rotating independently from the gearbox housing 641. The support member 649 rotates relative to the gearbox housing 641. The support member 649 is fixedly coupled to the third bevel gear 6423. The third bevel gear 6423 integrally rotates with the support member 649. The third bevel gear 6423 rotates relative to the washing shaft 632*b*. A plurality of lugs 6423*b* is formed on one of the third bevel gear 6423 and the support member 649, and a plurality of lug accommodation grooves 6423*a* to be engaged with the lugs 6423*b* is formed on the other one of the third bevel gear 6423 and the support member 649. The lugs 6423*b* may be formed on the third bevel gear 6423, and the lug accommodation grooves 6423*a* may be formed on the support member 649. The lugs 6423*b* are inserted into and coupled with the lug accommodation grooves 6423*a*. The rotational power of the third bevel gear 6423 is transmitted to the support member 649. In order to transmit the rotational power of the third bevel gear 6423 to the support member 649, the lugs 6423*b* are arranged to face the lug accommodation grooves 6423*a*. The positions of the plurality of lugs 6423*b* and the plurality of lug accommodation grooves 6423*a* may be switched.

The support member 649 forms the upper connection shaft 649*b*. The upper connection shaft 649*b* integrally rotates with the support member 649. The upper connection shaft 649*b* is inserted into and coupled with the shaft support groove 122*b*2 formed at the center of the bottom surface of the pulsator 122. The upper connection shaft 649*b* transmits power to the pulsator 122.

The support member 649 includes a power transmission cap 649*c* disposed between the upper connection shaft 649*b* and the shaft support groove 122*b*2. The power transmission cap 649*c* is inserted and coupled between the upper connection shaft 649*b* and the shaft support groove 122*b*2. The interior of the power transmission cap 649*c* is provided with a coupling portion allowing the upper connection shaft 649*b* to be press-fitted thereinto. Serration lugs for transmitting rotational power are formed on the outer circumferential surface of the power transmission cap 649*c*.

The blade 123 integrally rotates with the first bevel gear 6421. The blade 123 receives power from the drive motor 130 via the washing shaft 632*a* and the first bevel gear 6421. The washing shaft 632*a* extends upward, penetrating the bottom surface of the gearbox housing 641. The washing shaft 632*a* illustrates the first bevel gear 6421. The washing shaft 632*a* is engaged with the first bevel gear 6421. The washing shaft 632*a* separated from the third bevel gear 6423. The blade 123 rotates at the same rotational speed as the drive motor 130 in the same direction of rotation as the drive motor 130. The direction of rotation of the blade 123 is identical to the direction of rotation of the washing shaft 632*a*.

The pulsator 122 integrally rotates with the third bevel gear 6423. The pulsator 122 integrally rotates with the upper connection shaft 649*b*. The upper connection shaft 649*b* is particularly disposed at an upper portion of the washing shaft 632*a*. The upper connection shaft 649*b* and the washing shaft 632*a* rotate independently. The pulsator 122 rotates at the same speed as the drive motor 130 in the direction opposite to the direction of rotation of the drive motor 130. The direction of rotation of the pulsator 122 is opposite to the direction of rotation of the washing shaft 632*a*.

The power transmission unit 640 includes a plurality of bearings 647*a*, 647*b*, 647*c* which enable the blade 123, gearbox housing 641 and upper connection shaft 649*b* to rotate relative to each other. A first bearing 647*a* is installed between the upper portion of the gearbox housing 641 and the upper connection shaft 649*b*. The upper connection shaft 649*b* is coupled to the inner circumferential surface of the first bearing 647*a*. The first bearing 647*a* enables the upper connection shaft 649*b* to rotate relative to the gearbox housing 641. The upper connection shaft 649*b* and the gearbox housing 641 may rotate independently. In addition, a second bearing 647*b* is installed between the gearbox housing 641 and the blade 123, and the base 121 may rotate relative to the gearbox housing 141.

Referring to FIGS. 20A to 23, the power transmission unit 740, 840, 940, 1040 according to the seventh to tenth embodiments includes a power transmission unit 740, 840, 940, 1040 provided with a separate planetary gear set. The power transmission unit 740, 840, 940, 1040 may include dual gearboxes. The power transmission unit 740, 840, 940, 1040 are provided to transmit power generated by the same drive motor 130 to the pulsator 122 and blade 123 to rotate the pulsator 122 and the blade 123 at different revolutions per minute. The power transmission unit 740, 840, 940, 1040 may decrease the rotational speed of the drive motor 130 (e.g., 450 rpm) to two different rotational speeds (e.g., 300 rpm for the blade 123 and 100 rpm for the pulsator 122) to transmit the rotation power of the drive motor 130 to the pulsator 122 and the blade 123. The power transmission unit 740, 840, 940, 1040 transmits power of the drive motor 130 to the pulsator 122 such that the rotational speed of the pulsator 122 is lower than the rotational speed of the drive motor 130. The power transmission unit 740, 840, 940, 1040 transmits power to the blade 123 such that the rotational speed of the blade 123 is lower than the rotational speed of the drive motor 130. The degree of decrease in the rotational speed may be preset for each of the pulsator 122 and the blade 123 through the dual planetary gear module 740, 840, 940, 1040.

The dual planetary gear module 740, 840, 940, 1040 according to the seventh to tenth embodiments includes a first planetary gear module 740*a*, 840*a*, 940*a*, 1040*a* provided to transmit rotational power to the pulsator 122 and a second planetary gear module 740*b*, 840*b*, 940*b*, 1040*b* provided to transmit rotational power to the blade 123.

The planetary gear module 140, 440, 740*a*, 840*a*, 940*a*, 1040*a* transmits power to the pulsator 122 such that a rotational speed of the pulsator 122 is decreased. The planetary gear module 140, 440, 740*a*, 840*a*, 940*a*, 1040*a* transmits power to the pulsator 122 such that a rotational speed of the pulsator 122 is lower than a rotational speed of the drive motor 130.

The planetary gear module 240, 340, 740*b*, 840*b*, 940*b*, 1040*b* transmits power to the blade 123 such that a rotational speed of the blade 123 is decreased. The planetary gear module 240, 340, 740*b*, 840*b*, 940*b*, 1040*b* transmits power to the blade 123 such that a rotational speed of the blade 123 is lower than a rotational speed of the drive motor 130.

The first planetary gear module 740*a*, 840*a*, 940*a*, 1040*a* transmits power to the pulsator 122 such that a rotational speed of the pulsator 122 is decreased. The second planetary gear module 740*b*, 840*b*, 940*b*, 1040*b* transmits power to the blade 123 such that a rotational speed of the blade 123 is decreased.

The first planetary gear module 740*a*, 840*a*, 940*a*, 1040*a* transmits power to the pulsator 122 such that a rotational speed of the pulsator 122 is lower than a rotational speed of the drive motor 130. The second planetary gear module 740*b*, 840*b*, 940*b*, 1040*b* transmits power to the blade 123 such that a rotational speed of the blade 123 is lower than a rotational speed of the drive motor 130.

The first planetary gear module 740*a*, 840*a*, 940*a*, 1040*a* according to the seventh to tenth embodiments includes a first sun gear 742a, 842a, 942a, 1042a, a plurality of first planetary gears 743a, 843a, 943a, 1043a, a first carrier 744a, 844a, 944a, 1044a, and a first ring gear 745a, 845a, 945a, 1045a. The first planetary gear module 740a, 840a, 940a, 1040a includes a first gearbox housing 741a, 841a, 941a, 1041a. The first gearbox housing 741a, 841a, 941a, 1041a accommodates the first sun gear 742a, 842a, 942a, 1042a, the plurality of first planetary gears 743a, 843a, 943a, 1043a, the first carrier 744a, 844a, 944a, 1044a, and the first ring gear 745a, 845a, 945a, 1045a. The first sun gear 742a, 842a, 942a, 1042a, the plurality of first planetary gears 743a, 843a, 943a, 1043a and the first carrier 744a, 844a, 944a, 1044a are rotatably provided in the first gearbox housing 741a, 841a, 941a, 1041a.

The second planetary gear module 740b, 840b, 940b, 1040b according to the seventh to tenth embodiments includes a second sun gear 742b, 842b, 942b, 1042b, a plurality of second planetary gears 743b, 843b, 943b, 1043b, a second carrier 744b, 844b, 944b, 1044b, and a second ring gear 745b, 845b, 945b, 1045b. The second planetary gear module 740b, 840b, 940b, 1040b includes a second gearbox housing 741b, 841b, 941b, 1041b. The second gearbox housing 741b, 841b, 941b, 1041b accommodates the second sun gear 742b, 842b, 942b, 1042b, the plurality of second planetary gears 743b, 843b, 943b, 1043b, the second carrier 744b, 844b, 944b, 1044b, and the second ring gear 745b, 845b, 945b, 1045b. The second sun gear 742b, 842b, 942b, 1042b, the plurality of second planetary gears 743b, 843b, 943b, 1043b and the second ring gear 745b, 845b, 945b, 1045b are rotatably provided in the second gearbox housing 741b, 841b, 941b, 1041b.

In the seventh to tenth embodiments, the first planetary gear module 740a, 840a, 940a, 1040a is stacked on the second planetary gear module 740b, 840b, 940b, 1040b. The first gearbox housing 741a, 841a, 941a, 1041a may be inserted into the concave groove 122b1 of the pulsator 122.

In the seventh to tenth embodiments, the first sun gear 742a, 842a, 942a, 1042a, the second sun gear 742b, 842b, 942b, 1042b and the washing shaft 732a, 832a, 932a, 1032a rotate integrally.

According to the seventh to tenth embodiments, the first sun gear 742a, 842a, 942a, 1042a is connected to the washing shaft 732a, 832a, 932a, 1032a to receive power of the drive motor 130. The first sun gear 742a, 842a, 942a, 1042a is coupled with the washing shaft 732a, 832a, 932a, 1032a. The washing shaft 732a, 832a, 932a, 1032a penetrates the center portion of the first sun gear 742a, 842a, 942a, 1042a. The rotational power of the washing shaft 732a, 832a, 932a, 1032a is transmitted to the first sun gear 742a, 842a, 942a, 1042a. The first sun gear 742a, 842a, 942a, 1042a rotates at the same speed as the drive motor 130 in the same direction of rotation as the drive motor 130. A plurality of groove may be formed on one of the outer circumferential surface of the washing shaft 732a, 832a, 932a, 1032a and the inner circumferential surface of the first sun gear 742a, 842a, 942a, 1042a, and a plurality of lugs to be engaged with the grooves may be formed on the other one of the outer circumferential surface of the washing shaft 732a, 832a, 932a, 1032a and the inner circumferential surface of the first sun gear 742a, 842a, 942a, 1042a. The first sun gear 742a, 842a, 942a, 1042a rotates together with the washing shaft 732a, 832a, 932a, 1032a. A plurality of heat if he is formed on the outer circumferential surface of the first sun gear 742a, 842a, 942a, 1042a.

According to the seventh to tenth embodiments, the second sun gear 742b, 842b, 942b, 1042b is connected to the washing shaft 732a, 832a, 932a, 1032a to receive power of the drive motor 130. The second sun gear 742b, 842b, 942b, 1042b is coupled with the washing shaft 732a, 832a, 932a, 1032a. The washing shaft 732a, 832a, 932a, 1032a penetrates the center portion of the second sun gear 742b, 842b, 942b, 1042b. The rotational power of the washing shaft 732a, 832a, 932a, 1032a is transmitted to the second sun gear 742b, 842b, 942b, 1042b. The second sun gear 742b, 842b, 942b, 1042b at the same rotational speed as the drive motor 130 in the same direction of rotation as the drive motor 130. A plurality of grooves may be formed in one of the outer circumferential surface of the washing shaft 732a, 832a, 932a, 1032a and the inner circumferential surface of the second sun gear 742b, 842b, 942b, 1042b, and a plurality of lugs to be engaged with the grooves may be formed on the other one of the outer circumferential surface of the washing shaft 732a, 832a, 932a, 1032a and the inner circumferential surface of the second sun gear 742b, 842b, 942b, 1042b. The second sun gear 742b, 842b, 942b, 1042b rotates together with the washing shaft 732a, 832a, 932a, 1032a. A plurality of gear teeth is formed on the outer circumferential surface of the second sun gear 742b, 842b, 942b, 1042b.

According to the seventh to tenth embodiments, the plurality of first planetary gears 743a, 843a, 943a, 1043a is coupled to the first sun gear 742a, 842a, 942a, 1042a such that such that the gear teeth thereof are engaged with each other. The first planetary gears 743a, 843a, 943a, 1043a rotate by rotational power received from the first sun gear 742a, 842a, 942a, 1042a. The first planetary gears 743a, 843a, 943a, 1043a rotate about a connection shaft 744a1, 844a1, 944a1, 1044a1 coupled therewith by vertically penetrating the center portions of the first planetary gears 743a, 843a, 943a, 1043a. The first planetary gears 743a, 843a, 943a, 1043a rotate in the direction opposite to the direction of rotation of the first sun gear 742a, 842a, 942a, 1042a. The first planetary gears 743a, 843a, 943a, 1043a are disposed spaced from each other along the circumference of the first sun gear 742a, 842a, 942a, 1042a.

According to the seventh to tenth embodiments, the first ring gear 745a, 845a, 945a, 1045a has a ring shape. A plurality of gear teeth is formed along the inner circumferential surface of the first ring gear 745a, 845a, 945a, 1045a. The plurality of first planetary gears 743a, 843a, 943a, 1043a is inscribed in the first ring gear 745a, 845a, 945a, 1045a. The first ring gear 745a, 845a, 945a, 1045a surrounds the plurality of first planetary gears 743a, 843a, 943a, 1043a and engages with the first planetary gears 743a, 843a, 943a, 1043a. The outer side of the first ring gear 745a, 845a, 945a, 1045a is fixed to the first gearbox housing 741a, 841a, 941a, 1041a.

According to the seventh to tenth embodiments, the first carrier 744a, 844a, 944a, 1044a is arranged such that the plurality of first planetary gears 743a, 843a, 943a, 1043a is placed between the upper surface and lower surface of the first carrier 744a, 844a, 944a, 1044a. The first carrier 744a, 844a, 944a, 1044a includes a connection shaft 744a1, 844a1, 944a1, 1044a1 rotatably connecting the first planetary gears 743a, 843a, 943a, 1043a. The connection shaft 744a1, 844a1, 944a1, 1044a1 penetrates the center portion of the first planetary gears 743a, 843a, 943a, 1043a. The number of the provided connection shaft 744a1, 844a1, 944a1, 1044a1 is equal to the number of the first planetary gears 743a, 843a, 943a, 1043a. The connection shaft 744a1, 844a1, 944a1, 1044a1 are arranged between the upper surface and lower surface of the carrier 144, 244, 344, 444. The upper ends of the connection shaft 744a1, 844a1, 944a1, 1044a1 are coupled to the upper surface of the first carrier 744a, 844a, 944a, 1044a. The lower ends of the connection shaft 744a1, 844a1, 944a1, 1044a1 are coupled to the lower surface of the first carrier 744a, 844a, 944a, 1044a. The connection shaft 744a1, 844a1, 944a1, 1044a1 serve to support the first planetary gears 743a, 843a, 943a, 1043a such that the first planetary gears 743a, 843a, 943a, 1043a rotate around the first sun gear 742a, 842a, 942a, 1042a in the circumferential direction, keeping a predetermined distance from each other.

According to the seventh to tenth embodiments, the plurality of second planetary gears 743b, 843b, 943b, 1043b is coupled to the second sun gear 742b, 842b, 942b, 1042b such that such that the gear teeth thereof are engaged with each other. The second planetary gears 743b, 843b, 943b, 1043b rotate by rotational power received from the second sun gear 742b, 842b, 942b, 1042b. The second planetary gears 743b, 843b, 943b, 1043b rotate about a connection shaft 744a1, 844a1, 944a1, 1044a1 coupled therewith by vertically penetrating the center portions of the second planetary gears 743b, 843b, 943b, 1043b. The second planetary gears 743b, 843b, 943b, 1043b rotate in the direction opposite to the direction of rotation of the second sun gear 742b, 842b, 942b, 1042b. The second planetary gears 743b, 843b, 943b, 1043b are disposed spaced from each other along the circumference of the second sun gear 742b, 842b, 942b, 1042b.

According to the seventh to tenth embodiments, the second ring gear 745b, 845b, 945b, 1045b has a ring shape. A plurality of gear teeth is formed along the inner circumferential surface of the second ring gear 745b, 845b, 945b, 1045b. The plurality of second planetary gears 743b, 843b, 943b, 1043b is inscribed in the second ring gear 745b, 845b, 945b, 1045b. The second ring gear 745b, 845b, 945b, 1045b surrounds the plurality of second planetary gears 743b, 843b, 943b, 1043b and engages with the second planetary gears 743b, 843b, 943b, 1043b. The outer side of the second ring gear 745b, 845b, 945b, 1045b is fixed to the second gearbox housing 741b, 841b, 941b, 1041b.

According to the seventh to tenth embodiments, the second carrier 744b, 844b, 944b, 1044b is arranged such that the plurality of second planetary gears 743b, 843b, 943b, 1043b is placed between the upper surface and lower surface of the second carrier 744b, 844b, 944b, 1044b. The second carrier 744b, 844b, 944b, 1044b includes a second planetary gear connection shaft 744b1, 844b1, 944b1, 1044b1 rotatably connecting the second planetary gears 743b, 843b, 943b, 1043b. The second planetary gear connection shaft 744b1, 844b1, 944b1, 1044b1 penetrates the center portion of the second planetary gears 743b, 843b, 943b, 1043b. The number of the provided second planetary gear connection shaft 744b1, 844b1, 944b1, 1044b1 is equal to the number of the second planetary gears 743b, 843b, 943b, 1043b. The second planetary gear connection shaft 744b1, 844b1, 944b1, 1044b1 are arranged between the upper surface and lower surface of the carrier 144, 244, 344, 444. The upper ends of the second planetary gear connection shaft 744b1, 844b1, 944b1, 1044b1 are coupled to the upper surface of the second carrier 744b, 844b, 944b, 1044b. The lower ends of the second planetary gear connection shaft 744b1, 844b1, 944b1, 1044b1 are coupled to the lower surface of the second carrier 744b, 844b, 944b, 1044b. The second planetary gear connection shaft 744b1, 844b1, 944b1, 1044b1 serve to support the second planetary gears 743b, 843b, 943b, 1043b such that the second planetary gears 743b, 843b, 943b, 1043b rotate around the second sun gear 742b, 842b, 942b, 1042b in the circumferential direction, keeping a predetermined distance from each other.

In the seventh to tenth embodiments, one of the first carrier 744a, 844a, 944a, 1044a and the first ring gear 745a, 845a, 945a, 1045a is fixed to one of the second carrier 744b, 844b, 944b, 1044b and the second ring gear 745b, 845b, 945b, 1045b. One of the first carrier 744a, 844a, 944a, 1044a and the first ring gear 745a, 845a, 945a, 1045a is fixed to inner tub assembly 120. One of the second carrier 744b, 844b, 944b, 1044b and the second ring gear 745b, 845b, 945b, 1045b is fixed to the inner tub assembly 120.

In the seventh to tenth embodiments, the pulsator 122 integrally rotates with one of the first carrier 744a, 844a, 944a, 1044a and the first ring gear 745a, 845a, 945a, 1045a. Revolutions per minute of the pulsator 122 are determined by the gear ratio between the first ring gear 745a, 845a, 945a, 1045a and the first sun gear 742a, 842a, 942a, 1042a and revolutions per minute of the first sun gear 742a, 842a, 942a, 1042a.

In the seventh to tenth embodiments, the blade 123 integrally rotates with one of the second carrier 744b, 844b, 944b, 1044b and the second ring gear 745b, 845b, 945b, 1045b. Revolutions per minute of the blade 123 are determined by the gear ratio between the second ring gear 745b, 845b, 945b, 1045b and the second sun gear 742b, 842b, 942b, 1042b and revolutions per minute of the second sun gear 742b, 842b, 942b, 1042b.

Since the second sun gear 742b, 842b, 942b, 1042b and the first sun gear 742a, 842a, 942a, 1042a have the same revolutions per minute as the washing shaft 732a, 832a, 932a, 1032a, The degree of decrease in the rotational speed of the pulsator 122 may be set to be different from that of the blade 123 by setting a first gear ratio between the first ring gear 745a, 845a, 945a, 1045a and the first sun gear 742a, 842a, 942a, 1042a to be different from a second gear ratio between the second ring gear 745b, 845b, 945b, 1045b and the second sun gear 742b, 842b, 942b, 1042b.

Hereinafter, a power transmission unit 740 according to the seventh embodiment will be described in detail with reference to FIGS. 20A, 20B and 20C.

In the seventh embodiment, the direction of rotation of the pulsator 122 is opposite to the direction of rotation of the blade 123. The power transmission unit 740 transmits power such that the direction of rotation of the pulsator 122 is opposite to the direction of rotation of the blade 123. The direction of rotation of the washing shaft 732a, the direction of rotation of the first sun gear 742a, the direction of rotation of the second sun gear 742b, the direction of revolution of the first planetary gear 743a, and the direction of rotation of the pulsator 122 are the same. The direction of rotation of the blade 123 is identical to the direction of rotation of the second ring gear 745b. The direction of rotation of the pulsator 122 is identical to the direction of rotation of the drive motor 130. The direction of rotation of the blade 123 is opposite to the direction of rotation of the drive motor 130. The resulting effect is the same as the effect of the third embodiment.

A ring gear accommodation groove is provided to the interior of the first gearbox housing 741a. The first ring gear 745a is inserted into and fixed to the ring gear accommodation groove of the first gearbox housing 741a.

A ring gear accommodation groove is provided to the interior of the second gearbox housing 741b. The second ring gear 745b is inserted into and fixed to the ring gear accommodation groove of the second gearbox housing 741b.

The first ring gear 745a and the second carrier 744b are fixed by each other. The second carrier 744b is fixed to the inner tub assembly 120. The lower portion of the second carrier 744b is fixed to the hub 124. The first ring gear 745a is fixed to the inner tub assembly 120 by the second carrier 744b. That is, the first ring gear 745a, the second carrier 744b and the inner tub assembly 120 do not make a rotation relative to each other.

The first ring gear 745a is fixed to the first gearbox housing 741a. A plurality of lugs is formed on one of the first gearbox housing 741a and the first ring gear 745a, and a plurality of lug accommodation grooves to be engaged with the lugs is formed on the other one of the first gearbox housing 741a and the first ring gear 745a. The lug accommodation grooves may be formed in the outer circumferential surface of the first ring gear 745a, and spaced a certain distance from each other in a circumferential direction. The lugs may be formed on the inner circumferential surface of the first gearbox housing 741a at a predetermined distance from each other in the circumferential direction. The lugs are inserted into and coupled with the lug accommodation grooves. Alternatively, the lugs may be formed on the outer circumferential surface of the first ring gear 745a, and the lug accommodation grooves may be formed in the inner side surface of the first gearbox housing 741a. The lugs and the lug accommodation grooves prevent the first ring gear 745a from rotating relative to the first gearbox housing 741a. The first ring gear 745a is fixed to the inner tub assembly 120 by the second carrier 744b. In order to fix the first ring gear 745a to the inner tub assembly 120, the first gearbox housing 741a is connected and fixed to the second carrier 744b.

As the first ring gear 745a is fixed to the inner tub assembly 120, the first planetary gear 743a revolves along the inner circumferential surface of the first ring gear 745a, while being engaged with the first ring gear 745a. The first planetary gear 743a revolves around the first sun gear 742a. The direction of revolution of the first planetary gear 743a is identical to the direction of rotation of the first sun gear 742a. Revolutions per minute according to revolution of the plurality of first planetary gear 743a may be set according to the gear ratio between the first ring gear 745a and the first sun gear 742a. Revolutions per minute of the first carrier 744a are equal to revelations per minute according to revolution of the plurality of first planetary gear 743a. Revolutions per minute of the first carrier 744a are determined by the gear ratio between the first ring gear 745a and the first sun gear 742a and revolutions per minute of the first sun gear 742a.

The first carrier 744a forms the upper connection shaft 744a2. The upper connection shaft 744a2 integrally rotates with the first carrier 744a. The upper connection shaft 744a2 is inserted into and coupled with the shaft support groove 122b2 formed at the center of the bottom surface of the pulsator 122. The upper connection shaft 744a2 transmits power to the pulsator 122.

The first carrier 744a includes a power transmission cap 744c disposed between the upper connection shaft 744a2 and the shaft support groove 122b2. The power transmission cap 744c is inserted and coupled between the upper connection shaft 744a2 and the shaft support groove 122b2. The interior of the power transmission cap 744c is provided with a coupling portion allowing the upper connection shaft 144b to be press-fitted thereinto. Serration lugs for transmitting rotational power are formed on the outer circumferential surface of the power transmission cap 744c.

The second gearbox housing 741b is not fixed to the inner tub assembly 120. The second gearbox housing 741b rotates relative to the inner tub assembly 120.

The second carrier 744b is fixed to the inner tub assembly 120. The second carrier 744b is fixed to the hub 124. The second carrier 744b is coupled to the center portion of the hub 124. A plurality of lugs and a plurality of lug accommodation grooves are formed between the second carrier 744b and hub 124. Thereby, the second carrier 744b is fixed by the hub 124.

The second ring gear 745b is fixed to the second gearbox housing 741b. In order to transmit rotational power of the second ring gear 745b to the second gearbox housing 741b, a plurality of lugs is formed on one of the second gearbox housing 741b and the second ring gear 745b, and a plurality of lug accommodation grooves to be engaged with the lugs is formed on the other one of the second gearbox housing 741b and the second ring gear 745b. The lug accommodation grooves are formed on the outer circumferential surface of the second ring gear 745b, and spaced a certain distance from each other in a circumferential direction. The lugs are formed on the inner circumferential surface of the second gearbox housing 741b at a predetermined distance from each other in the circumferential direction. The lugs are inserted into and coupled with the lug accommodation grooves. Alternatively, the lugs may be formed on the outer circumferential surface of the second ring gear 745b, and the lug accommodation grooves may be formed on the inner side surface of the second gearbox housing 74 lb.

The second gearbox housing 741b and the second ring gear 745b rotate. The second gearbox housing 741b and the second ring gear 745b rotate relative to the inner tub assembly 120. A jig 146 for fixing the second ring gear 745b need not be provided between pulsator 122 and blade 123. As the second carrier 744b is fixed to the inner tub assembly 120, the second ring gear 745b rotates around the second planetary gear 743b while being engaged with the second planetary gear 743b. The second ring gear 745b rotates about the second sun gear 342b. The direction of rotation of the second ring gear 745b is opposite to the direction of rotation of the second sun gear 342b, and is identical to the direction of rotation of the second planetary gear 743b. Revolutions per minute of the second ring gear 745b are determined by the gear ratio between the second ring gear 745b and second sun gear 342b and revolutions per minute of the second sun gear 342b.

The blade 123 is rotated by the rotational power transmitted from the second gearbox housing 74 lb. The second gearbox housing 741b is coupled with the center portion of the blade 123. The blade 123 integrally rotates with the second gearbox housing 741b. The blade 123 integrally rotates with the second ring gear 745b. A plurality of lugs and a plurality of lug accommodation grooves may be provided to the boundary surfaces between the second gearbox housing 741b and blade 123. The plurality of lugs is disposed to face the plurality of lug accommodation grooves. The rotational power received by the second gearbox housing 741b is transmitted to the blade 123. The lugs or lug accommodation grooves may be formed on the second gearbox housing 741b, and the lug accommodation grooves or the lugs may be formed on the blade 123. The direction of rotation of the blade 123 is opposite to the direction of rotation of the drive motor 130.

The pulsator 122 receives rotational power through the upper connection shaft 744a2 of the first carrier 744a. The upper connection shaft 744a2 is vertically disposed at an upper portion of the washing shaft 732a. The upper connection shaft 744a2 and the washing shaft 732a rotate independently. The direction of rotation of the pulsator 122 is identical to the direction of rotation of the drive motor 130.

The power transmission unit 740 includes a plurality of bearings 747a, 747b, 747c, 747d, 747e, 747f, which enable the washing shaft 732a, upper connection shaft 744a2, first carrier 744a and first gearbox housing 741a to rotate relative to each other. A first bearing 747a may be inserted and installed between the first gearbox housing 741a and upper connection shaft 744a2. Thereby, the upper connection shaft 744a2 may rotate relative to the first gearbox housing 741a. A second bearing 747b may be inserted and installed between the inner surface of the first carrier 744a and the washing shaft 732a. Thereby, the first carrier 744a and the washing shaft 732a may rotate independently. A plurality of second bearings 747b may be provided. The second bearings 747b are spaced from each other in the vertical direction. A third bearing 747c may be installed between the inner circumferential surface of the first gearbox housing 741a and the outer side surface of the first carrier 744a. Thereby, the first carrier 744a may rotate relative to the first gearbox housing 741a. A fourth bearing 747d may be installed between the second carrier 744b and the washing shaft 732a. Thereby, the washing shaft 732a may rotate relative to the second carrier 744b. A fifth bearing 747e may be installed between the second gearbox housing 741b and the second carrier 744b. Thereby, the second gearbox housing 741b may rotate relative to the second carrier 744b. A sixth bearing 747f may be installed between the first gearbox housing 741a and the second gearbox housing 741b. Thereby, the second gearbox housing 741b may rotate relative to the first gearbox housing 741a.

Referring to FIG. 21, the eighth embodiment, which will be described below, has the following differences from the seventh embodiment: i) the direction of rotation of the pulsator 122 is opposite to the direction of rotation of the drive motor 130, and the direction of rotation of the pulsator 122 is the same as the direction of rotation of the blade 123; ii) the pulsator 122 integrally rotates with the first ring gear 845a, and the blade 123 integrally rotates with the second ring gear 845b; iii) the first ring gear 845a and the second ring gear 845b are fixed by each other, and the second ring gear 845b is fixed to the inner tub assembly 120. That is, the first ring gear 845a and the second ring gear 845b do not revolve; iv) the first carrier 841a need not include either an upper connection shaft or a power transmission cap, and the first gearbox housing 841a forms an upper connection shaft 841a2 and a power transmission cap 841a3.

Hereinafter, a power transmission unit 840 according to the eighth embodiment will be described in detail.

In the eighth embodiment, the direction of rotation of the pulsator 122 is the same as the direction of rotation of the blade 123. The direction of rotation of the washing shaft 832a, the direction of rotation of the first sun gear 842a, and the direction of rotation of the second sun gear 842b are the same. The direction of rotation of the first ring gear 845a, the direction of rotation of the second ring gear 845b, the direction of rotation of the pulsator 122, and the direction of rotation of the blade 123 are the same. The direction of rotation of the washing shaft 832a, the first sun gear 842a and the second sun gear 842b is opposite to the direction of rotation of the first ring gear 845a, the second ring gear 845b, the pulsator 122 and the blade 123.

A ring gear accommodation groove is provided to the interior of the first gearbox housing 841a. The first ring gear 845a is inserted into and fixed to the ring gear accommodation groove of the first gearbox housing 841a.

A ring gear accommodation groove is provided to the interior of the second gearbox housing 841b. The second ring gear 845b is inserted into and fixed to the ring gear accommodation groove of the second gearbox housing 841b.

The first carrier 844a and the second carrier 844b are fixed by each other. The second carrier 844b is fixed to the inner tub assembly 120. The lower portion of the second carrier 844b is fixed to the hub 124. The first carrier 844a is fixed to the inner tub assembly 120 by the second carrier 844b. That is, the first carrier 844a, the second carrier 844b and the inner tub assembly 120 do not make a rotation relative to each other.

The first ring gear 845a is fixed to the first gearbox housing 841a. A plurality of lugs is formed on one of the first gearbox housing 841a and the first ring gear 845a, and a plurality of lug accommodation grooves to be engaged with the lugs is formed on the other one of the first gearbox housing 841a and the first ring gear 845a. The lug accommodation grooves may be formed in the outer circumferential surface of the first ring gear 845a, and spaced a certain distance from each other in a circumferential direction. The lugs may be formed on the inner circumferential surface of the first gearbox housing 841a at a predetermined distance from each other in the circumferential direction. The lugs are inserted into and coupled with the lug accommodation grooves. Alternatively, the lugs may be formed on the outer circumferential surface of the first ring gear 845a, and the lug accommodation grooves may be formed in the inner side surface of the first gearbox housing 841a. The lugs and the lug accommodation grooves prevent the first ring gear 845a from rotating relative to the first gearbox housing 841a. The rotation power of the first ring gear 845a is transmitted to the first gearbox housing 841a.

The first gearbox housing 841a and the first ring gear 845a. The first gearbox housing 841a and the first ring gear 845a rotate relative to the inner tub assembly 120. As the first carrier 844a is fixed to the inner tub assembly 120, the first ring gear 845a rotates around a plurality of first planetary gears 843a while being engaged with the first planetary gears 843a. The first ring gear 845a rotates about the first sun gear 842a. The direction of rotation of the first ring gear 845a is opposite to the direction of rotation of the first sun gear 842a, and is identical to the direction of rotation of the first planetary gear 843a. Revolutions per minute of the first ring gear 845a are determined by the gear ratio between the first ring gear 845a and first sun gear 842a and revolutions per minute of the first sun gear 842a.

The first gearbox housing 841a forms the upper connection shaft 841a2. The upper connection shaft 841a2 integrally rotates with the first gearbox housing 841a. The upper connection shaft 841a2 is inserted into and coupled with the shaft support groove 122b2 formed at the center of the bottom surface of the pulsator 122. The upper connection shaft 841a2 transmits power to the pulsator 122.

The gearbox housing 841a includes a power transmission cap 841a3 disposed between the upper connection shaft 841a2 and the shaft support groove 122b2. The power transmission cap 841a3 is inserted and coupled between the upper connection shaft 841a2 and the shaft support groove 122b2. The interior of the power transmission cap 841a3 is provided with a coupling portion allowing the upper connection shaft 144b to be press-fitted thereinto. Serration lugs for transmitting rotational power are formed on the outer circumferential surface of the power transmission cap 841a3.

The second gearbox housing 841b is not fixed to the inner tub assembly 120. The second gearbox housing 841b rotates relative to the inner tub assembly 120. The second gearbox housing 841*b* is separated from the first gearbox housing 841*a*. The first gearbox housing 841*a* and the second gearbox housing 841*b* are separately rotatable.

The second carrier 844*b* is fixed to the inner tub assembly 120. The second carrier 844*b* is fixed to the hub 124. The second carrier 844*b* is coupled to the center portion of the hub 124. A plurality of lugs and a plurality of lug accommodation grooves are formed between the second carrier 844*b* and hub 124. Thereby, the second carrier 844*b* is fixed by the hub 124.

The second ring gear 845*b* is fixed to the second gearbox housing 841*b*. In order to transmit rotational power of the second ring gear 845*b* to the second gearbox housing 841*b*, a plurality of lugs is formed on one of the second gearbox housing 841*b* and the second ring gear 845*b*, and a plurality of lug accommodation grooves to be engaged with the lugs is formed on the other one of the second gearbox housing 841*b* and the second ring gear 845*b*. The lug accommodation grooves are formed on the outer circumferential surface of the second ring gear 845*b*, and spaced a certain distance from each other in a circumferential direction. The lugs are formed on the inner circumferential surface of the second gearbox housing 841*b* at a predetermined distance from each other in the circumferential direction. The lugs are inserted into and coupled with the lug accommodation grooves. Alternatively, the lugs may be formed on the outer circumferential surface of the second ring gear 845*b*, and the lug accommodation grooves may be formed on the inner side surface of the second gearbox housing 841*b*.

The second gearbox housing 841*b* and the second ring gear 845*b* rotate. The second gearbox housing 841*b* and the second ring gear 845*b* rotate relative to the inner tub assembly 120. A jig 146 for fixing the second ring gear 845*b* need not be provided between pulsator 122 and blade 123. As the second carrier 844*b* is fixed to the inner tub assembly 120, the second ring gear 845*b* rotates around the second planetary gear 843*b* while being engaged with the second planetary gear 843*b*. The second ring gear 845*b* rotates about the second sun gear 342*b*. The direction of rotation of the second ring gear 845*b* is opposite to the direction of rotation of the second sun gear 342*b*, and is identical to the direction of rotation of the second planetary gear 843*b*. Revolutions per minute of the second ring gear 845*b* are determined by the gear ratio between the second ring gear 845*b* and second sun gear 342*b* and revolutions per minute of the second sun gear 342*b*.

The blade 123 is rotated by the rotational power transmitted from the second gearbox housing 841*b*. The second gearbox housing 841*b* is coupled with the center portion of the blade 123. The blade 123 integrally rotates with the second gearbox housing 841*b*. The blade 123 integrally rotates with the second ring gear 845*b*. A plurality of lugs and a plurality of lug accommodation grooves may be provided to the boundary surfaces between the second gearbox housing 841*b* and blade 123. The plurality of lugs is disposed to face the plurality of lug accommodation grooves. The rotational power received by the second gearbox housing 841*b* is transmitted to the blade 123. The lugs or lug accommodation grooves may be formed on the second gearbox housing 841*b*, and the lug accommodation grooves or the lugs may be formed on the blade 123. The direction of rotation of the blade 123 is opposite to the direction of rotation of the drive motor 130.

The pulsator 122 receives rotational power through the upper connection shaft 841*a*2 of the first gearbox housing 841*a*. The upper connection shaft 841*a*2 is vertically disposed at an upper portion of the washing shaft 832*a*. The upper connection shaft 841*a*2 and the washing shaft 832*a* rotate independently. The direction of rotation of the pulsator 122 is opposite to the direction of rotation of the drive motor 130.

The power transmission unit 840 includes a plurality of bearings 847*b*, 847*c*, 847*d*, 847*e*, 847*f*, which enable the washing shaft 832*a*, upper connection shaft 841*a*2, first and second carriers 844*a*, 844*b*, first gearbox housing 841*a* and second gearbox housing 841*b* to rotate relative to each other. A second bearing 847*b* may be inserted and installed between the inner surface of the first carrier 844*a* and the washing shaft 832*a*. Thereby, the first carrier 844*a* and the washing shaft 832*a* may rotate independently. A plurality of second bearings 848*b* may be provided. The second bearings 848*b* are spaced from each other in the vertical direction. A third bearing 847*c* may be installed between the inner circumferential surface of the first gearbox housing 841*a* and the outer side surface of the first carrier 844*a* or the second carrier 844*b*. Thereby, the first and second carriers 844*a*, 844*b* may rotate relative to the first gearbox housing 841*a*. A fourth bearing 847*d* may be installed between the second carrier 844*b* and the washing shaft 832*a*. Thereby, the washing shaft 832*a* may rotate relative to the second carrier 844*b*. A fifth bearing 847*e* may be installed between the second gearbox housing 841*b* and the second carrier 844*b*. Thereby, the second gearbox housing 841*b* may rotate relative to the second carrier 844*b*. A sixth bearing 847*f* may be installed between the first gearbox housing 841*a* and the second gearbox housing 841*b*. Thereby, the second gearbox housing 841*b* may rotate relative to the first gearbox housing 841*a*.

Referring to FIG. 22, the ninth embodiment, which will be described below, has the following differences from the seventh embodiment: i) the direction of rotation of the blade 123 is the same as the direction of rotation of the drive motor 130, and the direction of rotation of the pulsator 122 is the same as the direction of rotation of the blade 123; ii) the pulsator 122 integrally rotates with the first carrier 944*a*, and the blade 123 integrally rotates with the second carrier 944*b*; iii) the first carrier 944*a* and the second carrier 944*b* are fixed by each other, and the first ring gear 945*a* and the second ring gear 944*b* are fixed to the inner tub assembly 120; iv) the power transmission unit 940 includes a cheek 146 for fixing the first gearbox housing 941*a* and the second gearbox housing 941*b*.

Hereinafter, a power transmission unit 940 according to the ninth embodiment will be described in detail.

In the ninth embodiment, the direction of rotation of the pulsator 122 is the same as the direction of rotation of the blade 123. The direction of rotation of the washing shaft 932*a*, the direction of rotation of the first sun gear 942*a*, and the direction of rotation of the second sun gear 942*b*, the direction of rotation of the second sun gear 942*b*, the direction of revolution of the first planetary gear 943*a* and the direction of revolution of the second planetary gear 943*b*, the direction of rotation of the peseta 122, and the direction of rotation of the blade 123 are the same.

A ring gear accommodation groove is provided to the interior of the first gearbox housing 941*a*. The first ring gear 945*a* is inserted into and fixed to the ring gear accommodation groove of the first gearbox housing 941*a*.

A ring gear accommodation groove is provided to the interior of the second gearbox housing 941*b*. The second ring gear 945*b* is inserted into and fixed to the ring gear accommodation groove of the second gearbox housing 941*b*.

The first ring gear 945a and the second ring gear 945b are fixed by each other. The first ring gear 945a and the second ring gear 945b are fixed to the inner tub assembly 120. The first ring gear 945a is fixed to the first gearbox housing 941a, the second ring gear 945b is fixed to the second gearbox housing 941b, and the first gearbox housing 941a and the second gearbox housing 941b are fixed by each other. The first gearbox housing 941a and the second gearbox housing 941b are fixed to the inner tub assembly 120 by the jig 146. The first ring gear 945a, the second ring gear 945b and the inner tub assembly 120 two not make a rotation relative to each other.

The first gearbox housing 941a and the second gearbox housing 941b are fixed by the jig 146. The jig 146 is disposed to connect the outer circumferential portion of the first gearbox housing 941a or the second gearbox housing 941b with the base 121. The jig 146 includes a center portion having a ring shape. The jig 146 includes a plurality of extensions radially extending from the center portion toward the base. A coupling portion is formed on the outer circumferential portion of the first gearbox housing 941a or second gearbox housing 941b. The coupling portion of the first gearbox housing 941a or second gearbox housing 941b is coupled to the center portion of the jig 146. The center portion of the jig 146 and the outer circumferential portion of the first gearbox housing 941a or second gearbox housing 941b are fastened to each other by a fastening member. The extensions of the jig 146 may be fastened to the base 121 by a fastening member such as a bolt.

The first ring gear 945a is fixed to the first gearbox housing 941a. A plurality of lugs is formed on one of the first gearbox housing 941a and the first ring gear 945a, and a plurality of lug accommodation grooves to be engaged with the lugs is formed on the other one of the first gearbox housing 941a and the first ring gear 945a. The lug accommodation grooves may be formed in the outer circumferential surface of the first ring gear 945a, and spaced a certain distance from each other in a circumferential direction. The lugs may be formed on the inner circumferential surface of the first gearbox housing 941a at a predetermined distance from each other in the circumferential direction. The lugs are inserted into and coupled with the lug accommodation grooves. Alternatively, the lugs may be formed on the outer circumferential surface of the first ring gear 945a, and the lug accommodation grooves may be formed in the inner side surface of the first gearbox housing 941a. The lugs and the lug accommodation grooves prevent the first ring gear 945a from rotating relative to the first gearbox housing 941a. The first ring gear 945a is fixed to the inner tub assembly 120 by the first gearbox housing 941a. In order to fix the first ring gear 945a to the inner tub assembly 120, the first gearbox housing 941a is connected and fixed to the jig 146.

The second ring gear 945b is fixed to the second gearbox housing 941b. a plurality of lugs is formed on one of the second gearbox housing 941b and the second ring gear 945b, and a plurality of lug accommodation grooves to be engaged with the lugs is formed on the other one of the second gearbox housing 941b and the second ring gear 945b. The lug accommodation grooves may be formed on the outer circumferential surface of the second ring gear 945b, and spaced a certain distance from each other in a circumferential direction. The lugs are formed on the inner circumferential surface of the second gearbox housing 941b at a predetermined distance from each other in the circumferential direction. The lugs are inserted into and coupled with the lug accommodation grooves. Alternatively, the lugs may be formed on the outer circumferential surface of the second ring gear 945b, and the lug accommodation grooves may be formed on the inner side surface of the second gearbox housing 941b. The lugs and the lug accommodation grooves prevent the second ring gear 945b from rotating relative to the second gearbox housing 941b. The second ring gear 945b is fixed to the inner tub assembly 120 by the second gearbox housing 941b. In order to fix the second ring gear 945b to the inner tub assembly 120, the second gearbox housing 941b is connected and fixed to the jig 146.

As the first ring gear 945a is fixed to the inner tub assembly 120, the first planetary gear 943a revolves along the inner circumferential surface of the first ring gear 945a, while being engaged with the first ring gear 945a. The first planetary gear 943a revolves around the first sun gear 942a. The direction of revolution of the first planetary gear 943a is identical to the direction of rotation of the first sun gear 942a. Revolutions per minute according to revolution of the plurality of first planetary gear 943a may be set according to the gear ratio between the first ring gear 945a and the first sun gear 942a. Revolutions per minute of the first carrier 944a are equal to revelations per minute according to revolution of the plurality of first planetary gear 943a. Revolutions per minute of the first carrier 944a are determined by the gear ratio between the first ring gear 945a and the first sun gear 942a and revolutions per minute of the first sun gear 942a.

As the second ring gear 945b is fixed to the inner tub assembly 120, the second planetary gear 943b revolves along the inner circumferential surface of the second ring gear 945b, while being engaged with the second ring gear 945b. The second planetary gear 943b revolves around the second sun gear 942b. The direction of revolution of the second planetary gear 943b is identical to the direction of rotation of the second sun gear 942b. Revolutions per minute according to revolution of the plurality of second planetary gear 943b may be set according to the gear ratio between the second ring gear 945b and the second sun gear 942b. Revolutions per minute of the second carrier 944b are equal to revelations per minute according to revolution of the plurality of second planetary gear 943b. Revolutions per minute of the second carrier 944b are determined by the gear ratio between the second ring gear 945b and the second sun gear 942b and revolutions per minute of the second sun gear 942b.

The first carrier 844a is not fixed to the inner tub assembly 120. The second carrier 844b is not fixed to the inner tub assembly 120. The first carrier 844a rotates relative to the inner tub assembly 120. The second carrier 844b is not fixed to the inner tub assembly 120. The second carrier 844b rotates relative to the inner tub assembly 120. The first carrier 844a is separated from the second carrier 844b. The first carrier 844a and the second carrier 844b are separately rotatable.

The first carrier 944a forms the upper connection shaft 944a2. The upper connection shaft 944a2 integrally rotates with the first carrier 944a. The upper connection shaft 944a2 is inserted into and coupled with the shaft support groove 122b2 formed at the center of the bottom surface of the pulsator 122. The upper connection shaft 944a2 transmits power to the pulsator 122.

The first carrier 944a includes a power transmission cap 944c disposed between the upper connection shaft 944a2 and the shaft support groove 122b2. The power transmission cap 944c is inserted and coupled between the upper connection shaft 944a2 and the shaft support groove 122b2. The interior of the power transmission cap 944c is provided with a coupling portion allowing the upper connection shaft 144b to be press-fitted thereinto. Serration lugs for transmitting rotational power are formed on the outer circumferential surface of the power transmission cap 944c.

The blade 123 is rotated by the rotational power transmitted from the second carrier 944b. The rotational speed of the blade 123 is decreased according to the gear ratio between the second sun gear 942b and the second ring gear 945b. The second carrier 944b is fixed the blade 123. The second carrier 944b is coupled to the center portion. The blade 123 integrally rotates with the second carrier 944b. A plurality of lugs and a plurality of lug accommodation grooves may be provided to the boundary surfaces between the second carrier 944b and the blade 123. The plurality of lugs is disposed to face the plurality of lug accommodation grooves. The rotational power of the second carrier 944b is transmitted to the blade 123. The lugs or the lug accommodation grooves may be formed on the second carrier 944b, and the lug accommodation grooves or the lugs may be formed on the blade 123.

The pulsator 122 receives rotational power through the upper connection shaft 944a2 of the first carrier 944a. The upper connection shaft 944a2 is vertically disposed at an upper portion of the washing shaft 932a. The upper connection shaft 944a2 and the washing shaft 932a rotate independently. The direction of rotation of the pulsator 122 is identical to the direction of rotation of the drive motor 130.

The power transmission unit 940 includes a plurality of bearings 947a, 947b, 947c, 947d, 947e, 947f, which enable the washing shaft 932a, the upper connection shaft 944a2, the second carrier 944b and the first and second gearbox housings 941a, 941b to rotate relative to each other. The power transmission unit 940 includes a plurality of bearings 949a, 949b, 949c, 949d, 949e, 949f, which enable the washing shaft 932a, upper connection shaft 944a2, first carrier 944a and first gearbox housing 941a to rotate relative to each other. A first bearing 949a may be inserted and installed between the first gearbox housing 941a and upper connection shaft 944a2. Thereby, the upper connection shaft 944a2 may rotate relative to the first gearbox housing 941a. A second bearing 949b may be inserted and installed between the inner surface of the first carrier 944a and the washing shaft 932a. Thereby, the first carrier 944a and the washing shaft 932a may rotate independently. A plurality of second bearings 949b may be provided. The second bearings 949b are spaced from each other in the vertical direction. A third bearing 949c may be installed between the inner circumferential surface of the first gearbox housing 941a and the outer side surface of the first carrier 944a. Thereby, the first carrier 944a may rotate relative to the first gearbox housing 941a. A fourth bearing 949d may be installed between the second carrier 944b and the washing shaft 932a. Thereby, the washing shaft 932a may rotate relative to the second carrier 944b. A fifth bearing 949e may be installed between the second gearbox housing 941b and the blade 123. Thereby, the blade 123 may rotate relative to the second gearbox housing 941b. A sixth bearing 949f may be installed between the inner circumferential surface of the second gearbox housing 941b and the outer surface of the second carrier 944b. Thereby, the second carrier 944b may rotate relative to the second gearbox housing 941b.

Referring to FIG. 23, the tenth embodiment, which will be described below, has the following differences from the seventh embodiment: i) the direction of rotation of the pulsator 122 is opposite to the direction of rotation of the drive motor 130, and the direction of rotation of the pulsator 122 is the same as the direction of rotation of the blade 123; ii) the pulsator 122 integrally rotates with the first ring gear 1045a, and the blade 123 integrally rotates with the second carrier 1045b; iii) the first carrier 1044a and the second ring gear 1045b are fixed by each other, and the second ring gear 1045b is fixed to the inner tub assembly 120; iv) the first carrier 1044a need not include either an upper connection shaft or a power transmission cap, the first gearbox housing 1041a forms an upper connection shaft 1041a2 and a power transmission cap 1041a3; v) the power transmission unit 1040 includes a jig 146 for fixing the second gearbox housing 1041b and the first carrier 1044a.

Hereinafter, a power transmission unit 1040 according to the tenth embodiment will be described in detail.

In the tenth embodiment, the direction of rotation of the pulsator 122 is opposite to the direction of rotation of the blade 123. The power transmission unit 1040 transmits power such that the direction of rotation of the pulsator 122 is opposite to the direction of rotation of the blade 1210. The direction of rotation of the washing shaft 1032a, the direction of rotation of the first sun gear 1042a, the direction of rotation of the second sun gear 1042b, the direction of rotation of the second planetary gear 1043b and the direction of rotation of the blade 123 are the same. The direction of rotation of the pulsator 122 and the direction of rotation of the first ring gear 1045a are the same. The direction of rotation of the pulsator 122 is opposite to the direction of rotation of the drive motor 130. The direction of rotation of the blade 123 is the same as the direction of rotation of the drive motor 130. The resulting effect is the same as the effect of the third embodiment.

A ring gear accommodation groove is provided to the interior of the first gearbox housing 1041a. The first ring gear 1045a is inserted into and fixed to the ring gear accommodation groove of the first gearbox housing 1041a.

A ring gear accommodation groove is provided to the interior of the second gearbox housing 1041b. The second ring gear 1045b is inserted into and fixed to the ring gear accommodation groove of the second gearbox housing 1041b.

The first carrier 1044a and the second carrier 1044b are fixed by each other. The second ring gear 1045b is fixed to the inner tub assembly 120. The second ring gear 1045b is fixed to the second gearbox housing 1041b, and the second gearbox housing 1041b is fixed to the inner tub assembly 120 by the jig 146. The first carrier 1044a, the second ring gear 1045b and the inner tub assembly 120 do not make a rotation relative to each other.

The jig 146 is disposed to connect the outer circumferential portion of the second gearbox housing 1041b to the base 121. The jig 146 includes a center portion having a ring shape. The jig 146 includes a plurality of extensions radially extending from the center portion toward the base. A coupling portion is formed on the outer circumferential portion of the second gearbox housing 1041b. The coupling portion of the second gearbox housing 1041b is coupled to the center portion of the jig 146. The center portion of the jig 146 and the outer circumferential portion of the second gearbox housing 1041b are fastened to each other by a fastening member. The extensions of the jig 146 may be fastened to the base 121 by a fastening member such as a bolt.

The first ring gear 1045a is fixed to the first gearbox housing 1041a. A plurality of lugs is formed on one of the first gearbox housing 1041a and the first ring gear 1045a, and a plurality of ring gear accommodation grooves to be engaged with the lugs is formed on the other one of the first gearbox housing 1041a and the first ring gear 1045a. The ring gear accommodation grooves may be formed in the outer circumferential surface of the first ring gear 1045*a*, and spaced a certain distance from each other in a circumferential direction. The lugs may be formed on the inner circumferential surface of the first gearbox housing 1041*a* at a predetermined distance from each other in the circumferential direction. The lugs are inserted into and coupled with the ring gear accommodation grooves. Alternatively, the lugs may be formed on the outer circumferential surface of the first ring gear 1045*a*, and the ring gear accommodation grooves may be formed on the inner side surface of the first gearbox housing 1041*a*. The lugs and the lug accommodation grooves prevent the first ring gear 1045*a* from rotating relative to the first gearbox housing 1041*a*. The rotational power of the first ring gear 1045*a* is transmitted to the first gearbox housing 1041*a*.

The first gearbox housing 1041*a* and the first ring gear 1045*a* rotate. The first gearbox housing 1041*a* and the first ring gear 1045*a* rotate relative to the inner tub assembly 120. As the first carrier 1044*a* is fixed to the inner tub assembly 120, the first ring gear 1045*a* rotates around the first planetary gear 1043*b* while being engaged with the first planetary gear 1043*a*. The first ring gear 1045*a* rotates about the first sun gear 342*b*. The direction of rotation of the first ring gear 1045*a* is opposite to the direction of rotation of the first sun gear 1042*a*, and is identical to the direction of rotation of the first planetary gear 1043*a*. Revolutions per minute of the first ring gear 1045*a* are determined by the gear ratio between the first ring gear 1045*a* and first sun gear 1042*a* and revolutions per minute of the first sun gear 1042*a*.

The first gearbox housing 1041*a* forms the upper connection shaft 1041*a*2. The upper connection shaft 1041*a*2 integrally rotates with the first gearbox housing 1041*a*. The upper connection shaft 1041*a*2 is inserted into and coupled with the shaft support groove 122*b*2 formed at the center of the bottom surface of the pulsator 122. The upper connection shaft 1041*a*2 transmits power to the pulsator 122.

The gearbox housing 1041*a* includes a power transmission cap 1041*a*3 disposed between the upper connection shaft 1041*a*2 and the shaft support groove 122*b*2. The power transmission cap 1041*a*3 is inserted and coupled between the upper connection shaft 1041*a*2 and the shaft support groove 122*b*2. The interior of the power transmission cap 1041*a*3 is provided with a coupling portion allowing the upper connection shaft 144*b* to be press-fitted thereinto. Serration lugs for transmitting rotational power are formed on the outer circumferential surface of the power transmission cap 1041*a*3.

The second ring gear 1045*b* is fixed to the second gearbox housing 1041*b*. A plurality of lugs is formed on one of the second gearbox housing 1041*b* and the second ring gear 1045*b*, and a plurality of ring gear accommodation grooves to be engaged with the lugs is formed on the other one of the second gearbox housing 1041*b* and the second ring gear 1045*b*. The ring gear accommodation grooves may be formed in the outer circumferential surface of the second ring gear 1045*b*, and spaced a certain distance from each other in a circumferential direction. The lugs may be formed on the inner circumferential surface of the second gearbox housing 1041*b* at a predetermined distance from each other in the circumferential direction. The lugs are inserted into and coupled with the ring gear accommodation grooves. Alternatively, the lugs may be formed on the outer circumferential surface of the second ring gear 1045*b*, and the ring gear accommodation grooves may be formed on the inner side surface of the second gearbox housing 1041*b*. The lugs and the lug accommodation grooves prevent the second ring gear 1045*b* from rotating relative to the second gearbox housing 1041*b*. The second ring gear 1045*b* is fixed to the inner tub assembly 120 by the second gearbox housing 1041*b*. To fix the second ring gear 1045*b* to the inner tub assembly 120, the second gearbox housing 1041*b* is connected and fixed to the jig 146.

The first ring gear 1045*a* is not fixed to the inner tub assembly 120. The first ring gear 1045*a* rotates relative to the inner tub assembly 120.

The second carrier 1044*b* is not fixed to the inner tub assembly 120. The second carrier 1044*b* rotates relative to the inner tub assembly 120.

The blade 123 is rotated by the rotational power transmitted from the second carrier 1044*b*. The rotational speed of the blade 123 is decreased according to the gear ratio between the second sun gear 1042*b* and the second ring gear 1045*b*. The power transmission unit 940 may further include a blade support member 1049*b* connected between the blade 123 and the second carrier 1044*b*. The second carrier 1044*b* may fix the blade support member 1049*b*, and the blade support member 1049*b* may be coupled with the center portion of the blade 123. The blade 123 integrally rotates with the second carrier 1044*b*. A plurality of lugs and a plurality of lug accommodation grooves may be provided to the boundary surfaces between the blade support member 1049*b* and the blade 123. The plurality of lugs is disposed to face the plurality of lug accommodation grooves. The rotational power of the blade support member 1049*b* is transmitted to the blade 123. The lugs or the lug accommodation grooves may be formed on the blade support member 1049*b*, and the lug accommodation grooves or the lugs may be formed on the blade 123. The blade support member 1049*b* may be integrated with the second carrier 1044*b*.

The pulsator 122 receives rotational power through the upper connection shaft 1041*a*2 of the first gearbox housing 1041*a*. The upper connection shaft 1041*a*2 is vertically disposed at an upper portion of the washing shaft 1032*a*. The upper connection shaft 1041*a*2 and the washing shaft 1032*a* rotate independently. The direction of rotation of the pulsator 122 is opposite to the direction of rotation of the drive motor 130.

The power transmission unit 1040 includes a plurality of bearings 1047*a*, 1047*b*, 1047*c*, 1047*d*, 1047*e*, 1047*f*, which enable the washing shaft 1032*a*, first and second carriers 1044*a*, 1044*b*, first gearbox housing 1041*a* and second gearbox housing 1041*b* to rotate relative to each other. A first bearing 1047*a* may be inserted and installed between the inner circumferential surface of the first gearbox housing 1041*a* and the outer side surface of the first carrier 1044*a*. Thereby, the first carrier 1044*a* may rotate relative to the first gearbox housing 1041*a*. A second bearing 1047*b* may be inserted and installed between the inner surface of the first carrier 1044*a* and the washing shaft 1032*a*. Thereby, the first carrier 1044*a* and the washing shaft 1032*a* may rotate independently. A plurality of second bearings 10410*b* may be provided. The second bearings 10410*b* are spaced from each other in the vertical direction. A third bearing 1047*c* may be installed between the outer side surface of the second carrier 1044*b* and the inner side surface of the second gearbox housing 1041*b*. Thereby, the second carrier 1044*b* may rotate relative to the second gearbox housing 1041*b*. A fourth bearing 1047*d* may be installed between the second carrier 1044*b* and the washing shaft 1032*a*. Thereby, the washing shaft 1032*a* may rotate relative to the second carrier 1044*b*. A fifth bearing 1047*e* may be installed between the blade support member 1049*b* and the second gearbox housing 1041*b*. Thereby, the blade support member 1049*b* may rotate relative to the second gearbox housing 1041*b*.

As is apparent from the above description, according to embodiments of the present invention, water may be sprayed upward at a strong pressure, detergent dissolution and fabric soaking may be quickly implemented, and the degree of detergent dissolution may be remarkably increased.

In addition, detergent dissolution and fabric soaking may be easily implemented even with a small amount of water. Thereby, water usage may be reduced.

As one drive motor is used to rotate a blade at a relatively high number of revolutions per minute and to rotate a pulsator at a relatively low number of revolutions per minute, the pumping pressure and pumping head may be increased, smooth washing may be performed, and the degree of wear of the laundry and rotation load may be lowered.

In addition, as a power transmission unit for transmitting drive power from one drive motor is provided, the function of the present invention may be achieved through a single shaft, and the need for a separate drive motor and change of the shaft may be eliminated. Further, the control operation may be simple.

In addition, as a planetary gear module is used, torque load to a drive motor may be reduced. In addition, energy may be saved as the motor is driven in a high-efficiency region.

In addition, as the blade stirs wash water in the direction opposite to the direction of rotation of the pulsator, the rotational speed of the blade relative to the rotational speed of the pulsator may be increased. Thereby, the degree of detergent dissolution and washing performance may be enhanced.

In addition, as wash water is stirred by a blade in a direction opposite to the direction of stirring by the pulsator, vibration generated in the pulsator may be reduced in the case when laundry washed which are introduced and put on the pulsator are concentrated at one position by rotation of the pulsator.

Further, as the pumped wash is caused to pass through a filter unit, impurities such as lint may be easily removed.

Although the preferred embodiments of the present invention have been disclosed for illustrative purposes, those skilled in the art will appreciate that some or all of the embodiments described above may be selectively combined such that various modifications, additions and substitutions can be made, without departing from the scope and spirit of the invention as disclosed in the accompanying claims.

The invention claimed is:

1. A washing machine comprising:
an inner tub assembly for accommodating laundry;
a pulsator rotatably provided to an inner lower portion of the inner tub assembly;
a blade installed below the pulsator to be rotatable independently from the pulsator, the blade being configured to pump wash water to raise the wash water to an upper end of the inner tub assembly;
a drive motor providing rotational power to the pulsator and the blade; and
a power transmission unit transmitting rotational power of the drive motor to the pulsator and the blade, wherein the power transmission unit comprises:
a first planetary gear module connected with the pulsator and configured to transmit rotational power of the drive motor to the pulsator such that a rotational speed of the pulsator is decreased, and
a second planetary gear module connected with the blade and configured to transmit rotational power of the drive motor to the blade such that a rotational speed of the blade is decreased,
wherein the first planetary gear module and the second planetary gear module are disposed between the pulsator and the blade.

2. The washing machined according to claim 1, wherein the first planetary gear module is disposed at an upper side of the secondary planetary gear module.

3. The washing machine according to claim 1, further comprising:
a washing shaft transmitting rotational power of the drive motor,
wherein the first planetary gear module comprises:
a first sun gear connected to the washing shaft and integrally rotating with the washing shaft;
a first planetary gear rotating by being engaged with an outer circumferential surface of the first sun gear;
a first carrier connecting the first planetary gear using a first planetary gear connection shaft, the first planetary gear connection shaft being coupled with the first planetary gear by penetrating a center portion of the first planetary gear; and
a first ring gear having an inner side engaged with the first planetary gear,
wherein the second planetary gear module comprises:
a second sun gear connected to the washing shaft and integrally rotating with the washing shaft;
a second planetary gear rotating by being engaged with an outer circumferential surface of the second sun gear;
a second carrier connecting the second planetary gear using a second planetary gear connection shaft, the second planetary gear connection shaft being coupled with the second planetary gear by penetrating a center portion of the second planetary gear; and
a second ring gear having an inner side engaged with the second planetary gear.

4. The washing machine according to claim 3, wherein the pulsator integrally rotates with one of the first carrier and the first ring gear,
wherein the other one of the first carrier and the first ring gear is fixed to the inner tub assembly.

5. The washing machine according to claim 3, wherein the pulsator integrally rotates with one of the first carrier and the first ring gear,
wherein the other one of the first carrier and the first ring gear is fixed to one of the second carrier and the second ring gear.

6. The washing machine according to claim 3, wherein the blade integrally rotates with one of the second carrier and the second ring gear,
wherein the other one of the second carrier and the second ring gear is fixed to the inner tub assembly.

7. The washing machine according to claim 3, wherein the blade integrally rotates with one of the second carrier and the second ring gear,
wherein the other one of the second carrier and the second ring gear is fixed to one of the first carrier and the first ring gear.

8. The washing machine according to claim 3, wherein the pulsator integrally rotates with one of the first carrier and the first ring gear, and
the blade integrally rotates with one of the second carrier and the second ring gear,
wherein the other one of the first carrier and the first ring gear is fixed to the other one of the second carrier and the second ring gear, and the other one of the second carrier and the second ring gear is fixed to the inner tub assembly.

9. The washing machine according to claim 8, wherein the power transmission unit transmits rotational power such that a direction of rotation of the pulsator is opposite to a direction of rotation of the blade.

10. The washing machine according to claim 9, wherein the pulsator integrally rotates with the first carrier, and
the blade integrally rotates with the second ring gear,
wherein the first ring gear, the second carrier and the inner tub assembly are fixed by each other.

11. The washing machine according to claim 9, wherein the pulsator integrally rotates with the first ring gear, and
the blade integrally rotates with the second carrier,
wherein the first carrier, the second ring gear and the inner tub assembly are fixed by each other.

12. The washing machine according to claim 3, wherein the first planetary gear module comprises:
a first gearbox housing accommodating the first sun gear, the first planetary gear, the first ring gear and the first carrier,
wherein the second planetary gear module comprises:
a second gearbox housing accommodating the second sun gear, the second planetary gear, the second ring gear and the second carrier,
wherein the first gearbox housing and the second gearbox housing are rotatable relative to each other.

13. The washing machine according to claim 3, wherein the first planetary gear module comprises:
a first gearbox housing accommodating the first sun gear, the first planetary gear, the first ring gear and the first carrier,
wherein the first ring gear is fixed to the first gearbox housing,
wherein the first carrier forms an upper connection shaft penetrating an upper surface of the first gearbox housing, and
the pulsator receives rotational power transmitted from the first carrier via the upper connection shaft.

14. The washing machine according to claim 3, wherein the first planetary gear module comprises:
a first gearbox housing accommodating the first sun gear, the first planetary gear, the first ring gear and the first carrier,
wherein the first ring gear is fixed to the first gearbox housing,
wherein the first gearbox housing forms an upper connection shaft, and
the pulsator receives rotational power transmitted from the first gearbox housing via the upper connection shaft.

15. The washing machine according to claim 3, wherein the second planetary gear module comprises:
a second gearbox housing accommodating the second sun gear, the second planetary gear, the second ring gear and the second carrier,
wherein the second ring gear is fixed to the second gearbox housing,
wherein the blade is fixed to the second gearbox housing.

16. The washing machine according to claim 15, wherein the second carrier is fixedly coupled with a lower surface of the inner tub assembly.

17. The washing machine according to claim 3, wherein the second planetary gear module comprises:
a second gearbox housing accommodating the second sun gear, the second planetary gear, the second ring gear and the second carrier,
wherein the second ring gear is fixed to the second gearbox housing,
wherein the blade is fixed to the second carrier at a lower side of the second gearbox housing.

18. The washing machine according to claim 17, further comprising:
a jig provided between the pulsator and the blade and extending from an outer circumferential portion of the power transmission unit in a radial direction of the inner tub assembly, the jig being fastened to an inner bottom surface of the inner tub assembly,
wherein the second gearbox housing is fixed to the jig.

19. The washing machine according to claim 1, wherein, when viewed from an upper side of the pulsator, the blade is disposed to be fully hidden.

20. The washing machine according to claim 1, further comprising:
a wash water circulation module for guiding the wash water moved by the blade to an upper side of the inner tub assembly to spray the wash water.

* * * * *